US012742466B2

(12) United States Patent
Singh

(10) Patent No.: US 12,742,466 B2
(45) Date of Patent: Sep. 22, 2026

(54) CLAMP FOR SECURING BARRIER TO SOLAR PANEL MODULE FOR PEST CONTROL

(71) Applicant: Unirac Inc., Albuquerque, NM (US)

(72) Inventor: Prashant Singh, Hyderabad (IN)

(73) Assignee: Unirac, Inc., Albuquerque, NM (US)

( * ) Notice: Subject to any disclaimer, the term of this patent is extended or adjusted under 35 U.S.C. 154(b) by 0 days.

(21) Appl. No.: 18/664,729

(22) Filed: May 15, 2024

(65) Prior Publication Data

US 2025/0354573 A1 Nov. 20, 2025

(51) Int. Cl.
*F24S 25/634* (2018.01)
*F16B 2/20* (2006.01)
*A01M 29/30* (2011.01)

(52) U.S. Cl.
CPC .............. *F16B 2/20* (2013.01); *F24S 25/634* (2018.05); *A01M 29/30* (2013.01)

(58) Field of Classification Search
CPC ..... F24S 25/634; F24S 2025/01; H02S 20/00; H02S 20/23; H02S 99/00; H02S 30/10; F16B 1/00; F16B 2/205; F16B 2/20; F16B 2/241; F16B 2/24; F16B 2/248; E04H 17/16; E04H 17/161; E04H 17/163
See application file for complete search history.

(56) References Cited

U.S. PATENT DOCUMENTS 433,312 A * 7/1890 Wicks ..................... F16B 2/241 24/72.5
7,880,362 B2 * 2/2011 Cutsforth ............. H01R 39/381 310/239
11,936,330 B2 * 3/2024 Lord ........................ F24S 40/00
2012/0102681 A1 * 5/2012 Sieger ........................ A45F 5/02 24/304
2012/0201601 A1 * 8/2012 Rizzo ..................... F24S 25/632 403/409.1
2012/0212884 A1 * 8/2012 Su ............................ F16B 2/245 361/679.01
2013/0216303 A1 * 8/2013 Tang ........................ F16B 2/245 403/326
2016/0268965 A1 9/2016 Stearns et al.
2018/0026577 A1 * 1/2018 Gaveau .................... F24S 20/70 136/251
2018/0078004 A1 * 3/2018 Baker ................ A44B 11/2584
2021/0399680 A1 12/2021 Crook et al.
(Continued)

FOREIGN PATENT DOCUMENTS

CN 209283169 U 8/2019

OTHER PUBLICATIONS

Bird Barrier of America, https://birdbarrier.com, downloaded Mar. 6, 2024, 6 pages.
(Continued)

*Primary Examiner* — Nkeisha Smith
(74) *Attorney, Agent, or Firm* — Lee & Hayes, P.C.

(57) ABSTRACT

A clamp includes a connector, a bracket, and a slide. The connector is disposed through a barrier, and attaches to a solar panel module or a frame of the solar panel module. The bracket has a channel through which at least a portion of the connector is disposed. The slide that is transitionable between a first position in which the connector is unsecured to the bracket, and a second position in which the connector is secured to the bracket.

19 Claims, 40 Drawing Sheets

(56) References Cited

U.S. PATENT DOCUMENTS

| | | | |
|---|---|---|---|
| 2023/0213118 | A1 | 7/2023 | Neal |
| 2024/0032526 | A1 | 2/2024 | Loomans |

OTHER PUBLICATIONS

Bird-B-Gone, https://www.birdbgone.com, downloaded Mar. 6, 2024, 6 pages.

CritterBlok, LLC, https://www.critterblok.com; downloaded Mar. 6, 2024, 3 pages.

Todd James Kuchman, OmniClip Omni Rooftop Systems, https://www.omniclips.com/pest-protection, downloaded Apr. 5, 2024, 2 pages.

Critter Guards, RoTak Products, https://rotak.com/collections/critter-guards, downloaded Mar. 6, 2024, 5 pages.

SnapNrack Solar Mounting Solutions, https://snapnrack.com/wp-content/uploads/2019/07/Array-Edge-Screen-Brochure_v.1.3.pdf, downloaded Mar. 6, 2024, 2 pages.

SolaTrip Pest Barrier for Solar Panels, Nixalite, https://www.nixalite.com/products, downloaded Mar. 6, 2024, 4 pages.

Solar Panel Clips, Spiffy Solar, https://www.spiffysolar.com/solar-panel-wire-mesh-clips-p/sc1.htm, downloaded Mar. 6, 2024, 2 pages.

The Rail Mount Method for Solar Animal Guard, https://slicktoolsllc.com/rail-mount-method/?v=7516fd43adaa, downloaded Mar. 6, 2024, 13 pages.

Search Report and Written Opinion for International Application No. PCT/US25/16345, Dated Apr. 23, 2025, 11 pages.

* cited by examiner

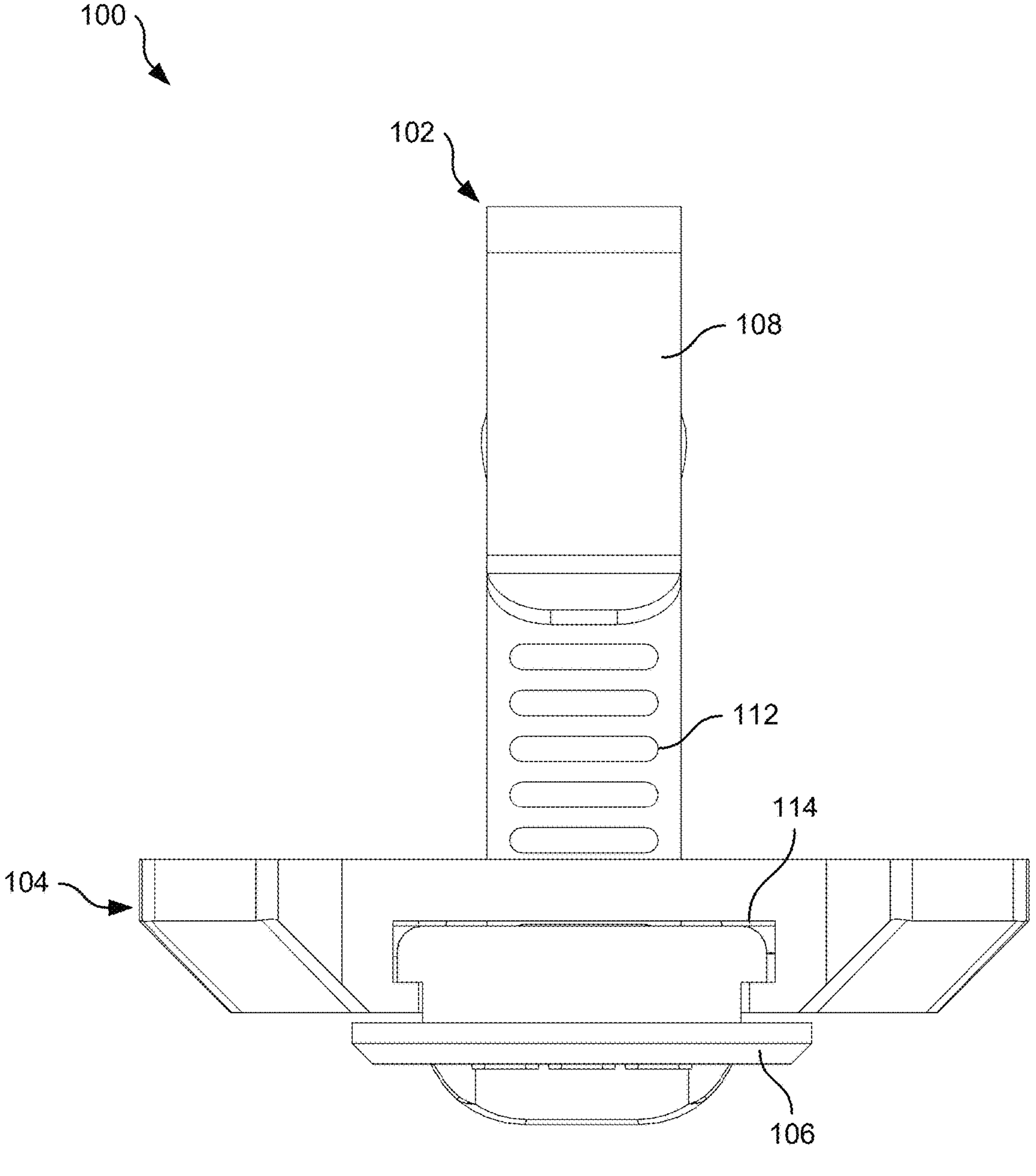
FIG. 1B
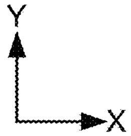

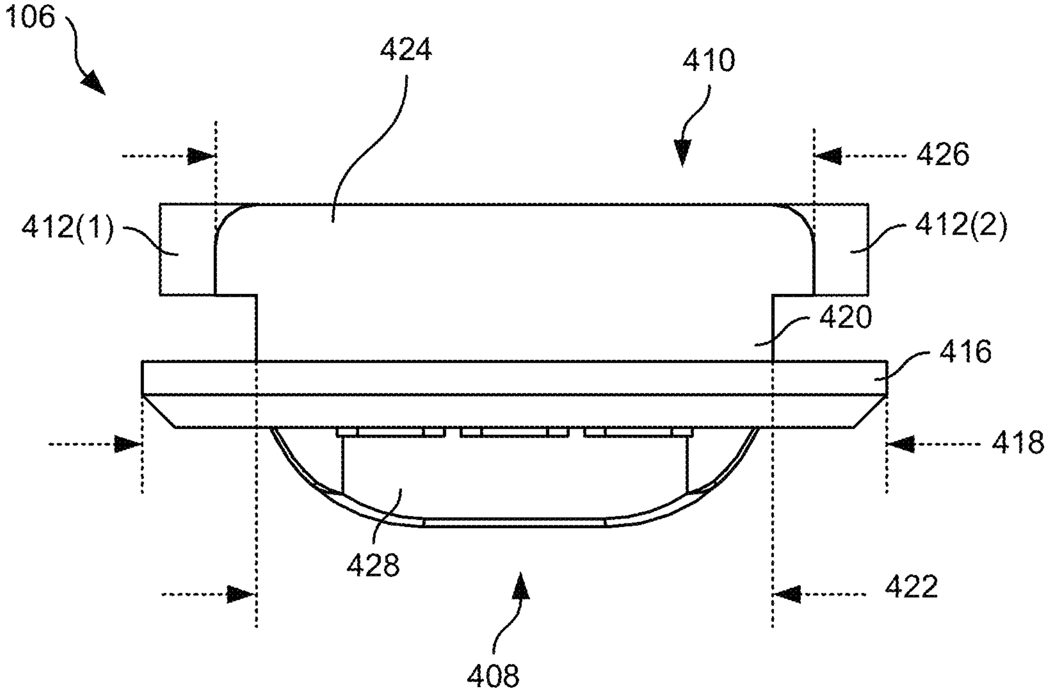
FIG. 4D
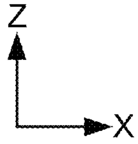

900
902
906
910
904
908
912
Y
Z
X 902
900
906
200
904
204
908
Y
Z 200
202
904
DIRECTION
914
900
Y
Z
X

CLAMP FOR SECURING BARRIER TO SOLAR PANEL MODULE FOR PEST CONTROL

BACKGROUND

The solar industry is growing worldwide and, as a result, more efficient structures are desirable for mounting photovoltaic modules or solar panel modules to a structure, such as a roof of a home or other building. Because pests such as birds and rodents may nest under the solar panel modules and/or damage the solar panel modules, there is a need to protect the solar panel modules from such pests pests. In addition, debris such as leaves can branches may get caught under the solar panel modules. While different structures are known to protect against such nuisances, there is a desire to improve their efficiency, reduce their complexity, and adapt the structures to be more universal when possible or to be more specific for new mounting equipment when developed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIG. 1B illustrates top view of the clamp of FIG. 1A, according to embodiments of the present disclosure.

FIG. 4D illustrates a top view of the slide of FIG. 4A, according to embodiments of the present disclosure.

DETAILED DESCRIPTION

Figure 1A:
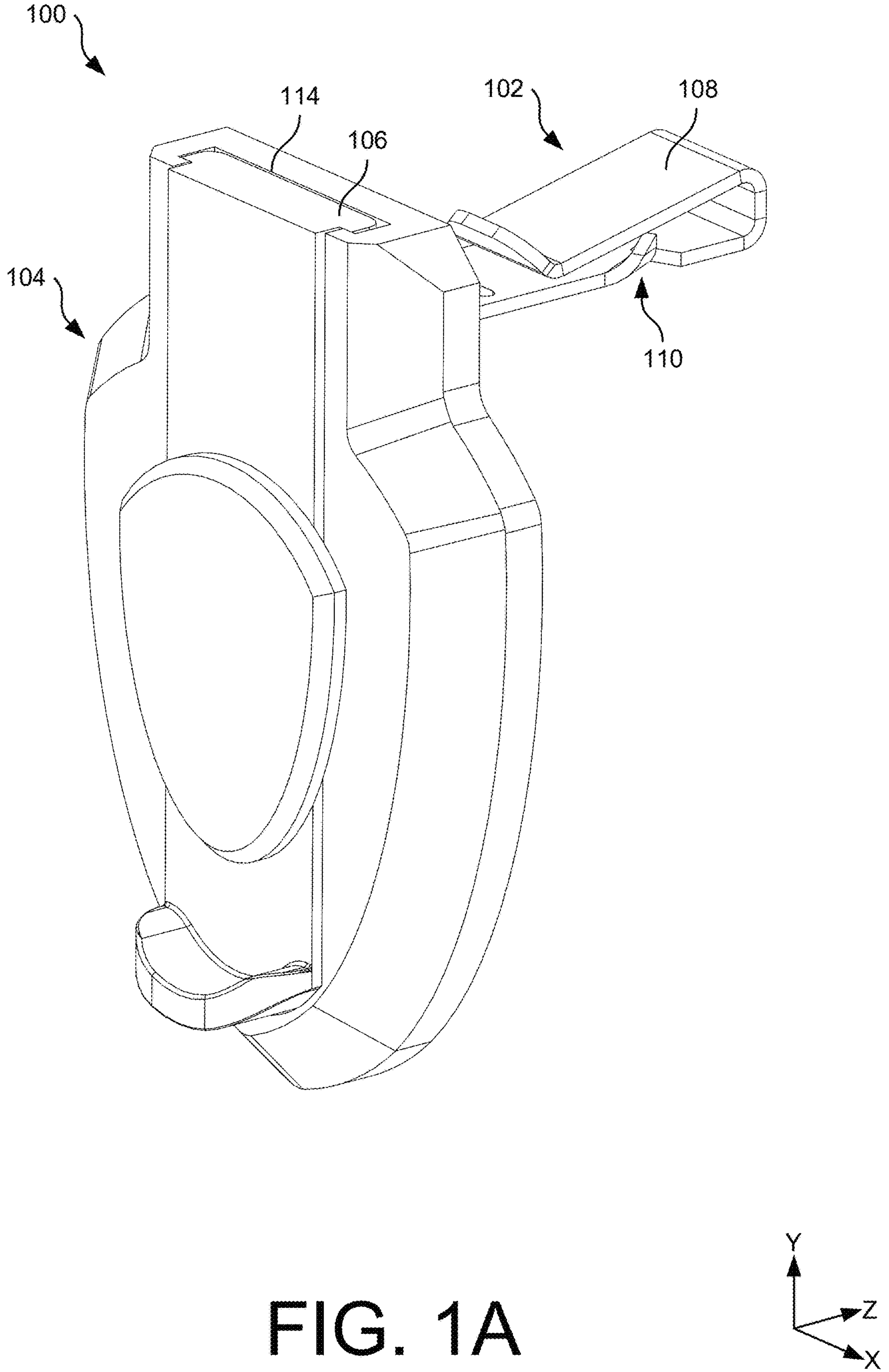
FIG. 1A illustrates an isometric view of an example clamp used to attach a barrier to one or more solar panel modules, according to embodiments of the present disclosure.

This application is directed, at least in part, to a clamp that attaches a barrier to a solar panel module, according to embodiments of the present disclosure. In an embodiment, the clamp includes a connector (e.g., attacher, adapter, joiner, etc.) that attaches (e.g., secures, affixes, connects, etc.) to a solar panel module, (for example to the frame of the solar panel module), a bracket that receives the connector, and a slide that secures the connector to the bracket. For example, an end of the connector may be disposed through the barrier, through a channel of the bracket, and pulled taut so as to secure the barrier between the bracket and the solar panel module. Thereafter, the slide may be disposed over the end of the connector to prevent unintentional disengagement between the connector and the bracket. In an embodiment, the clamp may attach the barrier to the solar panel module to prevent wildlife, such as birds and rodents, from accessing an area underneath the solar panel modules, chewing wires connected to the solar panel modules, etc. In an embodiment, the barrier may be installed between the solar panel module and a surface on which the solar panel module is disposed, such as a roof. The clamp may be removably attached to the solar panel module to permit maintenance to the solar panel module. For example, from time to time, the clamp may be removed to service the solar panel module.

In an embodiment, the connector includes a first end that attaches (e.g., secures, affixes, connects, etc.) to the frame of the solar panel module, and a second end opposite the first end. A length of the connector extends between the first end and the second end. In an embodiment, the first end is disposed over a portion of the length of the connector, so as to form a clip, that secures the connector to the frame. For example, the first end of the connector may be bent so as to be disposed over a portion of the length so as to form the clip. The clip may be slid onto the frame of the solar panel module and be biased to secure the connector to the frame.

In an embodiment, the connector may include engagement mechanisms, such as prongs, tabs, and the like that engage with the frame. When the clip is advanced onto the frame, the prongs may engage with the frame and prevent the clip from disengaging from the frame. For example, the prongs may notch or dig into the frame. However, upon application of a predetermined amount of force to the clip (e.g., to overcome a biasing force of the clip), the connector may be removed from the frame. The first end of the connector may be pulled to overcome a biasing force of the clip to remove the connector from the frame.

The connector may also include slots (e.g., apertures, slits, etc.) disposed between the first end and the second end. As will be explained herein, a tab (e.g., protrusion) of the bracket may engage with at least one of the slots for securing the connector to the bracket. For example, as the connector is pulled taut, through the channel of the bracket, the tab may reside within at least one of the slots. An engagement between the tab within the slot may prevent the connector from retracting out of the channel and disengaging the bracket. In other words, an engagement between the tab and the slot may retain an engagement between the connector and the bracket. Any number of the slots may be disposed along the connector. For example, having varying slots along the length of the connector enables the connector to be pulled to varying degrees of tautness, as well as to accommodate differently sized solar panel modules (or frames) and/or barriers.

The barrier may include any suitable material, such as plastic, metal (e.g., vinyl-coated steel), fabric, etc. In an embodiment, the barrier may include a meshed material, with passages, openings, holes, etc., or may include a non-meshed material without passages, openings, holes, etc. In instances where the barrier is meshed, the second end of the connector may be disposed through meshed areas of the barrier. Alternatively, if the barrier is not meshed, the second end may be disposed through the barrier (e.g., via puncturing, drilling, etc.).

The barrier may include any suitable length and/or height and is intended to be disposed between the solar panel module and the roof. That is, the barrier is intended to span a gap distance between the roof and the solar panel module, thereby effectively preventing or minimizing pest infiltration. A first end of the barrier may rest along the roof, while the clamp may attach proximate to a second end of the barrier. The barrier may therefore prevent access to an area underneath the solar panel module, such as at a gap between the solar panel module and the roof. Any number, segments, sections, etc. of the barrier may be used. Additionally, although described herein as preventing wildlife from accessing an area underneath the solar panel module, the barrier may prevent other debris (e.g., sticks, leaves, garbage, etc.) from accumulating in the area underneath the solar panel module.

The bracket includes the channel through which the second end of the connector is disposed. For example, once the second end is disposed through the barrier, the second end of the connector may be disposed through the channel. As introduced above, the second end of the connector may be pulled taut, thereby tightening the bracket against the frame, during which the barrier becomes secured between the bracket and the frame. The attaching of the connector to the frame (e.g., at the first end) anchors the connector to permit the bracket to be pulled against the frame. Once pulled taut, the connector may be bent over the tab to prevent disengagement between the connector and the bracket. As the connector is bent over the tab, the tab may be disposed within at least one of the slots. The engagement between the tab and the slot may prevent the connector from retracting out of the channel.

The slide engages with the bracket to further secure the connector to the bracket. In an embodiment, the slide may be disposed within a receptacle formed in the bracket. The slide may transition between a first state, position, etc. and a second state, position, etc. The first state may correspond to an unlocked or open state, while the second state may correspond to a locked or closed state. The second end may be disposed through the channel while the slide is in the first state, and once the connector is bent, the slide may transition to the second state. In the first state, the slide may permit the second end to be advanced through the channel. Upon transitioning to the second state, the connector may become wedged (e.g., compressed, constricted, etc.) between the slide and the bracket. This engagement may further prevent the connector from disengaging with the bracket. For example, the slide may restrict access to the second end of the connector to prevent the second end of the connector being bent in an opposite direction to disengage the connector from the bracket (e.g., via disengaging the tab from the slot).

In an embodiment, the connector may be bent via an engagement with the slide, for example, as the slide transitions from the first state to the second state. In an embodiment, the slide may include a groove (e.g., pocket, receptacle, etc.) in which a portion of the length of the connector is disposed. For example, once the connector is bent over the tab, the connector may reside within the receptacle. When the slide transitions to the second state, the connector may be at least partially disposed within the groove.

In an embodiment, the slide may transition from the second state to the first state, for example, to remove the barrier. For example, during maintenance, repair, etc. of the solar panel module, barrier, etc., the clamp may be removably attached from the solar panel module. Upon transitioning the slide to the first state, the second end of the connector may be grasped and unbent, for example, and the connector may be straightened. The straitening of the connector permits the second end to be pulled through the channel. Moreover, during straightening of the connector, the tab may disengage with the slot. Once the connector disengages with the tab the bracket may be free to be removed, and in turn, the barrier may be disengaged from the connector. In an embodiment, the slide may include a handle that permits the slide to be grasped for transitioning between the first state and the second state.

In an embodiment, the receptacle of the bracket may include tracks (e.g., slots, races, etc.) in which arms (e.g., knobs, dials, pins, etc.) of the slide engage. The disposition of the arms within the tracks may engage the slide within the receptacle and/or permit transitioning of the slide in a convenient manner. Additionally, the bracket may define one or more projections (e.g., cams, bulges, bump, etc.) that may hold the slide in the first state, thereby permitting the second end of the connector to be disposed through the channel without interference from the slide. Between the first state and the second state, the arms may traverse over, along, etc. the projections. In an embodiment, the projections may be at least partially disposed within the tracks.

The solar panel module may be secured to the roof (or other surface) using any suitable combination of rails, mounts, and brackets. For example, rails may be attached to the roof, and mounts may be used to attach (e.g., mount, secure, etc.) the solar panel modules to the rails. Any number of solar panel modules may be attached to the roof, and in such instances, any number of the clamps may be attached to the solar panel modules, or across the solar panel modules, for securing the barrier. In an embodiment, the barrier may be disposed around a perimeter of the solar panel modules. In such instances, the clamps may attach to the outermost solar panel modules that extend around the perimeter.

Although the clamp is described as including certain components (e.g., the connector, the bracket, and the slide), the clamp may include additional and/or alternative components for securing the barrier to the solar panel module. In such instances, the clamps may function differently or similarly than the described above.

The clamp may be manufactured from any suitable materials, such as metal (e.g., aluminum), plastic, composites, etc. The clamp may be manufactured using any suitable manufacturing technique, such as injection molding, stamping, extrusion, die cast, etc. In an embodiment, different components of the clamp may be manufactured from different materials, using different manufacturing techniques. For example, the connector may be manufactured from metal using stamping, while the bracket may be manufactured from plastic using injection molding.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting examples. The features illustrated or described in connection with one example may be combined with the features of other examples. Such modifications and variations are intended to be included within the scope of the appended claims.

FIGS. 1A and 1B illustrate views of an example clamp 100 configured to secure a barrier to one or more solar panel modules, according to embodiments of the present disclosure. In an embodiment, the clamp 100 may include a connector 102, a bracket 104, and a slide 106.

As will be explained herein, the connector 102 may engage with the solar panel module, such as a frame thereof. For example, the connector 102 may include or define a clip

108 that secures the connector 102 to the frame. In an embodiment, the connector 102 includes engagement mechanisms, such as prongs 110 that engage with the frame. When the clip 108 is advanced onto the frame, the prongs 110 may engage with the frame and prevent the clip 108 from disengaging from the frame. For example, the prongs 110 may notch or dig into the frame.

The connector 102 also defines one or more slots 112, which, as will be explained herein, engage with a tab of the bracket 104 for securing the connector 102 to the bracket 104. For example, an end of the connector 102 (opposite an end where the clip 108 is disposed) may be disposed through a channel of the bracket 104. The connector 102 may be pulled taut, through the channel and the bracket 104 may be advanced towards the barrier, thereby securing the barrier between the bracket 104 and the solar panel module. The connector 102 may then be bent over the tab, during which the tab is disposed within one of the slots 112. The engagement between the tab and one of the slots 112 maintains an engagement between the connector 102 and the bracket 104.

The slide 106 may be disposed within a receptacle 114 formed in the bracket 104. The slide 106 is configured to transition between a first state and a second state. In FIGS. 1A and 1B, the slide 106 is shown in the second state to secure the connector 102 to the bracket 104. However, the slide 106 may transition from the second state to the first state (e.g., in the Y-direction) to expose the end of the connector 102 residing within the receptacle 114. Transitioning the slide 106 to the first state permits the connector 102 to be deattached from the bracket 104. However, in the second state, the connector 102 may be wedged (e.g., compressed, constricted, etc.) between the slide 106 and the bracket 104. In an embodiment, the slide 106 may represent a cap disposed over the connector 102.

Figure 2A:
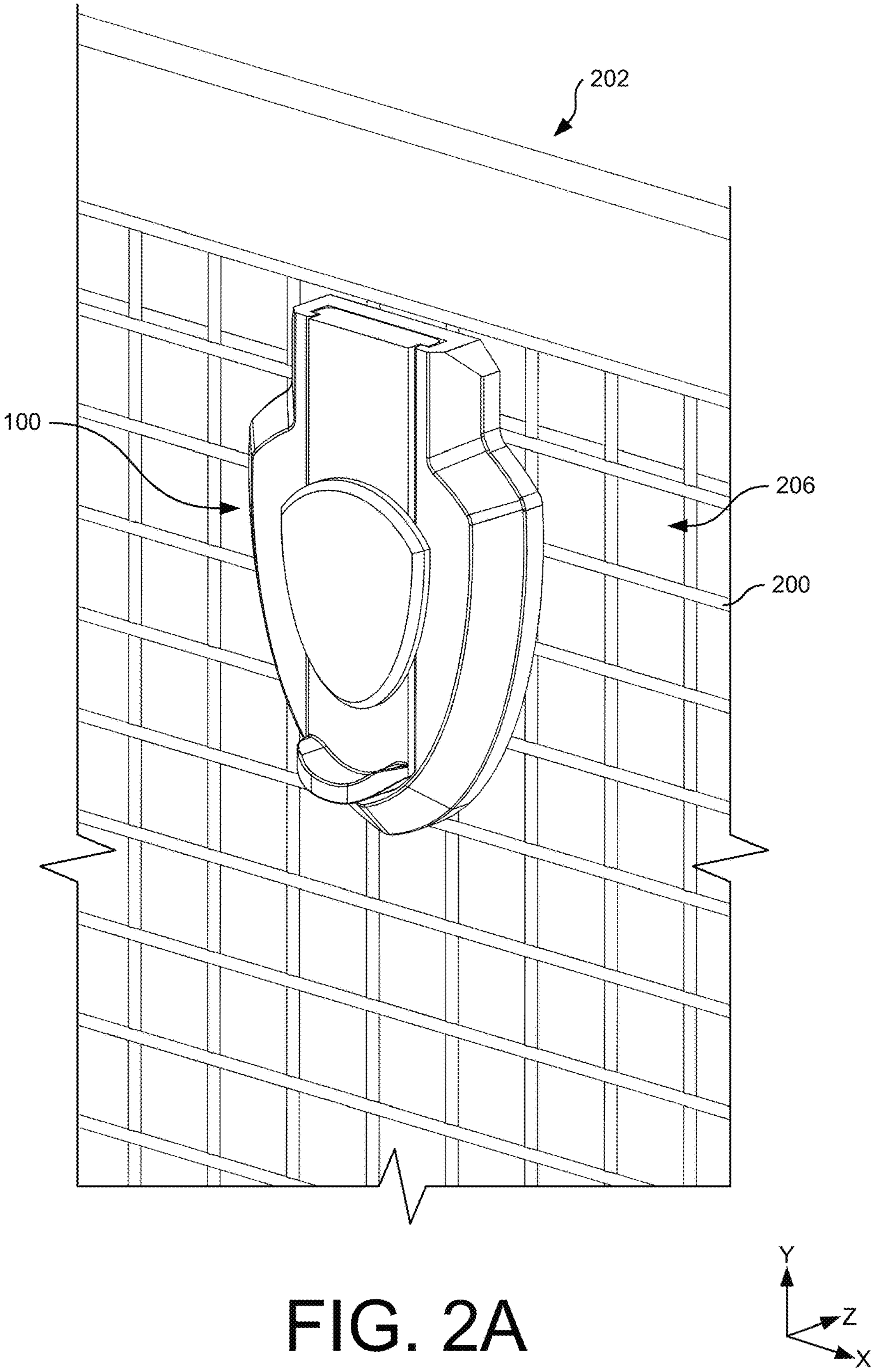
FIG. 2A illustrates an isometric view showing the clamp of FIG. 1A attaching a barrier or to one or more solar panel modules, according to embodiments of the present disclosure.
Figure 2B:
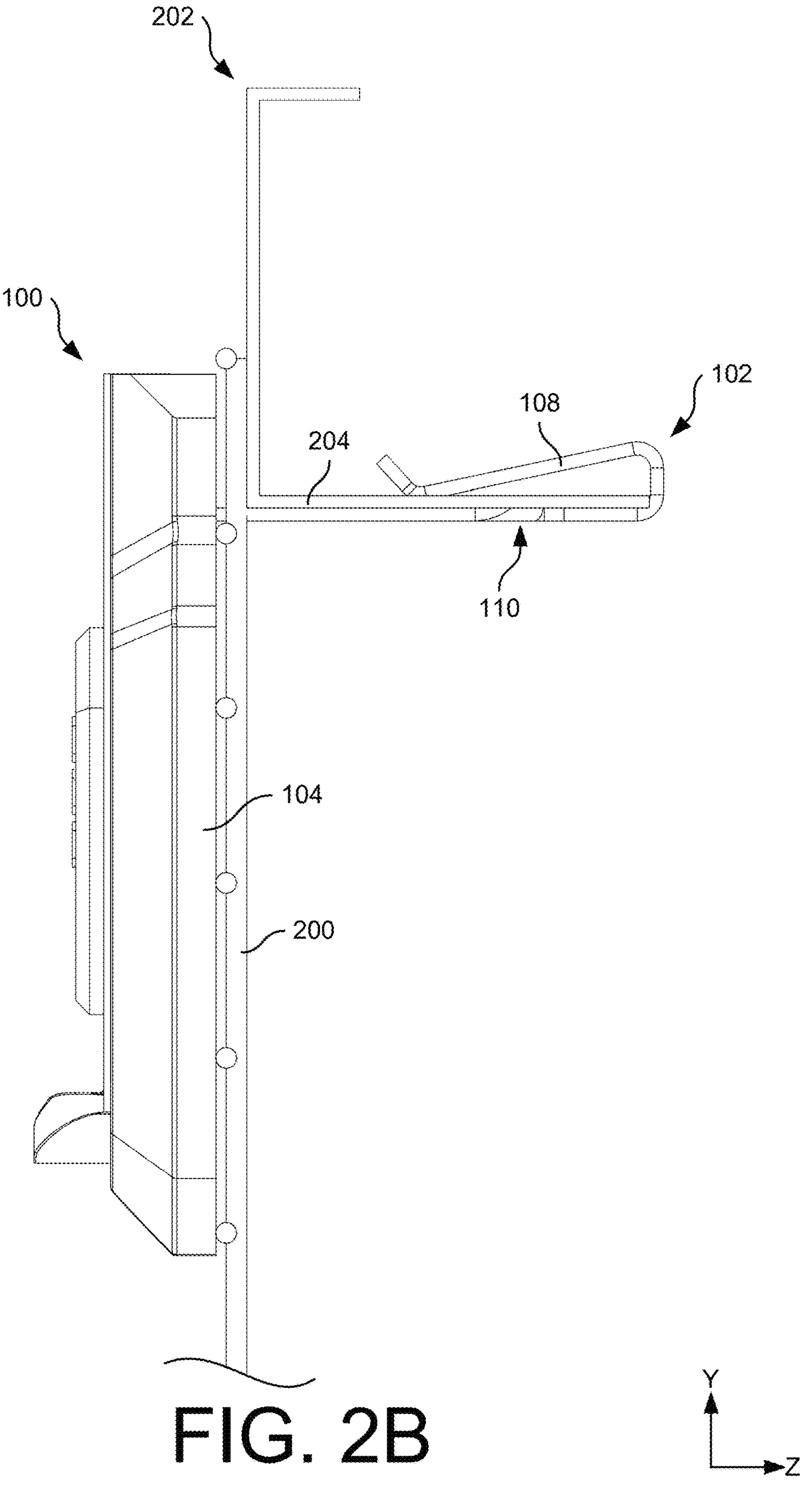
FIG. 2B illustrates a side view showing the clamp of FIG. 1A attaching a barrier or to one or more solar panel modules, according to embodiments of the present disclosure.

FIGS. 2A and 2B illustrate an example use of the clamp 100 to attach (e.g., secure, affix, connect, etc.) a barrier 200 to a solar panel module, according to embodiments of the present disclosure. In an embodiment, the solar panel module may include a frame 202 having a flange 204 to which the clip 108 engages. For example, the clip 108 may be slid onto the flange 204 (e.g., in the Z-direction), and therein, the clip 108 may bias against the flange 204 (e.g., in the Y-direction) to secure the connector to the frame 202. As the clip 108 is slid onto the flange 204, the prongs 110 may engage with the flange 204 to prevent the clip 108 from disengaging from the frame 202. For example, the prongs 110 may notch or dig into the flange 204.

The barrier 200 is shown being disposed between the frame 202 and the bracket 104 (e.g., in the Z-direction). Once the connector 102 attaches to the frame 202, the connector 102 may be disposed or passed through the barrier 200. For example, the barrier 200 may be slid onto the connector 102 (e.g., through mesh, holes, etc. in the barrier 200). Therein, the end of the connector 102 may be disposed through the channel in the bracket 104 to secure connector 102 to the bracket 104. The slide 106, as discussed above, also secures the connector 102 to the bracket 104. As such, the barrier 200 may become compressed, wedged, etc. between the frame 202 and the bracket 104.

The slots 112 in the connector 102 may accommodate varying solar panel modules, or sizes of frames. For example, the flange 204 of the frame 202 is shown including a certain depth (e.g., in the Z-direction). However, flanges of other frames may include a greater or lesser depth. In such instances, the slots 112 disposed along the connector 102 may accommodate such frames, thereby allowing the tab to engage with one of the slots 112. Moreover, the slots 112 may accommodate barriers with different thicknesses.

The barrier 200 may be of any suitable length (e.g., in the X-direction) and/or height (e.g., in the Y-direction). In an embodiment, the barrier 200 may be disposed between the frame 202 and a surface to which the solar panel module is secured, such as a roof. For example, the barrier 200 may include a first end disposed against the roof, and a second end, opposite the first end (e.g., in the Y-direction). The connector 102 may be disposed through the barrier 200 proximate to the second end. In doing so, the barrier 200 may prevent access to underneath the solar panel module. Any number, segments, sections, etc. of the barrier 200 may be used.

The barrier 200 may include (i.e., be formed of) any suitable material, such as plastic, metal (e.g., vinyl-coated steel), fabric, etc. In an embodiment, the barrier 200 may include a meshed material, with passages 206, openings, holes, etc., such as shown in FIGS. 2A and 2B. In instances where the barrier 200 is meshed, the connector 102 may be disposed through the passages 206, openings, holes, etc. in the barrier 200. Alternatively, if the barrier 200 is not meshed, the connector 102 may be disposed through the barrier 200 in other manners (e.g., via puncturing, drilling, etc.).

FIGS. 3A-3E illustrate details of the bracket 104, according to examples of the present disclosure. The bracket 104 may include a first side 300, a second side 302 opposite the first side 300 (e.g., in the X-direction), a top 304, a bottom 306 opposite the top 304 (e.g., in the Y-direction), a front 308, and a back 310 opposite the front 308 (e.g., in the Z-direction). The back 310 may be oriented towards the barrier 200 (e.g., abut against the barrier 200), while the front 308 may be oriented away from the barrier 200.

The bracket 104, or a body of the bracket 104, defines the receptacle 114 disposed along the front 308. In an embodiment, the receptacle 114 may be centrally located, between the first side 300 and the second side 302. The receptacle 114 may be open along the top 304 and enclosed along the bottom 306. The open nature of the top 304 permits the slide 106 to be inserted into the receptacle 114 (e.g., in the Y-direction).

The bracket 104 includes a first track 312(1) and a second track 312(2) for receiving features (e.g., arms, extrusions, etc.) of the slide 106. The first track 312(1) and the second track 312(2) may represent channels, passages, slots, grooves, etc. formed within the bracket 104. When the slide 106 engages with the bracket 104, a first arm of the slide 106 may traverse, slide, etc. within the first track 312(1), while a second arm of the slide 106 may traverse, slide, etc. within the second track 312(2). The first track 312(1) and the second track 312(2) may be disposed within the receptacle 114, or may be defined by the receptacle 114.

The bracket 104 includes a first stop 324(1) and a second stop 324(2) disposed at the top 304, at ends of the first track 312(1) and the second track 312(2), respectively. The first stop 324(1) and the second stop 324(2) may prevent disengagement between the slide 106 and the bracket 104. For example, the first arm and the second arm of the slide 106, at the first state of the slide 106, may abut against the first stop 324(1) and the second stop 324(2) to prevent the slide 106 from disengaging with the bracket 104 (e.g., sliding out of the receptacle 114). However, to attach the slide 106 and the bracket 104 together, the first arm and the second arm of the slide 106 may be maneuvered over the first stop 324(1) and the second stop 324(2) to be disposed within the first track 312(1) and the second track 312(2).

The bracket 104 may further define a first projection 314(1) and a second projection 314(2). In an embodiment, the first projection 314(1) and the second projection 314(2) may be disposed within the receptacle 114, at a location corresponding to or within the first track 312(1) and the second track 312(2), respectively. The first projection 314(1) and/or the second projection 314(2) may represent bulges, cams, humps, etc. The first projection 314(1) and the second projection 314(2) may protrude from a surface of the bracket 104, in a direction from the back 310 to the front 308.

In the first state of the slide 106, the first arm may be disposed between the first projection 314(1) and the first stop 324(1), and the second arm may be disposed between the second projection 314(2) and the second stop 324(2). At the first state, the slide 106 may be prevented from transitioning to the second state via an engagement between the first arm with the first projection 314(1) and the second arm with the second projection 314(2). However, upon application of a sufficient amount of force, the first arm and the second arm may be urged over the first projection 314(1) and the second projection 314(2), respectively. As such, the first projection 314(1) and the second projection 314(2) may at least temporarily maintain the slide 106 in the first state.

The bracket 104 defines a channel 316, which extends from the back 310 into the receptacle 114. In an embodiment, the channel 316 is centrally located on the bracket 104, between the first side 300 and the second side 302. Additionally, or alternatively, the channel 316 may be located more proximate to the top 304 than the bottom 306. The channel 316 is sized to receive the connector 102. For example, the channel 316 may include a width 318 (e.g., in the X-direction) that is greater than a width of the connector 102. A tab 320 is defined within the body form of the bracket 104 and is disposed at least partially within the channel 316. The tab 320 may engage with one of the slots 112 to secure the connector 102 to the bracket 104. The tab 320 may represent a tooth, protrusion, rib, etc. that is configured to catch at least partially within one of the slots 112. The connector 102 may bend, rotate, or otherwise engage the tab 320 for securing the connector 102 to the bracket 104.

The tab 320 may have a width 322 that is less than the width 318 of the channel 316. Gap distances may be formed between ends of the tab 320 and sidewalls of the channel 316. The width 322 is less than the width 318 to permit the tab 320 to engage with one of the slots 112, since the slots 112 extend less than an entirety of the width of the connector 102.

Figure 3A:
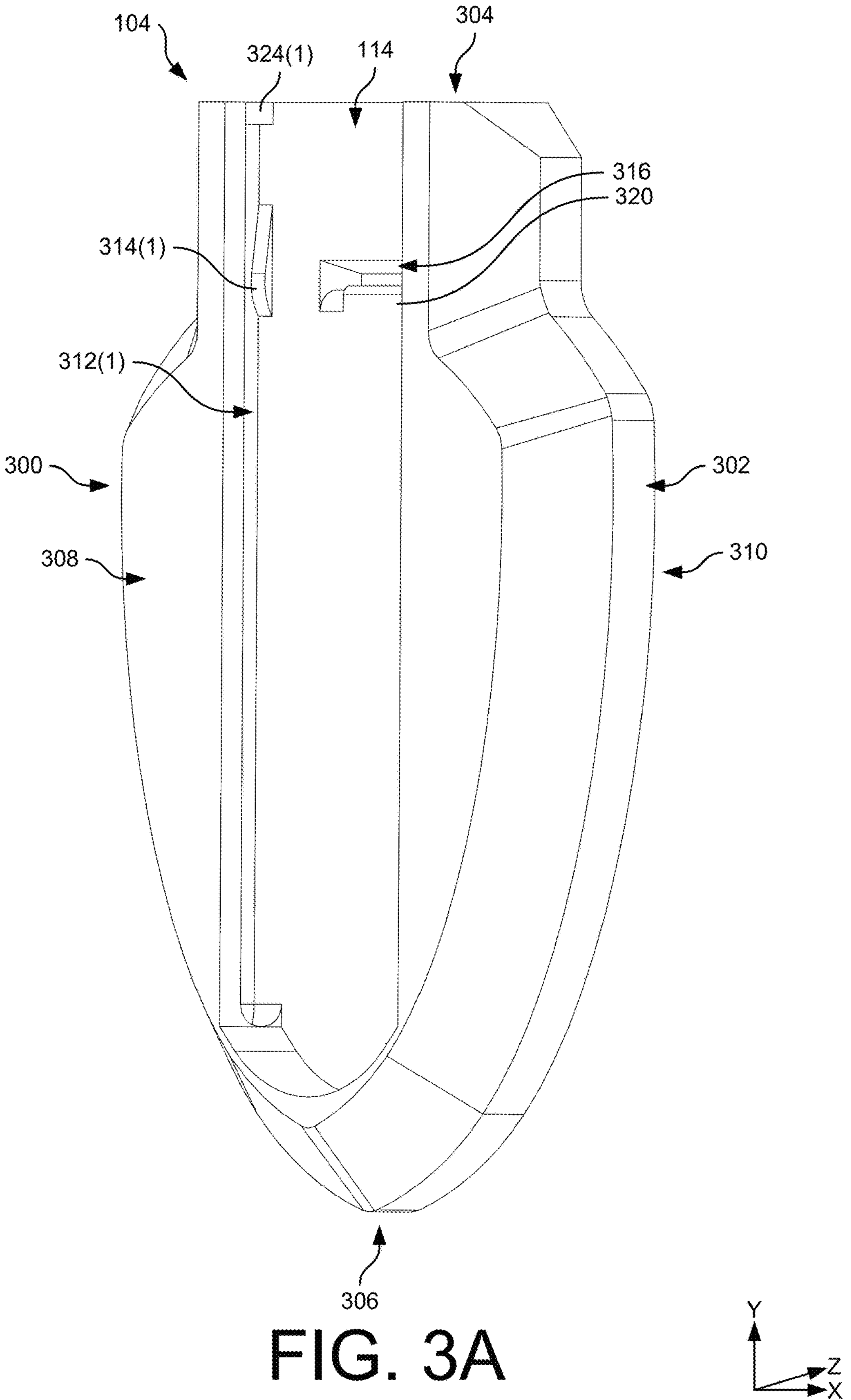
FIG. 3A illustrates a first isometric view of an example bracket of the clamp of FIG. 1A, according to embodiments of the present disclosure.
Figure 3B:
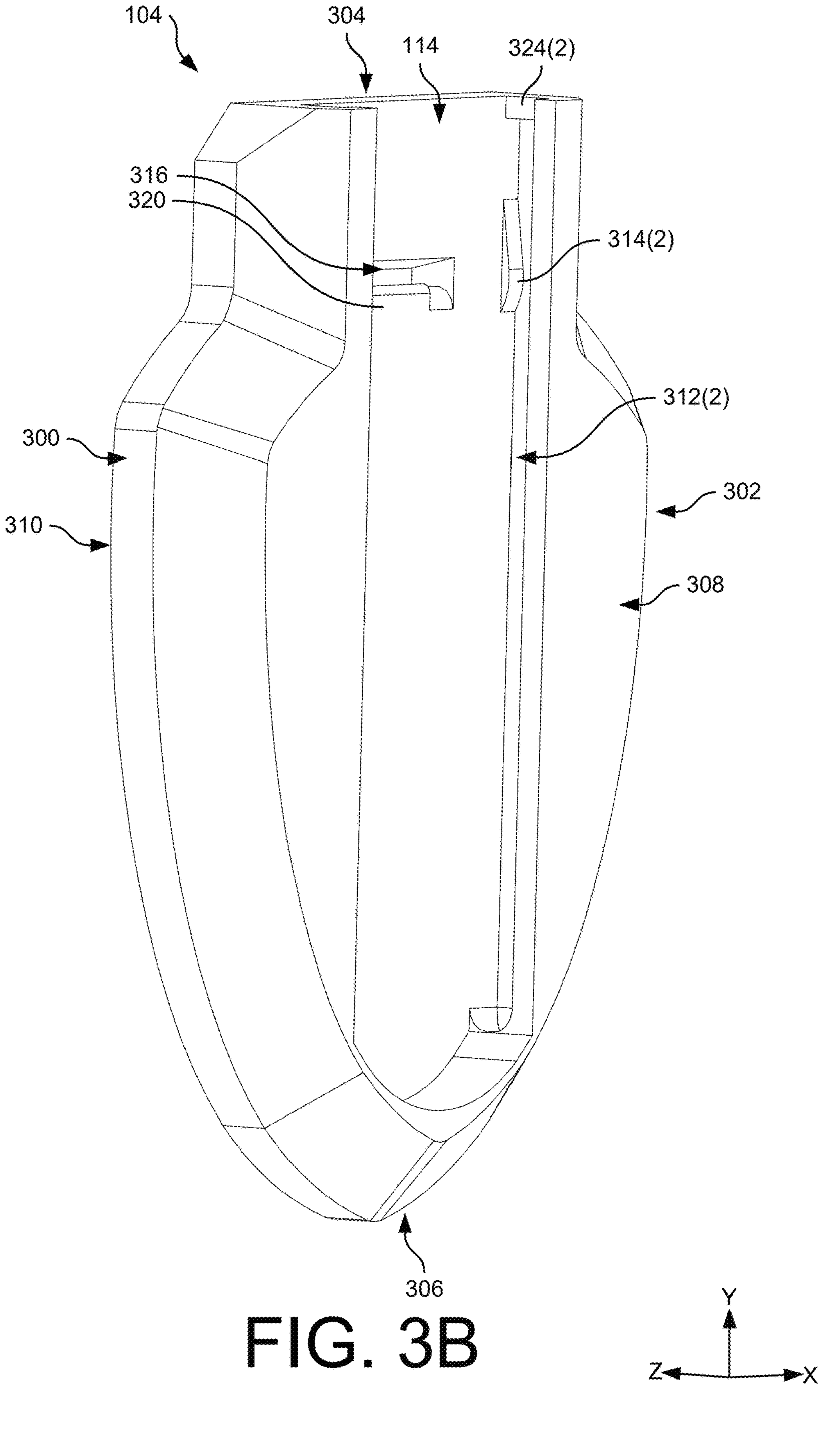
FIG. 3B illustrates a second isometric view of the bracket of FIG. 3A, according to embodiments of the present disclosure.
Figure 3C:
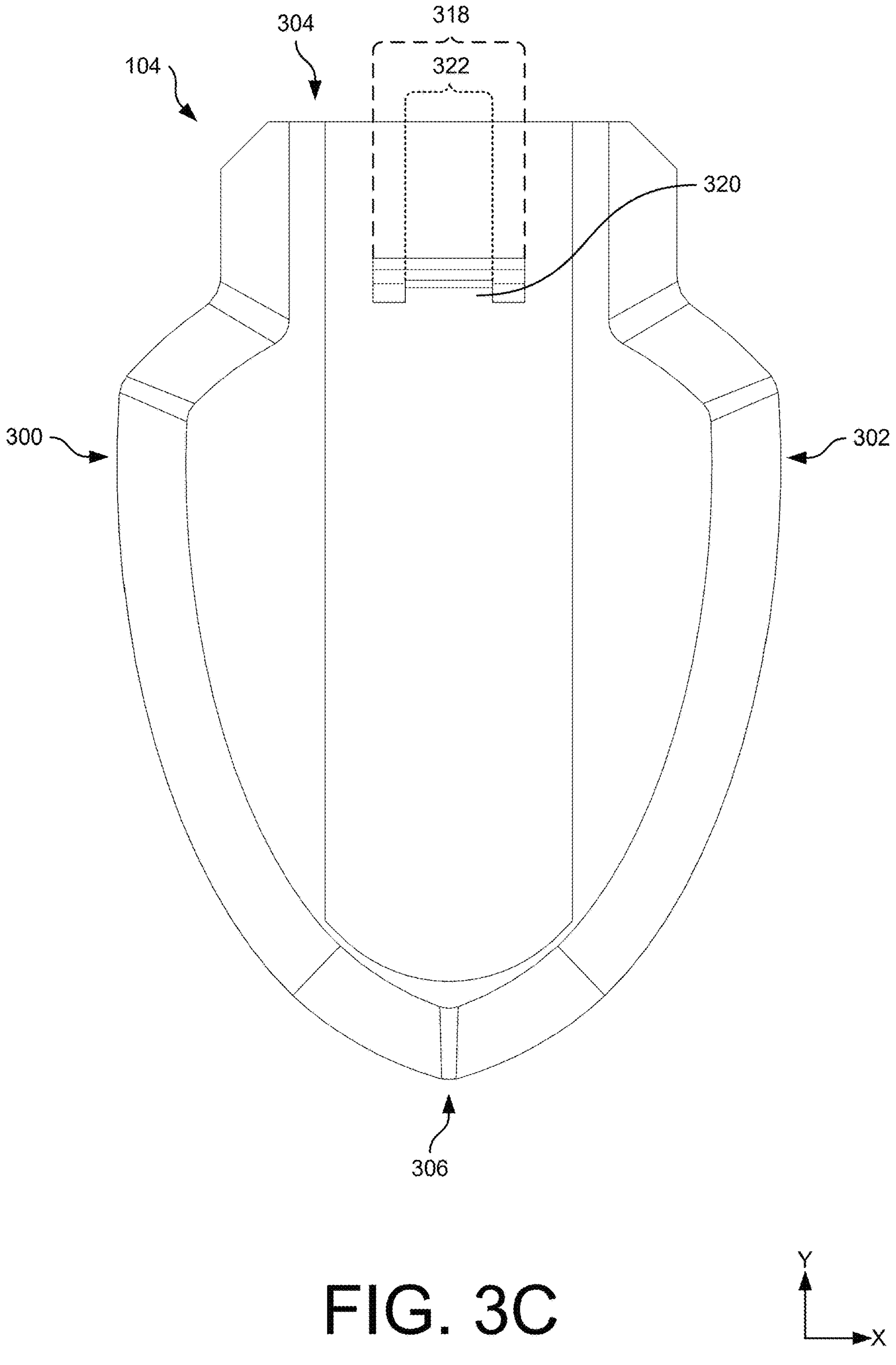
FIG. 3C illustrates a front view of the bracket of FIG. 3A, according to embodiments of the present disclosure.
Figure 3D:
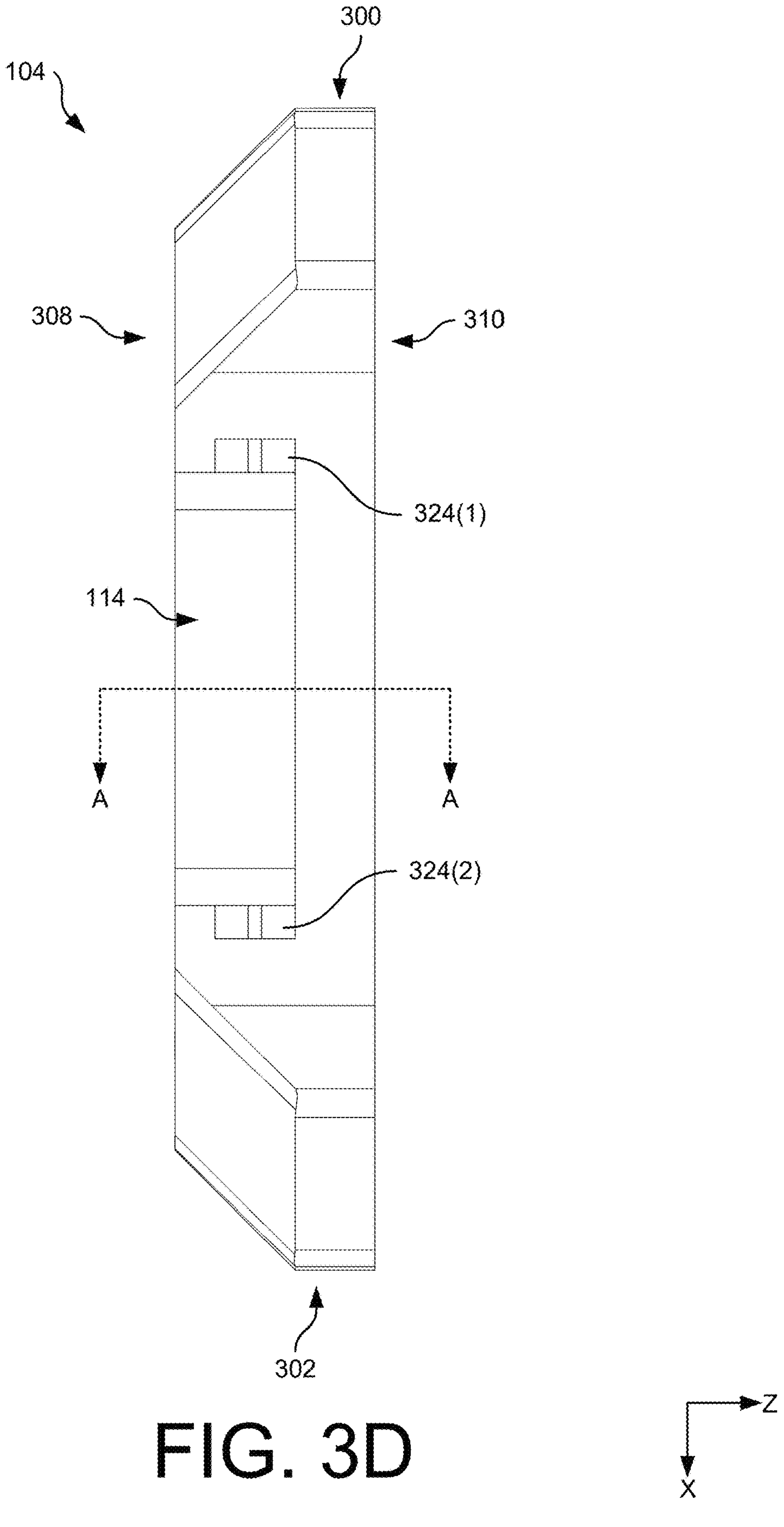
FIG. 3D illustrates a top view of the bracket of FIG. 3A, according to embodiments of the present disclosure.
Figure 3E:
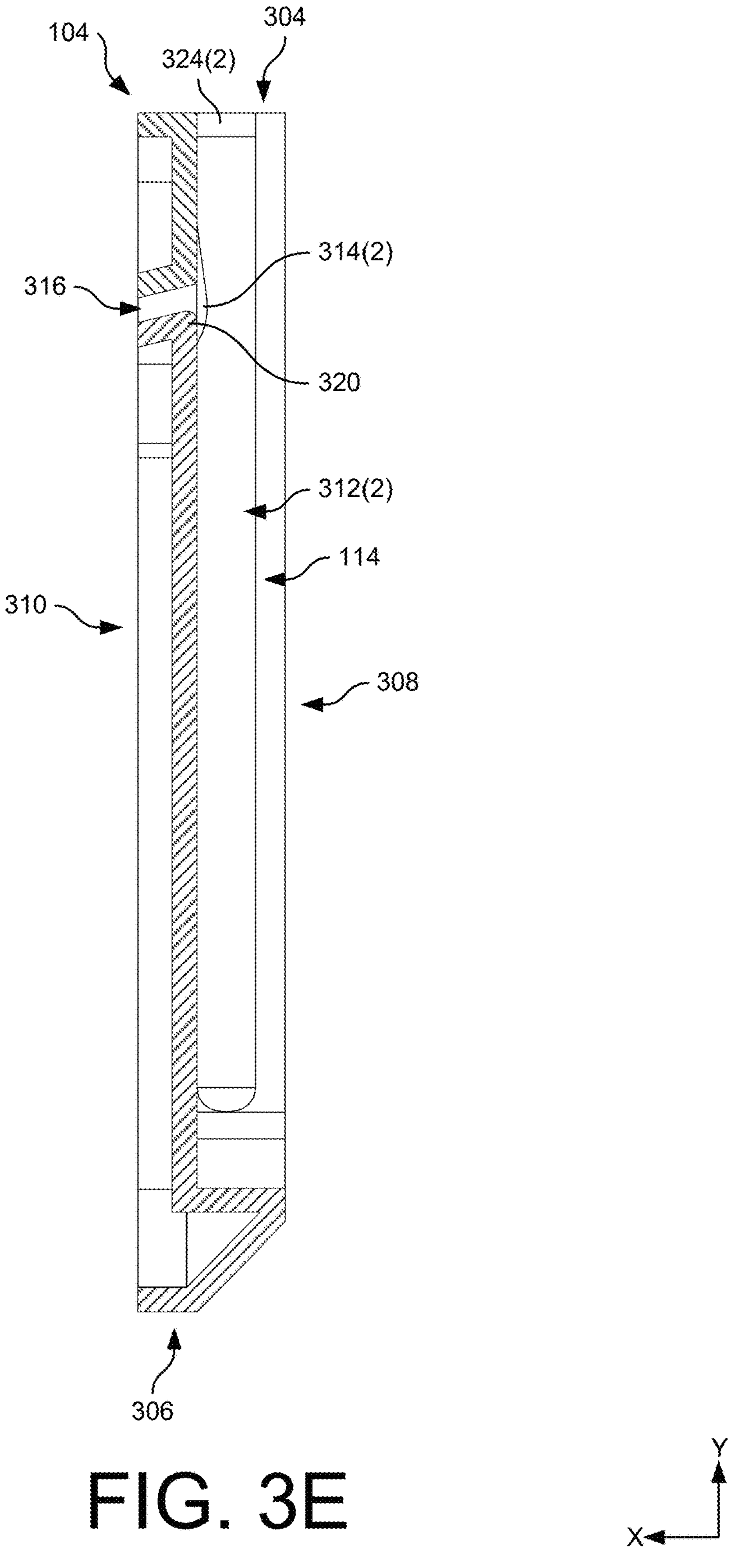
FIG. 3E illustrates a cross-sectional view of the bracket of FIG. 3A, taken along line A-A of FIG. 3D, according to embodiments of the present disclosure.
Figure 4A:
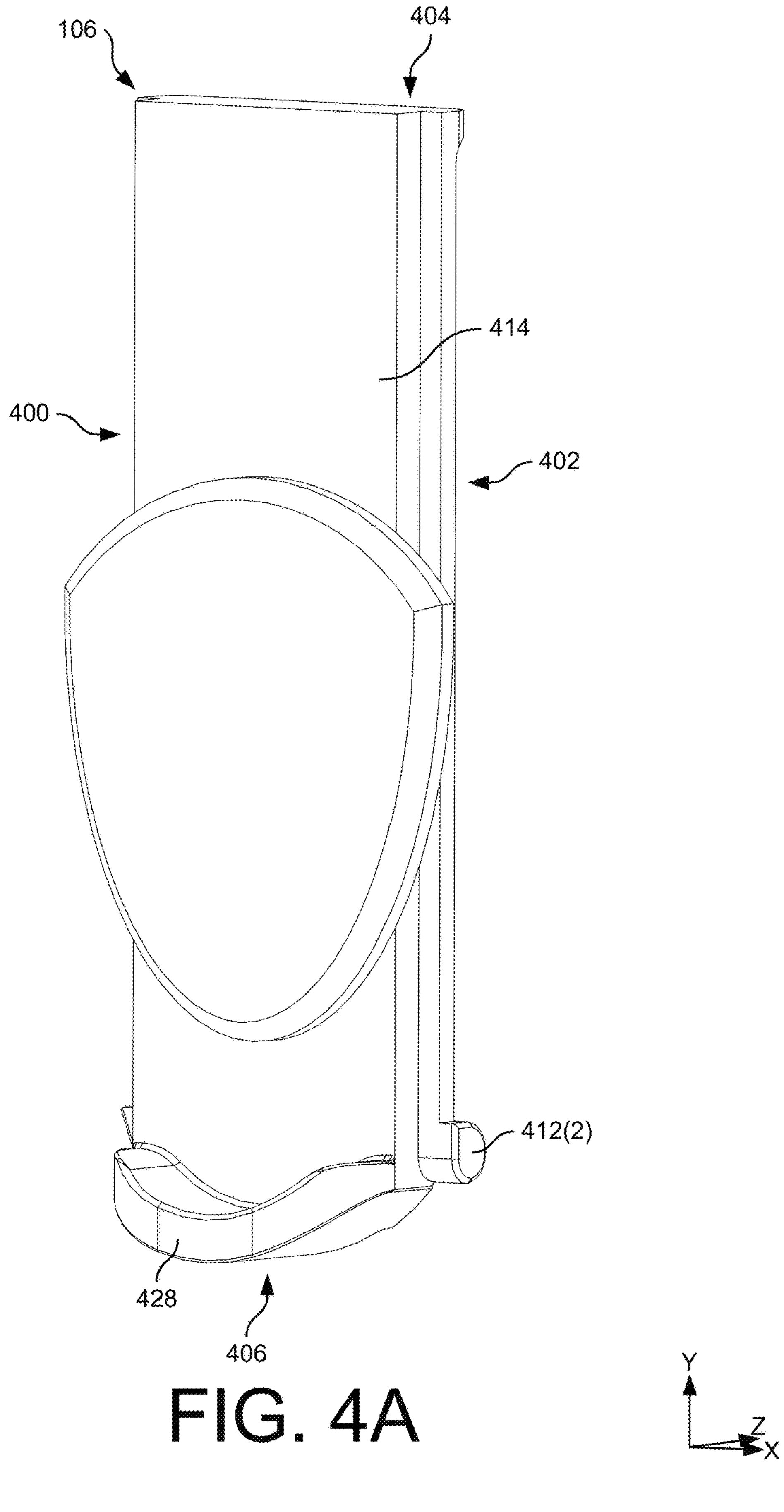
FIG. 4A illustrates an isometric view of an example slide of the clamp of FIG. 1A that engages with the bracket of FIG. 3A, according to embodiments of the present disclosure.
Figure 4B:
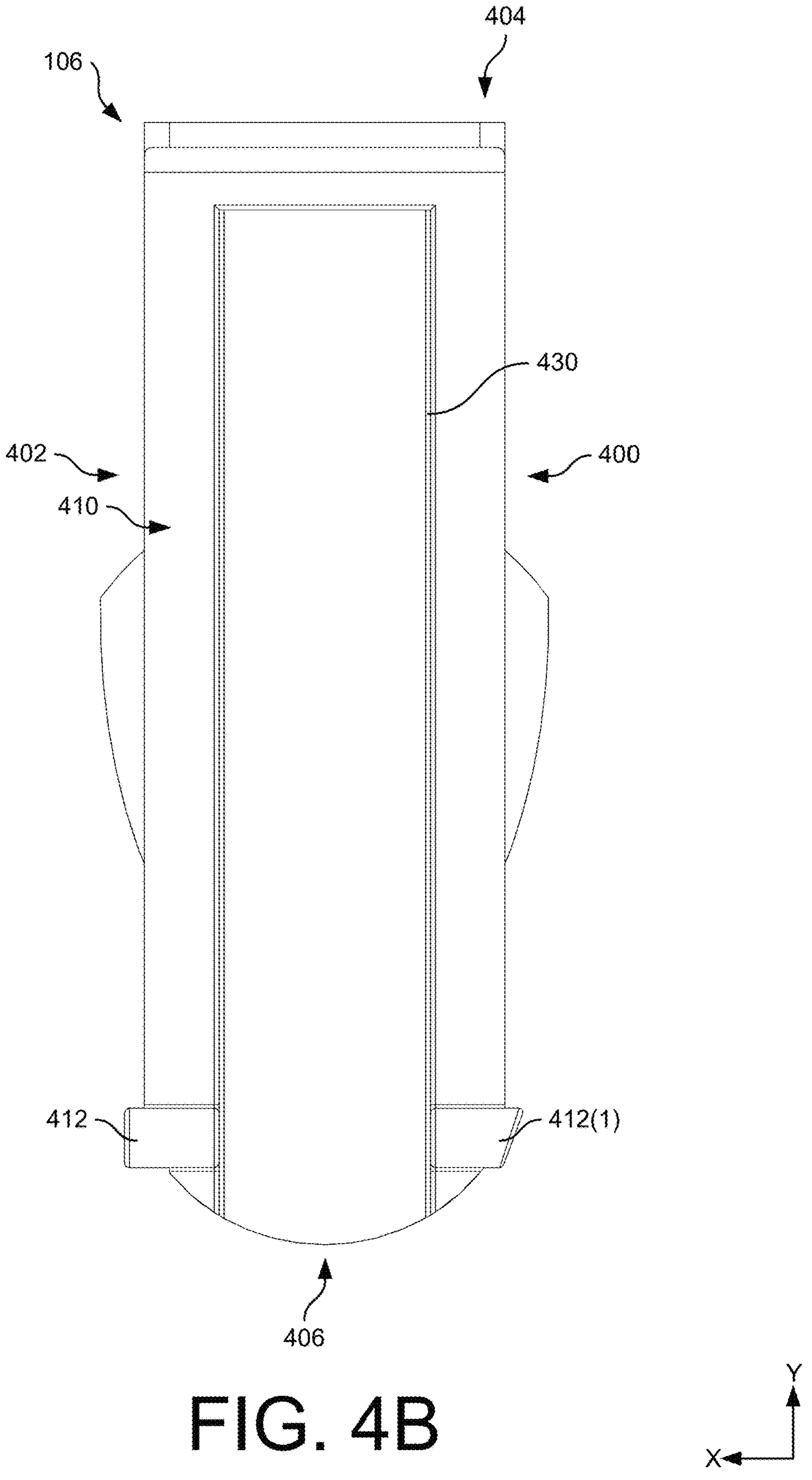
FIG. 4B illustrates a back view of the slide of FIG. 4A, according to embodiments of the present disclosure.
Figure 4C:
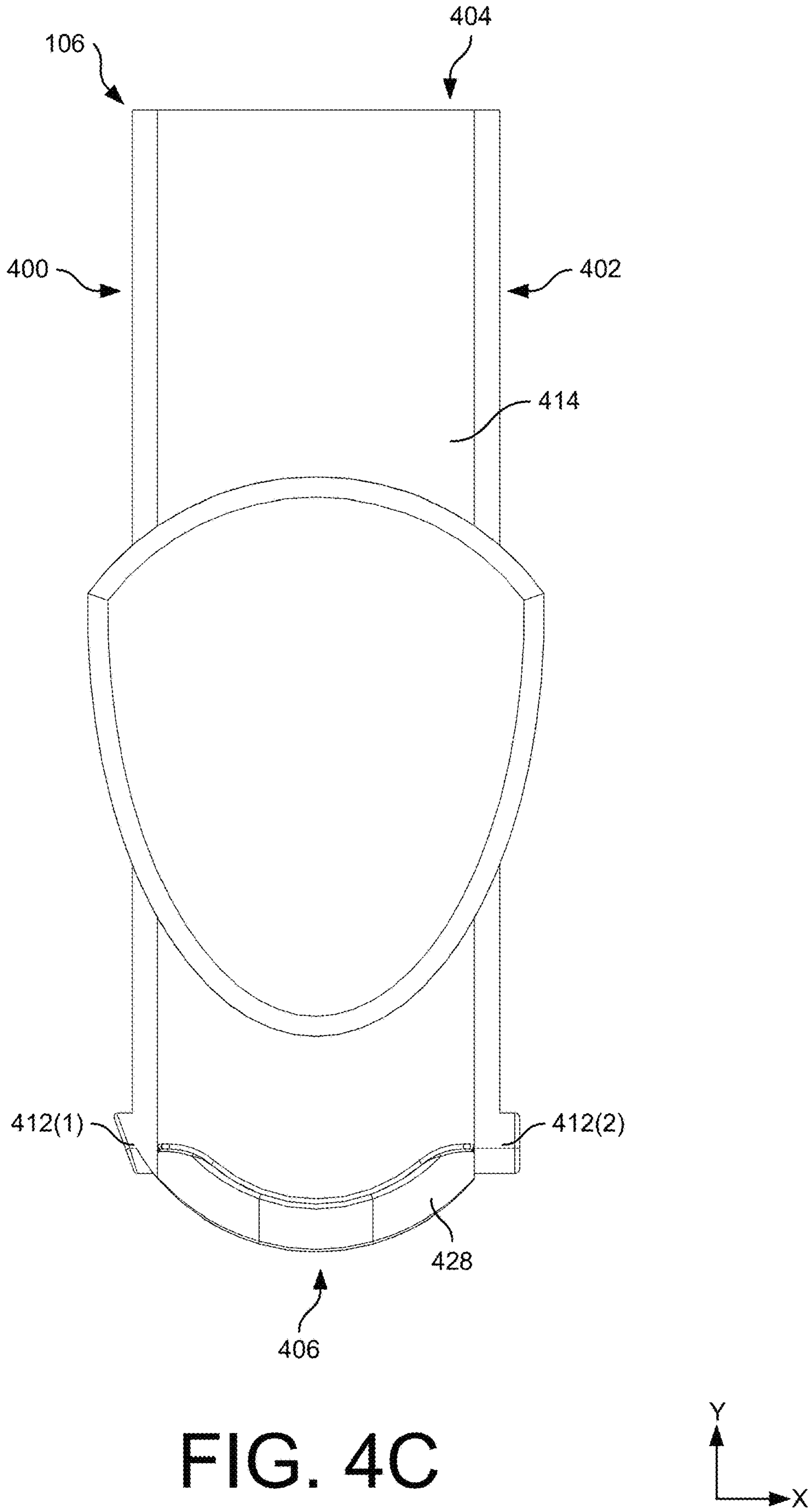
FIG. 4C illustrates a front view of the slide of FIG. 4A, according to embodiments of the present disclosure.

As shown in FIG. 3E, which illustrates a cross-sectional view of the bracket 104 taken along line A-A of FIG. 3D, the channel 316 may be angled in an upwards direction from the bottom 306 to the top 304. For example, from the back 310 to the front 308, the channel 316 may be angled upwards (e.g., in the Y-direction) from the bottom 306 to the top 304. The angling of the channel 316 may prevent disengagement between the connector 102 and the tab 320. For example, the orientation of the channel 316 may prevent the connector 102 from being pulled back through the channel 316 and/or the tab 320 disengaging within the slot 112. Additionally, the angling of the channel 316 may allow the connector 102 to be pulled with an increased amount of force over the tab 320.

FIGS. 4A-4D illustrate details of the slide 106, according to embodiments of the present disclosure. As introduced above, the slide 106 is configured to be at least partially received within the receptacle 114. The slide 106 may include a first side 400, a second side 402 opposite the first side 400 (e.g., in the X-direction), a top 404, a bottom 406 opposite the top 404 (e.g., in the Y-direction), a front 408, and a back 410 opposite the front 408 (e.g., in the Z-direction).

The slide 106 includes a first arm 412(1) and a second arm 412(2), which engage with the first track 312(1) and the second track 312(2), respectively. The first arm 412(1) and the second arm 412(2) may represent rods, pins, posts, bars, etc. that protrude from a central body 414 of the slide 106. The first arm 412(1) may be disposed at the first side 400, while the second arm 412(2) may be disposed at the second side 402. The first arm 412(1) and the second arm 412(2) may extend from opposing sides of the central body 414.

The first arm 412(1) and the second arm 412(2) are configured to translate (e.g., in the Y-direction) within the first track 312(1) and the second track 312(2) as the slide 106 moves between the first state and the second state, respectively. For example, the first arm 412(1) and the second arm 412(2) may move between ends of the first track 312(1) and the second track 312(2), respectively. The first arm 412(1) may engage with the first stop 324(1) and the second arm 412(2) may engage with the second stop 324(2) to prevent the slide 106 from disengaging with the bracket 104 (or within the receptacle 114).

In an embodiment, the central body 414 may vary in width at different portions thereof. For example, a first portion 416 of the central body 414 may be a first width 418 (e.g., in the X-direction), a second portion 420 of the slide 106 may be a second width 422, and a third portion 424 of the slide 106 may be a third width 426. The first width 418 may be greater than the second width 422 and/or the third width 426, and the third width 426 may be greater than the second width 422. The first portion 416 is configured to reside external to the receptacle 114, adjacent to the front 308 of the bracket 104. The second portion 420 is configured to be disposed within the receptacle 114, between the first track 312(1) and the second track 312(2). The third portion 424 may be disposed within the receptacle 114, the first track 312(1), and the second track 312(2). The third portion 424 may be disposed interior to (e.g., in the X-direction) the first stop 324(1) and the second stop 324(2). In an embodiment, the first arm 412(1) and the second arm 412(2) may extend from the third portion 424. The first arm 412(1) and the second arm 412(2) may also extend beyond the third width 426 to engage the bracket 104 with the first track 312(1) and the second track 312(2), respectively.

The slide 106 includes a handle 428 (e.g., flange, lip, etc.) for grasping by a user to transition the slide 106 between the first state and the second state. The handle 428 may be disposed proximate to the bottom 406 of the slide 106. The back 410 also includes a groove 430 (e.g., pocket, receptacle, etc.) in which a portion of the length of the connector 102 is disposed. For example, once the connector 102 is bent about the tab 320, the connector 102 may reside within the receptacle 114. When the slide 106 transitions to the second state, the connector 102 may be at least partially disposed within the groove 430.

Figure 5A:
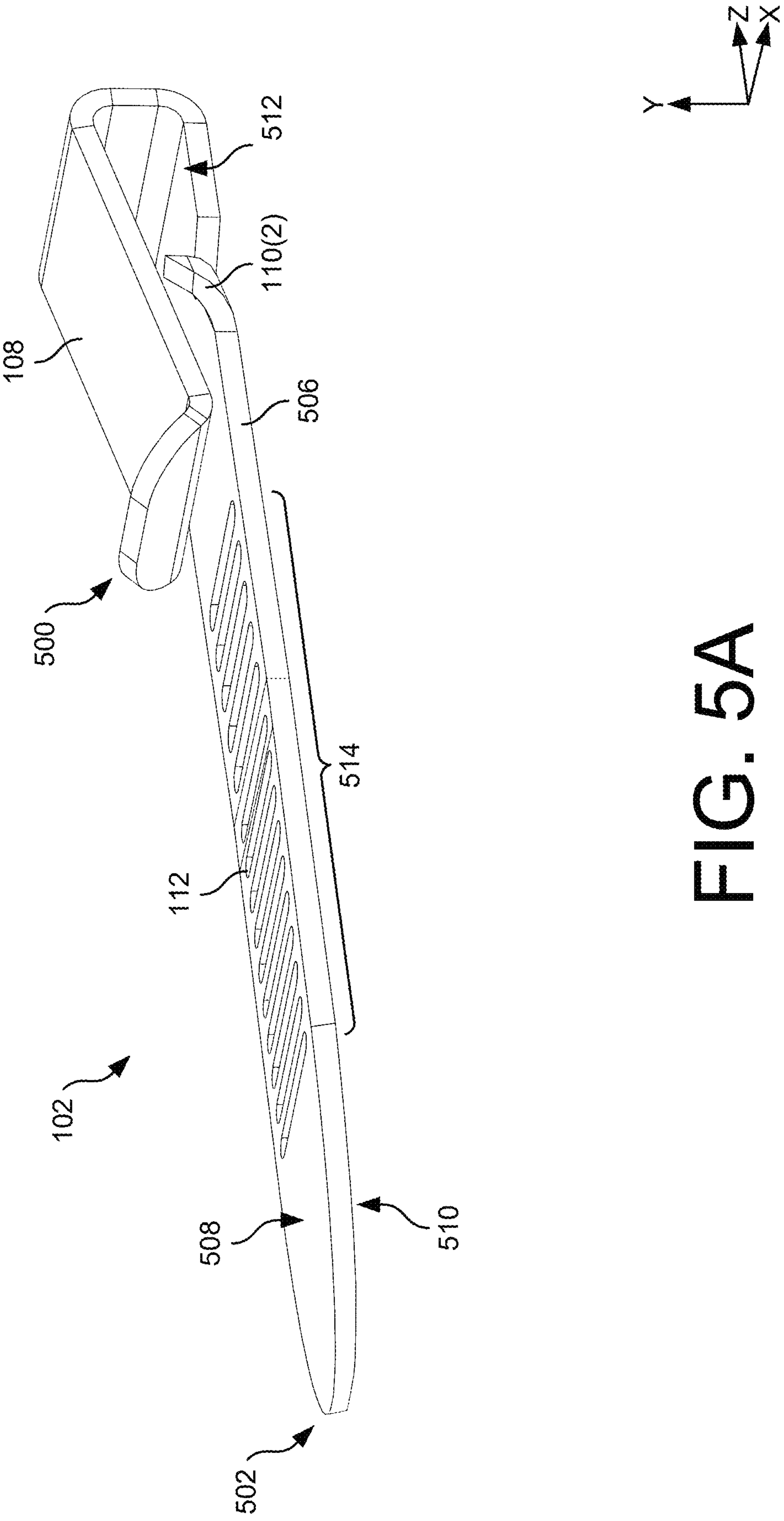
FIG. 5A illustrates an isometric view of an example connector of the clamp of FIG. 1A that engages with the bracket of FIG. 3A, according to embodiments of the present disclosure.
Figure 5B:
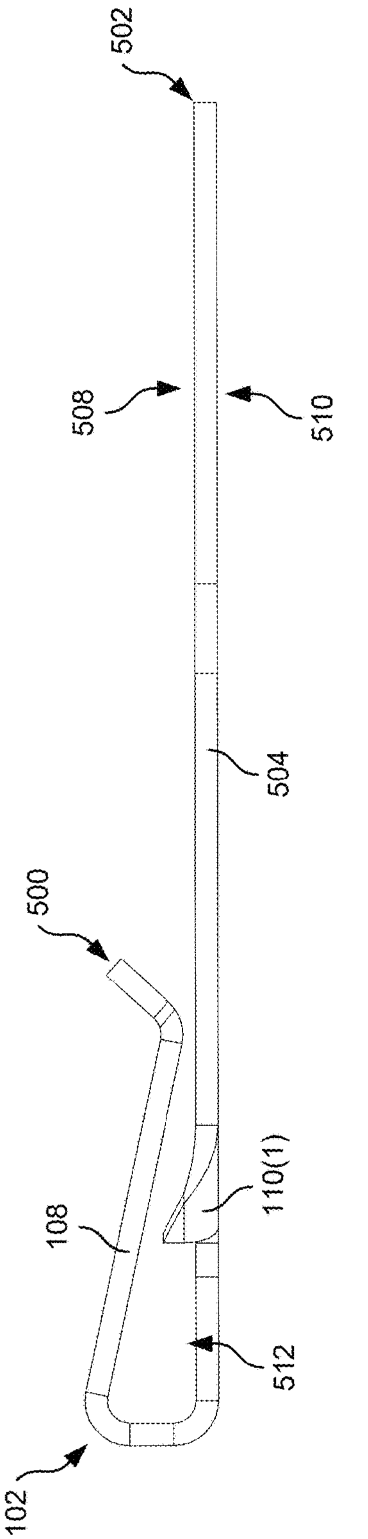
FIG. 5B illustrates a first side view of the connector of FIG. 5A, according to embodiments of the present disclosure.
Figure 5C:
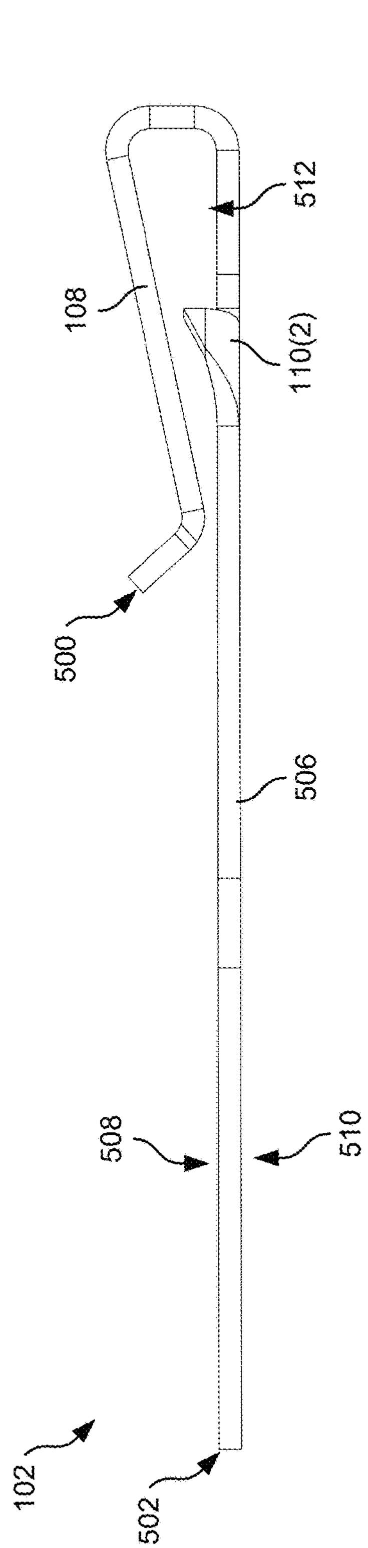
FIG. 5C illustrates a second side view of the connector of FIG. 5A, according to embodiments of the present disclosure.

FIGS. 5A-5C illustrate the connector 102, according to embodiments of the present disclosure. The views of the connector 102 in FIGS. 5A-5C illustrate the connector 102 in an unbent state. However, as will be discussed herein, the connector 102 may be bent (e.g., about the X-axis) once disposed through the channel 316.

The connector 102 may represent an elongated member, having a first end 500 and a second end 502 opposite the first end 500 (e.g., in the Z-direction), a first side 504, a second side 506 opposite the first side 504 (e.g., in the X-direction), a top 508, a bottom 510 opposite the top 508 (e.g., in the Y-direction). As introduced above, the connector 102 defines the clip 108 for securing the connector 102 to the frame 202. The clip 108 may be defined by a section of the connector 102 bent over itself. For example, the first end 500 of the connector 102 may be bent over a section of the connector 102, thereby forming the clip 108. The clip 108, or the connector 102, defines a receptacle 512 that receives the flange 204, or in which the flange 204 is configured to be disposed.

The slots 112 may be disposed through the connector 102, between the top 508 and the bottom 510, in a direction from the first side 504 to the second side 506. The slots 112 may take any shape, such as being rectangular. The slots 112 may be disposed along a length 514 of the connector 102, between the first end 500 and the second end 502. Any number of the slots 112 may be disposed along the length 514 to enable the connector 102 to be pulled to be disposed by varying degrees through the channel 316 to engage the tab 320, as well as to accommodate differently sized solar panel modules (or frames) and/or the barriers 200. The slots 112 may be sized, both in width (e.g., in the X-direction) and depth (e.g., in the Z-direction) to engage the tab 320.

As introduced above, the connector 102 includes the engagement mechanisms(s) such as the prongs 110 that engage with flange 204. For example, the prongs 110 may include a first prong 110(1) and a second prong 110(2). The first prong 110(1) may be disposed along the first side 504 of the connector 102, while the second prong 110(2) may be disposed along the second side 506 of the connector 102. The prongs 110 may notch or dig into the flange 204 of the frame 202. As the clip 108 is advanced onto the flange 204, a portion of the clip 108 may partially deflect, and the deflection may cause the prongs 110 to be biased into the flange 204. The first prong 110(1) and the second prong 110(2) may represent upturned prongs, spaced above, or extending above, the top 508.

Although two of the prongs 110 are shown, the connector 102 may include more than or less than two of the prongs 110. Additionally, in an embodiment, the prongs 110 may be located differently on the connector 102 than shown and described.

FIGS. 6A-6D illustrate an example sequence for using the clamp 100 to attach the barrier 200 to the a solar panel module, according to embodiments of the present disclosure.

Figure 6A:
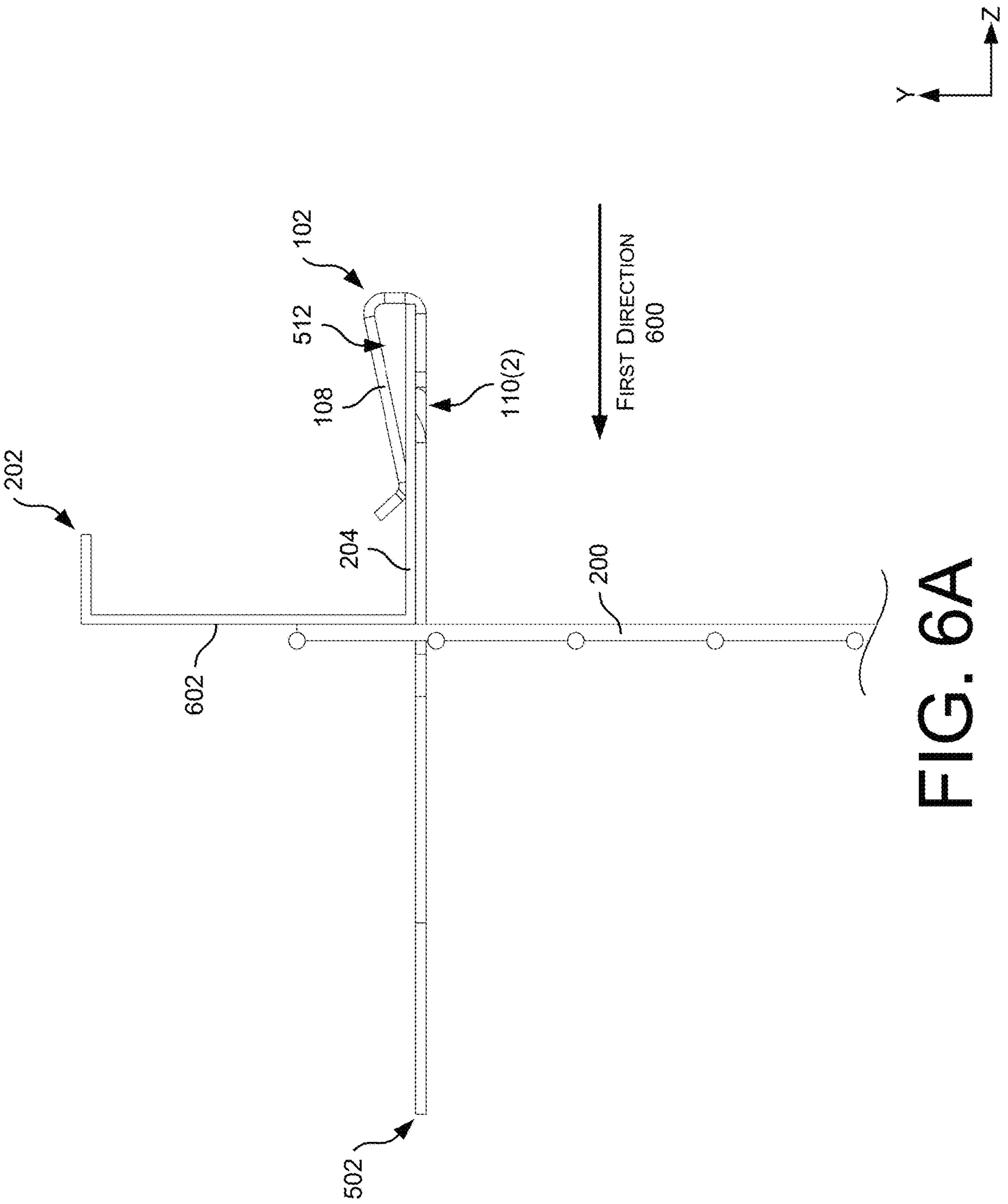
FIG. 6A illustrates a attaching of the connector of FIG. 5A to one or more solar panel modules for supporting a barrier, according to embodiments of the present disclosure.

In FIG. 6A, the connector 102 is shown being attached to the flange 204 of the frame 202. For example, the connector 102 may be slid onto the flange 204, in a first direction 600, and the flange 204 may be at least partially disposed within the receptacle 512. During this attaching, the prongs 110 may engage the flange 204. The clip 108 of the connector 102 may be used to attach the connector 102 to the flange 204. Moreover, the second end 502 of the connector 102 may be disposed through the barrier 200. For example, the second end 502 may be disposed through openings, holes, or mesh within the barrier 200. A portion of the barrier 200 between the openings, holes, or mesh may rest on the connector 102. The barrier 200 may reside adjacent to a surface 602 of the frame 202. The barrier 200 may also be adjusted (e.g., in the Y-direction) such that the barrier 200 engages the roof.

Figure 6B:
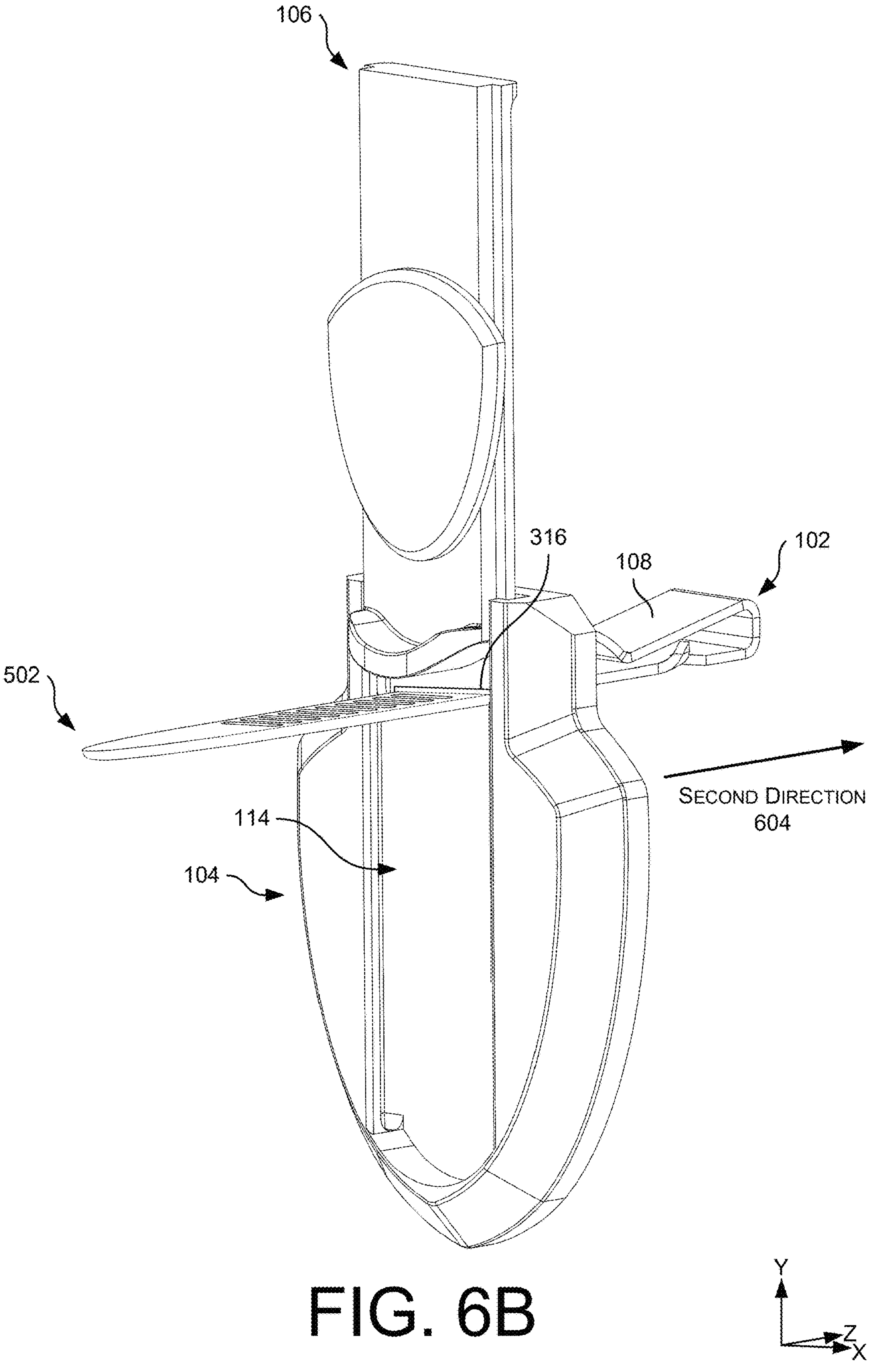
FIG. 6B illustrates an engagement between the bracket of FIG. 3A, the slide of FIG. 4A, and the connector of FIG. 5A, showing the connector in an unbent state and the slide in an open state, according to embodiments of the present disclosure.

In FIG. 6B, the second end 502 of the connector 102 may be disposed through the channel 316 of the bracket 104. In FIG. 6B, the barrier 200 is shown removed to more clearly illustrate an engagement between the connector 102 and the bracket 104. As the second end 502 is advanced through the channel 316, the bracket 104 may be pushed in a second direction 604 towards the frame 202. Pushing the bracket 104 in the second direction 604 urges the barrier 200 against the surface 602. As such, the barrier 200 may be secured between the surface 602 and the back 310 of the bracket 104. The engagement between the connector 102 and the flange 204 may anchor the connector 102 to the frame 202, as the user holds the second end 502 and/or pushes the bracket 104 in the second direction 604.

As also shown in FIG. 6B, the slide 106 may be in the first state, so as to not interfere with the second end 502 advancing through the channel 316. The slide 106 may be maintained in the first state via the first arm 412(1) and the second arm 412(2) abutting against the first projection 314(1) and the second projection 314(2), respectively.

Figure 6C:
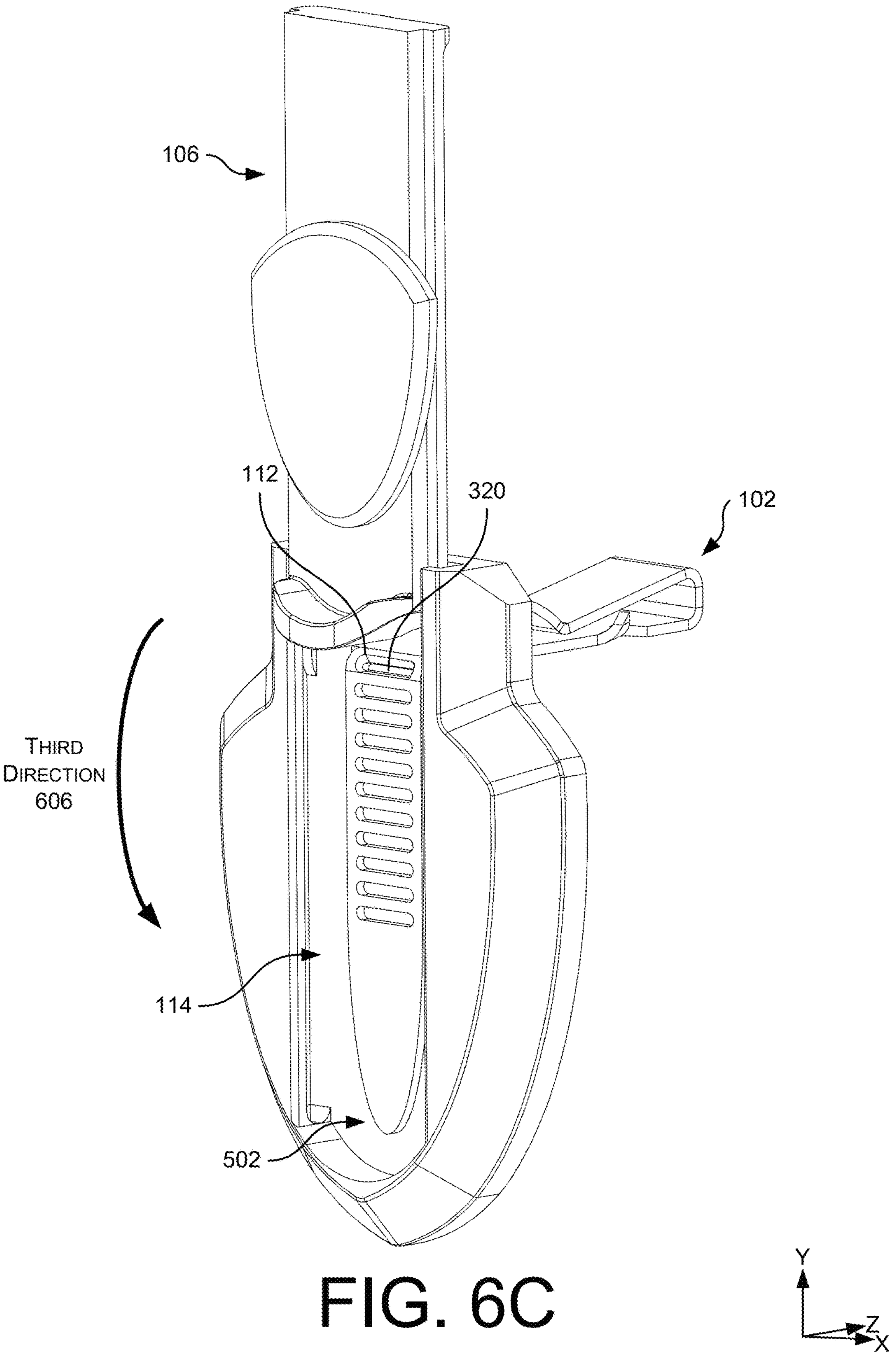
FIG. 6C illustrates an engagement between the bracket of FIG. 3A, the slide of FIG. 4A, and the connector of FIG. 5A, showing the connector in a bent state, according to embodiments of the present disclosure.

In FIG. 6C, the second end 502 of the connector 102 may be urged in a third direction 606 (e.g., about the X-axis). In FIG. 6C, the barrier 200 is shown removed to more clearly illustrate an engagement between the connector 102 and the bracket 104. For example, once the second end 502 is disposed through the bracket 104 and the bracket 104 is advanced in the second direction 604, the connector 102 may be bent in the third direction 606. During bending of the connector 102, the tab 320 may engage within one of the slots 112. Such engagement may maintain a tautness of the bracket 104 against the frame 202, thereby preventing the connector 102 from backing out of the channel 316. Once the connector 102 is bent, a portion of the length of the connector 102 may reside within the receptacle 114.

Figure 6D:
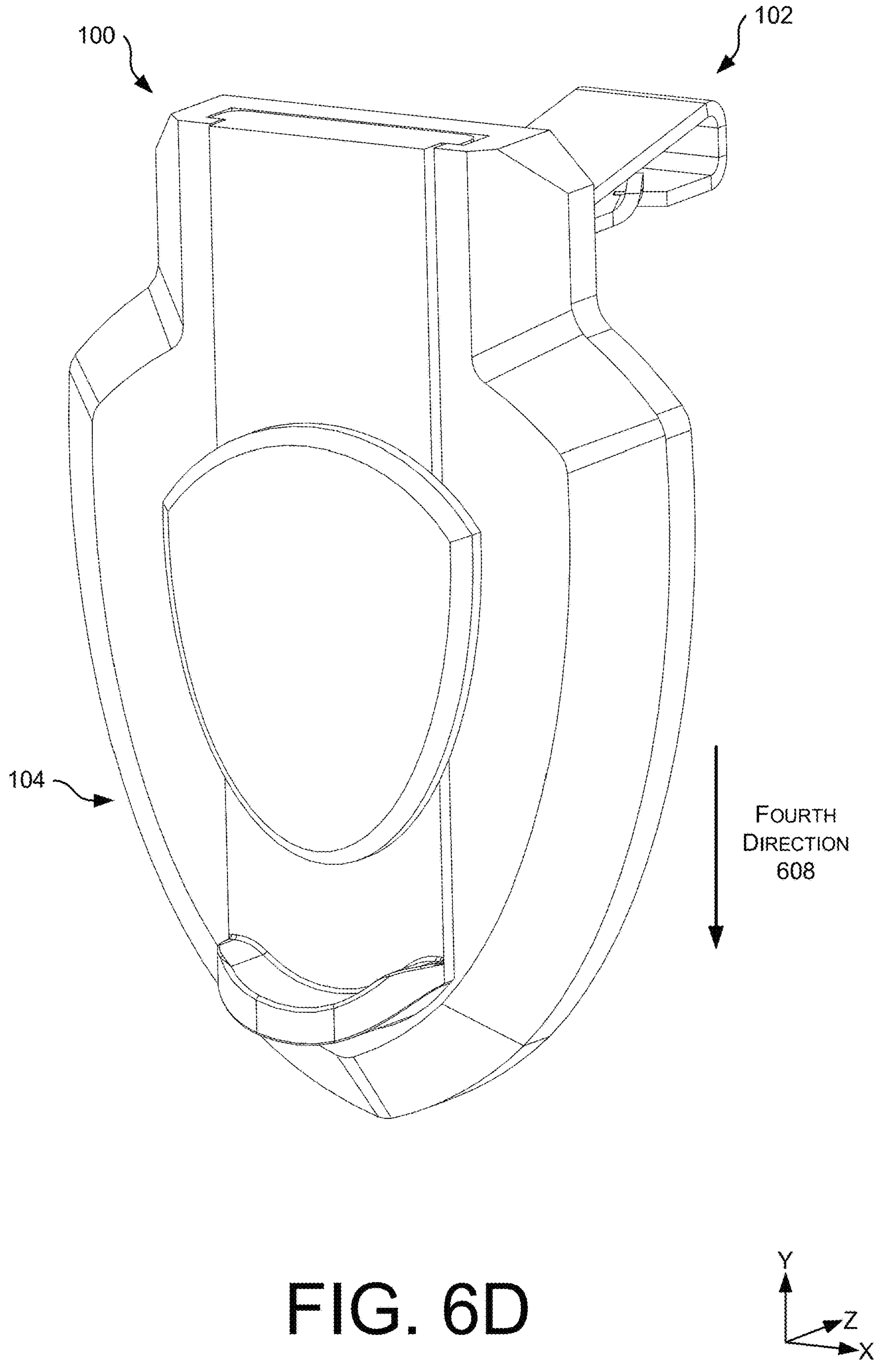
FIG. 6D illustrates an engagement between the bracket of FIG. 3A, the slide of FIG. 4A, and the connector of FIG. 5A, showing the slide in a closed state, according to embodiments of the present disclosure.

In FIG. 6D, the slide 106 may transition to the second state. During transitioning of the slide 106 to the second state, the first arm 412(1) and the second arm 412(2) may traverse over the first projection 314(1) and the second projection 314(2), respectively. For example, the slide 106 may move in a fourth direction 608. As the slide 106 moves in the fourth direction 608, a portion of the length of the connector 102 and the second end 502 become disposed in the groove 430. In the second state of the slide 106, access to the second end 502 is restricted to prevent tampering with the clamp 100. Moreover, in the second state, the connector 102 may be prevented from disengaging with the tab 320.

From time to time, the solar panel modules may need to be replaced, repaired, etc. The clamp 100 (or portions thereof) may unattachfrom the solar panel modules to provide such access. For example, the slide 106 may transition from the second state to the first state, in a direction opposite to the fourth direction 608. Thereafter, the connector 102 may be bent in a direction opposite the third direction 606, for example, thereby making the connector 102 substantially straight (e.g., planar). The connector 102 may then be pulled through the channel 316 in the bracket 104, via pulled the bracket 104 in a direction opposite to the second direction 604. Therein, the barrier 200 may be pulled off the connector 102. The clamp 100 may therefore be removably attached to the solar panel module to permit maintenance. In an embodiment, in the first state, the connector 102 may be unsecured to the bracket 104. For example, the connector 102 may be unbent and advanced through the channel 316.

Any number of the clamps 100 may be used to secure the barrier 200 to the solar panel modules, and/or the clamps 100 may be disposed any number of the solar panel modules to secure the barrier 200. In an embodiment, the clamps 100 may be used to secure the barrier 200 around a periphery of the solar panel modules.

Figure 7A:
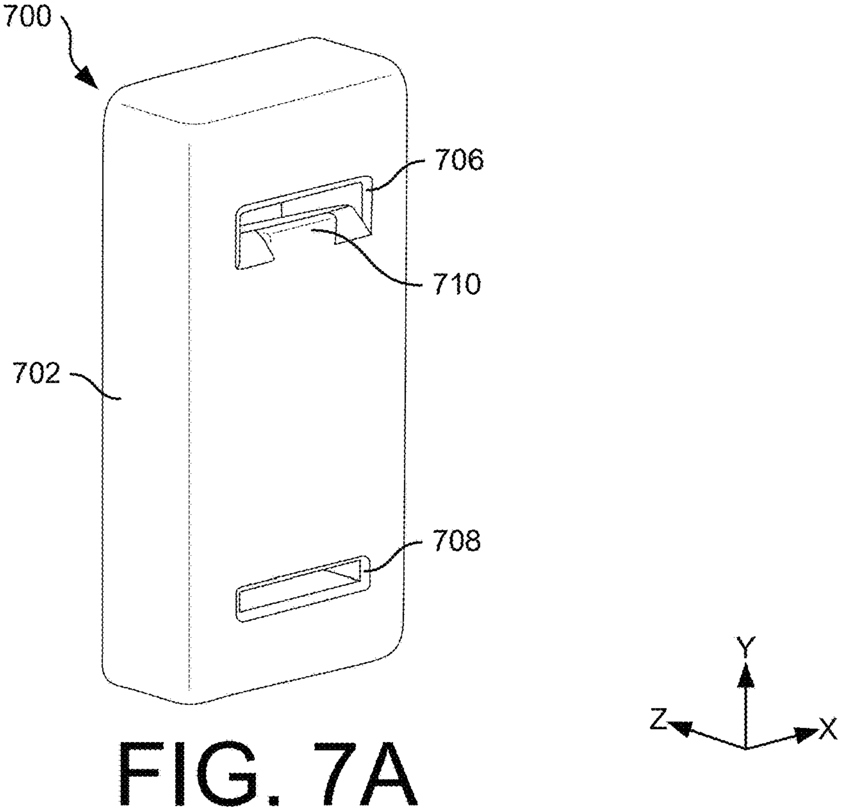
FIG. 7A illustrates an isometric view of an alternative clamp, according to embodiments of the present disclosure.
Figure 7B:
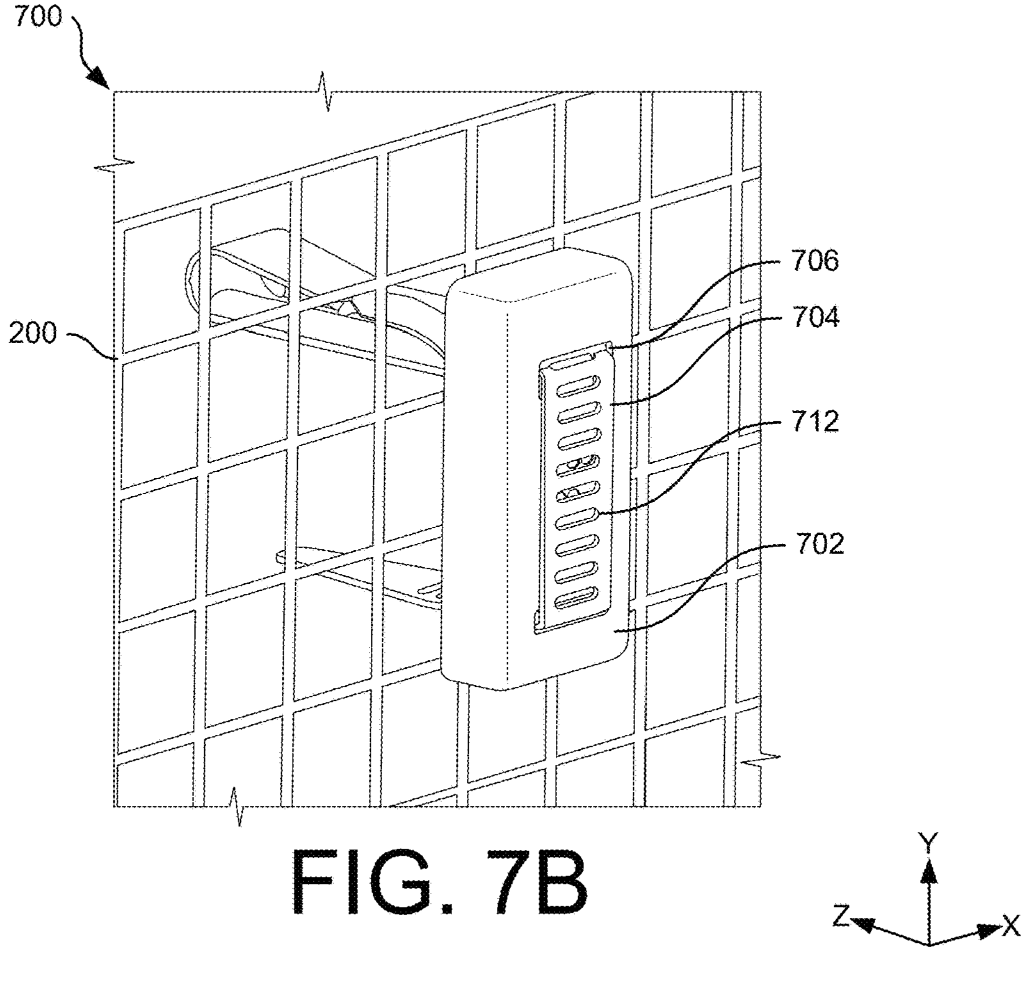
FIG. 7B illustrates an isometric view of the clamp of FIG. 7A attaching to a barrier, according to embodiments of the present disclosure.

FIGS. 7A and 7B illustrate an alternative clamp 700 that may be used to attach the barrier 200 to the solar panel module, according to embodiments of the present disclosure. In an embodiment, the clamp 700 may include a bracket 702 and a connector 704. The bracket 702 may include a first channel 706 and a second channel 708 through which the connector 704 is at least partially disposed. Additionally, the bracket 702 may include a tab 710 disposed within the first channel 706. The tab 710 is configured to engage with slots 712 of the connector 704. The connector 704 may be similar to the connector 102.

Functionally, the operation of the clamp 700 to secure the barrier 200 to the solar panel module may be similar to the clamp 100. For example, the connector 704 may be secured to the frame 202, such as the flange 204, and an end of the connector 704 may be disposed through the barrier 200. The end of the connector 704 may then be disposed (e.g., fed) through the first channel 706, and the bracket 702 may be pushed against the barrier 200, thereby securing the barrier 200 between the bracket 702 and the solar panel module. The connector 704 may be bent, thereby engaging or disposing the tab 710 within one of the slots 712. To keep the clamp 700 secured, the end of the connector 704 may be disposed through the second channel 708, back in a direction towards the barrier 200.

Figure 8:
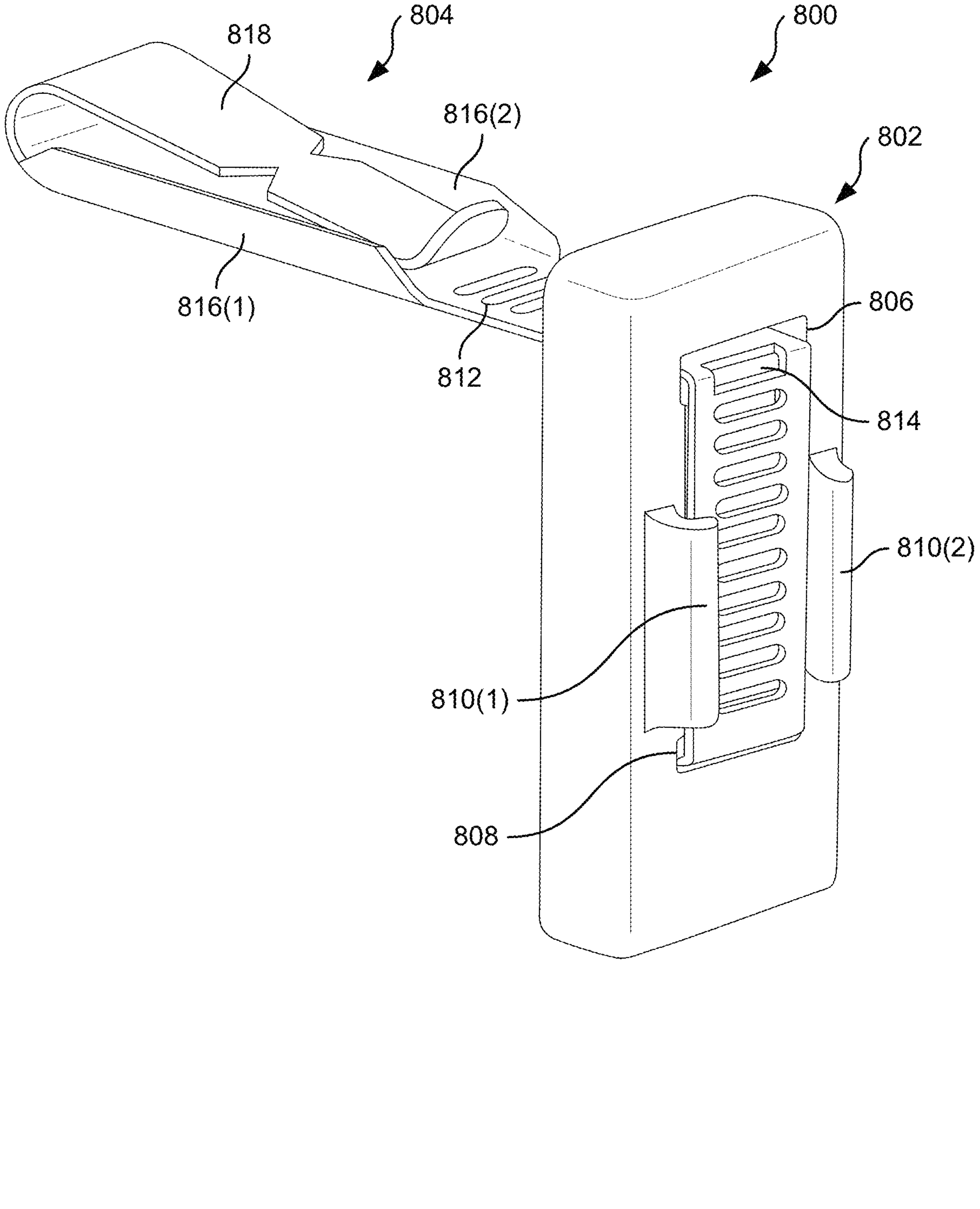
FIG. 8 illustrates an isometric view of an alternative clamp, according to embodiments of the present disclosure.

FIG. 8 illustrates an alternative clamp 800 that may be used to attach the barrier 200 to the solar panel module, according to embodiments of the present disclosure. In an embodiment, the clamp 800 may include a bracket 802 and a connector 804. The bracket 802 may include a first channel 806 and a second channel 808 through which the connector 804 is at least partially disposed. Additionally, the bracket 802 may include a first clasp 810(1) and a second clasp 810(2) that assist in securing the connector 804 to the bracket 802. The first clasp 810(1) and the second clasp 810(2) may be representative of hooks, tabs, flanges, etc. that engage with the connector 804.

The connector 804 may be similar to the connector 102 and/or the connector 704. For example, the connector 804 may include slots 812 that engage with a tab 814 of the bracket 802. The tab 814 may be disposed within the first channel 806. The connector 804 may include a first flange 816(1) and a second flange 816(2) that engage with the flange 204 of the frame 202. The first flange 816(1) and the second flange 816(2) may represent upturned flanges that engage with a bottom of the flange 204. In an embodiment, the first flange 816(1) and the second flange 816(2) may increase a biasing force of a clip 818 of the connector 804 against the flange 204.

Functionally, the operation of the clamp 800 to secure the barrier 200 to the solar panel module may be similar to the clamp 100 and/or the clamp 700. For example, the connector 804 may be secured to the frame 202, such as the flange 204, and an end of the connector 804 may be disposed through the barrier 200. The end of the connector 804 may then be disposed (e.g., fed) through the first channel 806, and the bracket 802 may be pushed against the barrier 200, thereby securing the barrier 200 between the bracket 802 and the solar panel module. The connector 804 may be bent, thereby engaging or disposing the tab 814 within one of the slots 812. To keep the clamp 800 secured, the end of the connector 804 may be disposed through the second channel 808, back in a direction towards the barrier 200. Additionally, the first clasp 810(1) and the second clasp 810(2) may engage with the connector 804 to prevent the connector 804 from being unattached. For example, the first clasp 810(1) and the second clasp 810(2) may hold the connector 804 against the bracket 802.

Figure 9A:
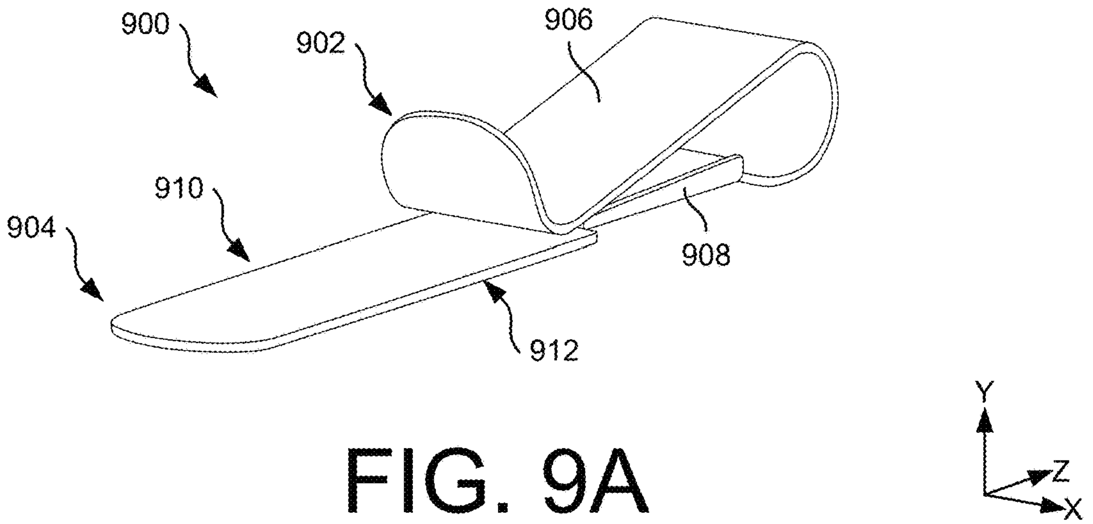
FIG. 9A illustrates an isometric view of an alternative clamp, according to embodiments of the present disclosure.
Figure 9B:
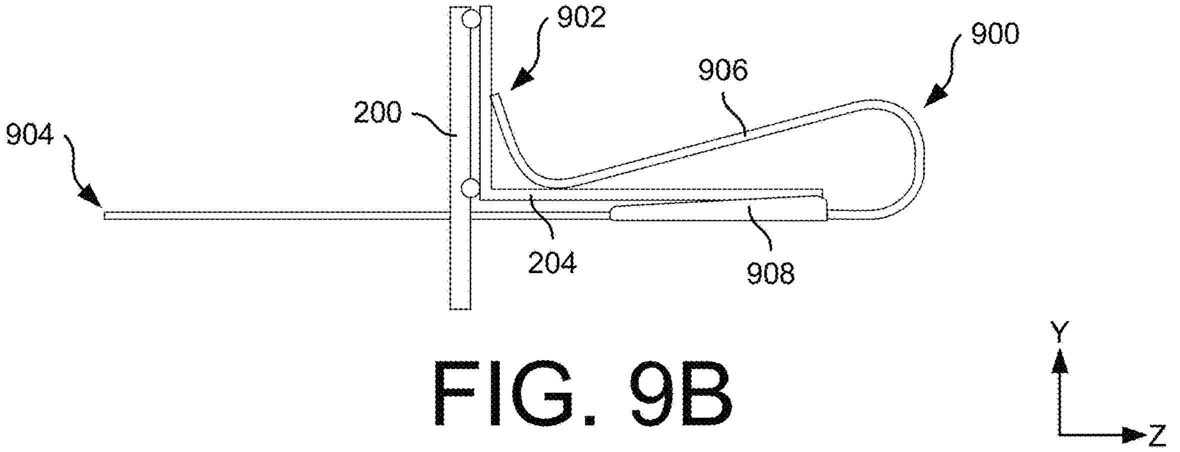
FIG. 9B illustrates a side view of the clamp of FIG. 9A, according to embodiments of the present disclosure.
Figure 9C:
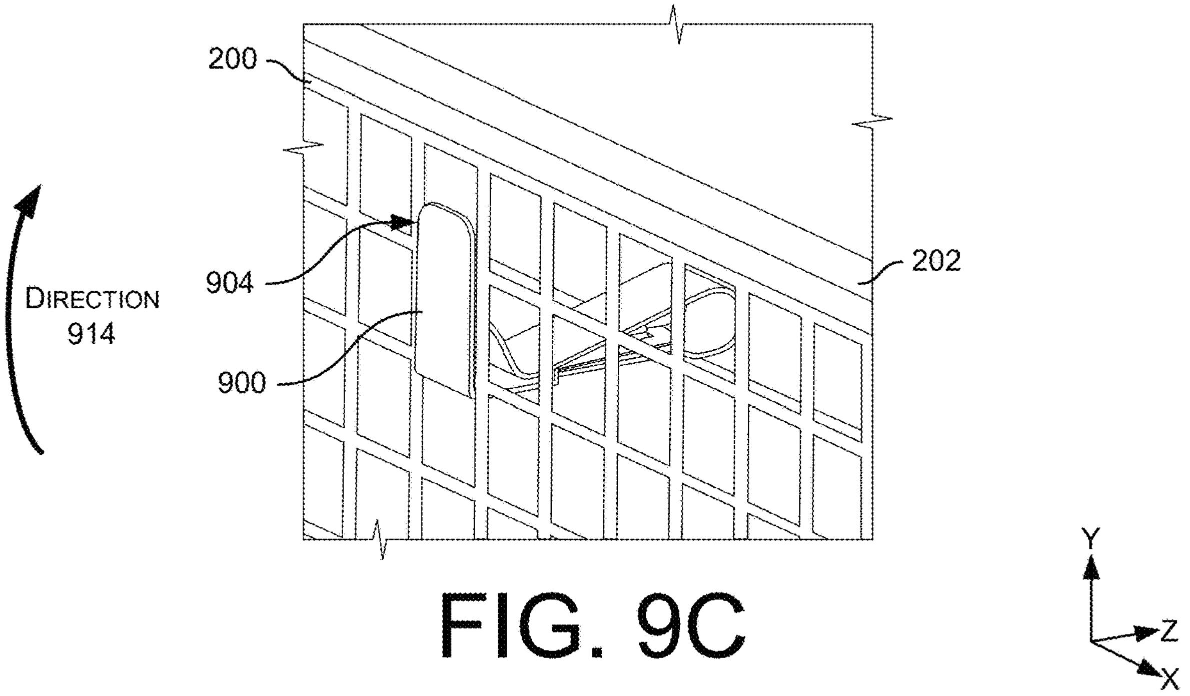
FIG. 9C illustrates an isometric view of the clamp of FIG. 9A attaching to a barrier, according to embodiments of the present disclosure.

FIGS. 9A-9C illustrate an alternative clamp 900 that may be used to attach the barrier 200 to the solar panel module, according to embodiments of the present disclosure. In an embodiment, the clamp 900 may be similar to the connector 102, the connector 704, and/or the connector 804 described above.

The clamp 900 may include a first end 902 and a second end 904 opposite the first end 902 (e.g., in the Z-direction). The clamp 100 may define a clip 906 that secures the clamp 900 to the frame 202. The clamp 900 may include flanges 908 that engage with the flange 204 of the frame 202. The flanges 908 may represent upturned flanges that engage with a bottom of the flange 204. In an embodiment, the flanges 908 may increase a biasing force of the clip 906 against the flange. The flanges 908 may be located along a first side 910 and/or a second side 912 of the clamp 900.

The clamp 900 may be secured to the frame 202, such as the flange 204. The second end 904 of the clamp 900 may be disposed through the barrier 200. Thereafter, the clamp 900 may be bent in a direction 914 (e.g., about the X-axis), thereby securing the barrier 200 against the frame 202. The clamp 900 may bend about a point of contact with the frame 202. To remove the clamp 900, the clamp 900 may be bent in a direction opposite to the direction 914.

In an embodiment, the clamp 900 may be formed via stamping, bending, and/or cutting. The clamp 900 may be made of a resilient and pliable material, such as metal (e.g., steel, aluminum, etc.).

Figure 10A:
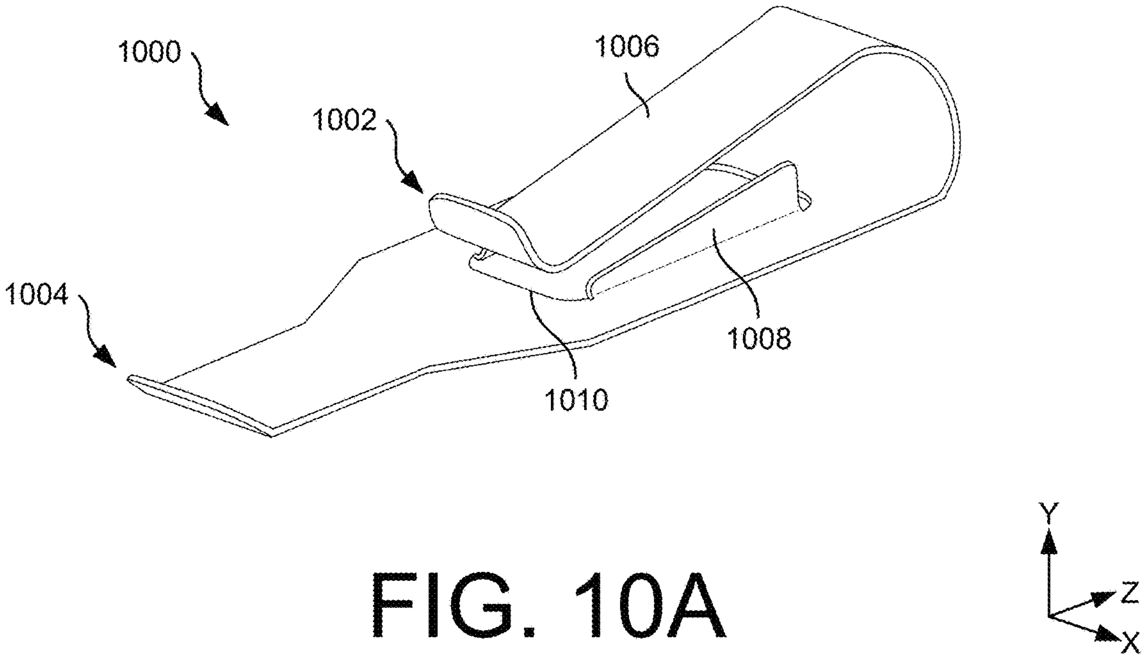
FIG. 10A illustrates an isometric view of an alternative clamp, according to embodiments of the present disclosure.
Figure 10B:
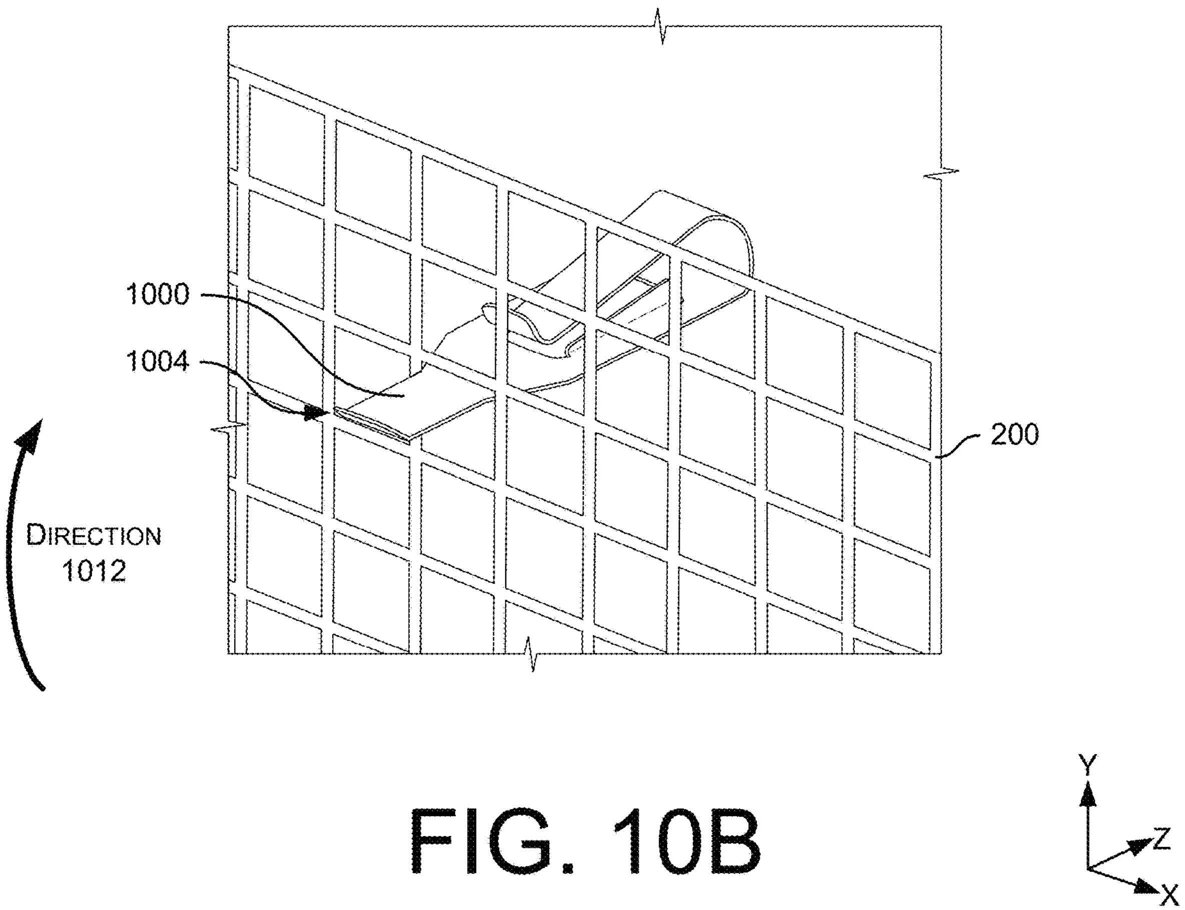
FIG. 10B illustrates an isometric view of the clamp of FIG. 10A attaching to a barrier, according to embodiments of the present disclosure.

FIGS. 10A and 10B illustrate an alternative clamp 1000 that may be used to attach the barrier 200 to the solar panel module, according to embodiments of the present disclosure. In an embodiment, the clamp 1000 may be similar to the clamp 900.

For example, the clamp 1000 may include a first end 1002 and a second end 1004 opposite the first end 1002 (e.g., in the Z-direction). The clamp 100 may define a clip 1006 that secures the clamp 1000 to the frame 202. The clamp 1000 may include flanges 1008 that engage with the flange 204 of the frame 202. The flanges 1008 may represent upturned flanges that engage with a bottom of the flange 204. In an embodiment, the flanges 1008 may increase a biasing force of the clip 1006 against the flange 208.

Compared to the flanges 908, the flanges 1008 may be spaced inward from a first side and/or a second side of the clamp 1000, respectively (e.g., in the X-direction). For example, the flanges 1008 may be formed from an aperture 1010. As the aperture 1010 is formed, for example, via stamping, the flanges 1008 may be formed.

The clamp 1000 may be secured to the frame 202, such as the flange 204. The second end 1004 of the clamp 1000 may be disposed through the barrier 200 and bent in a direction 1012 (e.g., about the X-axis), thereby securing the barrier 200 against the frame 202. The clamp 1000 may bend about a point of contact with the frame 202. To remove the clamp 1000, the clamp 1000 may be bent in a direction opposite to the direction 1012.

In an embodiment, the clamp 1000 may be formed via stamping, bending, and/or cutting. The clamp 1000 may be made of a resilient and pliable material, such as metal (e.g., steel, aluminum, etc.).

Figure 11A:
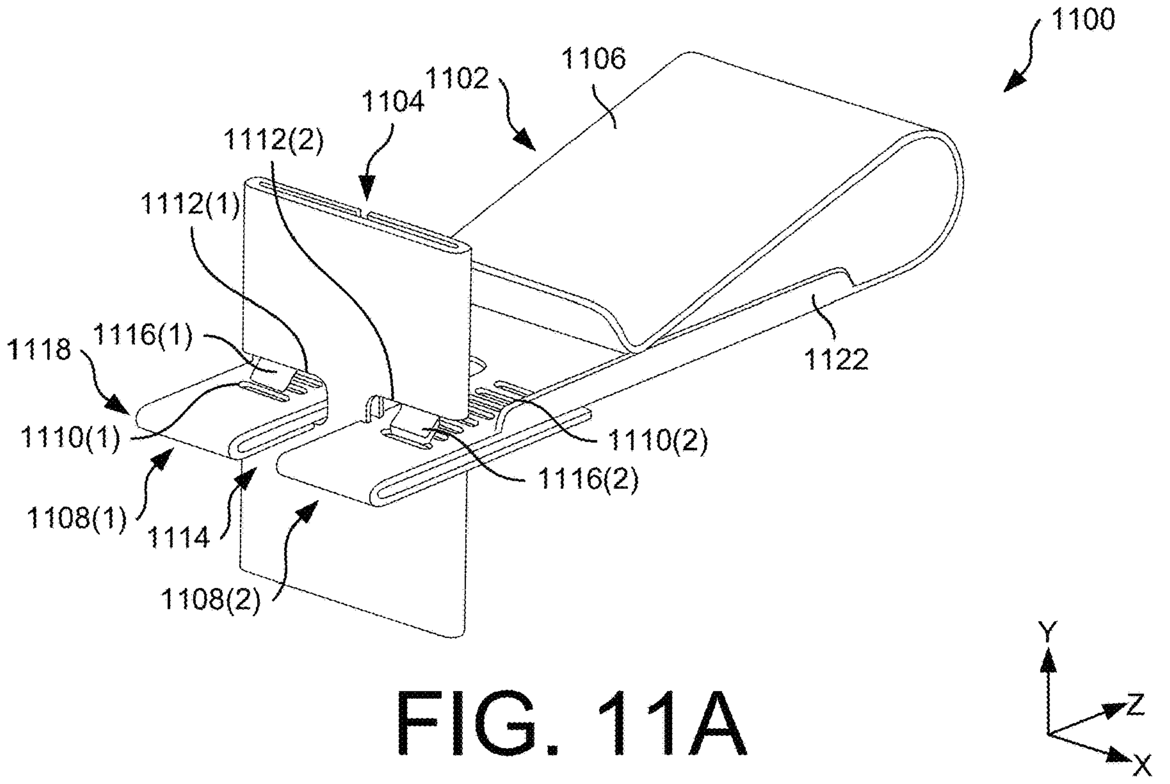
FIG. 11A illustrates an isometric view of an alternative clamp, according to embodiments of the present disclosure.
Figure 11B:
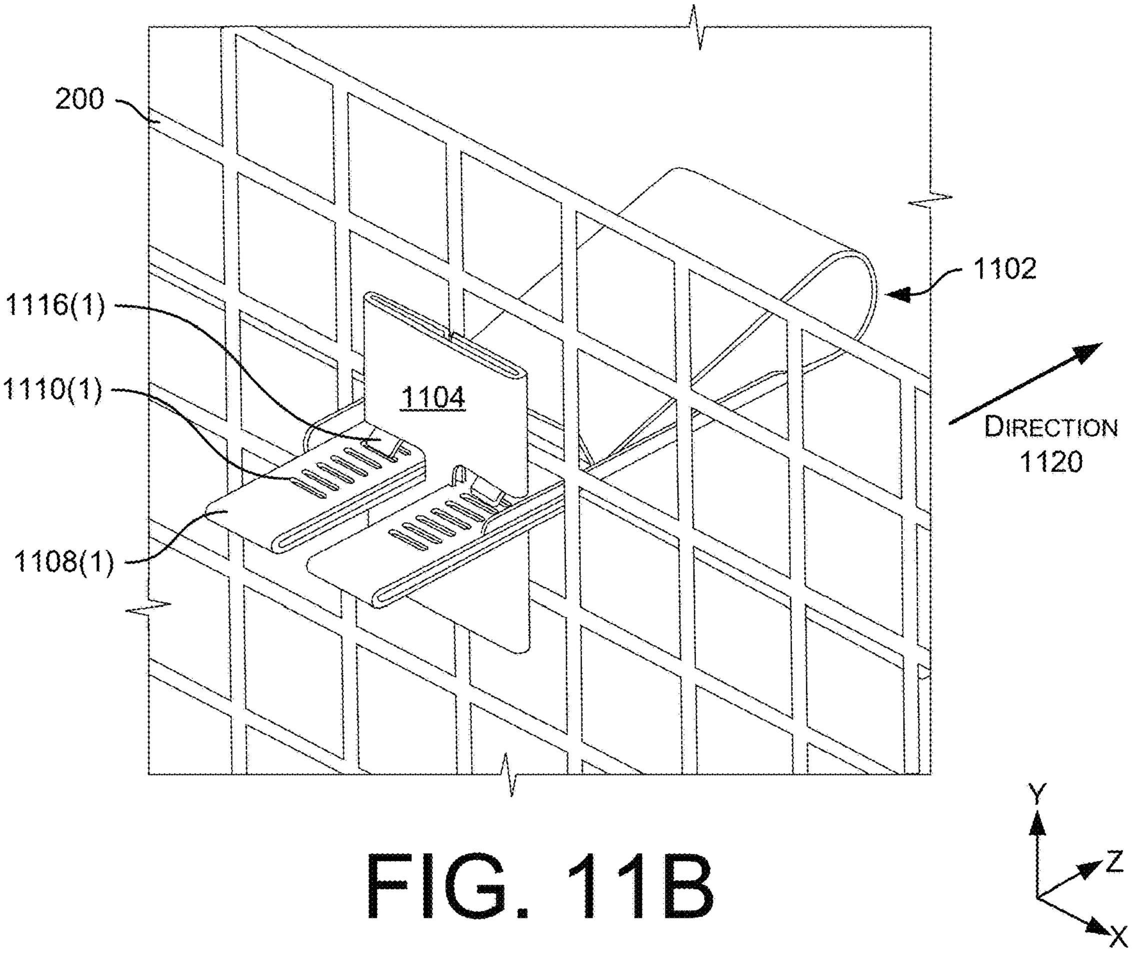
FIG. 11B illustrates an isometric view of the clamp of FIG. 11A attaching to a barrier, according to embodiments of the present disclosure.

FIGS. 11A and 11B illustrate an alternative clamp 1100 that may be used to attach the barrier 200 to the solar panel module, according to embodiments of the present disclosure.

The clamp 1100 may include a connector 1102 and a brace 1104. The connector 1102 may be similar to the clamp 900 and/or the clamp 1000. For example, the connector 1102 may include a clip 1106 that engages with the flange 204 of the frame 202, and/or flanges 1122 that engage with the flange 204 of the frame 202. The connector 1102 may include a first arm 1108(1) and a second arm 1108(2), which have first slots 1110(1) and second slots 1110(2), respectively. Any number of the first slots 1110(1) and the second slots 1110(2) may be disposed along the first arm 1108(1) and the second arm 1108(2), respectively, for accommodating differently sized barriers and/or solar panel modules.

The brace 1104 includes a body defining a first cutout 1112(1) (e.g., aperture, passage, channel) and a second cutout 1112(2) (e.g., aperture, passage, channel). A channel 1114 may be disposed between the first arm 1108(1) and the second arm 1108(2) for receiving or accommodating the brace 1104. As such, the first arm 1108(1) may be at least partially disposed within the first cutout 1112(1), and the second arm 1108(2) may be at least partially disposed within the second cutout 1112(2).

The brace 1104 includes a first tab 1116(1) (e.g., tooth, rib, etc.) and a second tab 1116(2) (e.g., tooth, rib, etc.) that engage with one of the first slots 1110(1) and one of the second slots 1110(2), respectively. For example, the brace 1104 may be slid onto the connector 1102, thereby engaging the first tab 1116(1) and second tab 1116(2) with one of the first slots 1110(1) and one of the second slots 1110(2).

The clamp 1100 may be secured to the frame 202, such as the flange 204. Therein, the barrier 200 may be slid over, onto, etc. an end 1118 of the connector 1102. The channel 1114 may accommodate lattice, mesh, etc. of the barrier 200. The brace 1104 may be advanced onto the connector 1102, via the end 1118, in a direction 1120. As the brace 1104 is advanced in the direction 1120, the first tab 1116(1) engages with one of the first slots 1110(1) and the second tab 1116(2) engages one of the second slots 1110(2). As the brace 1104 continues to be advanced in the direction 1120, the barrier 200 may become secured between the brace 1104 and the frame 202 (e.g., the surface 602 of the frame 202). Moreover, during movement of the brace 1104 in the direction 1120, the first tab 1116(1) engages with another of the first slots 1110(1) and the second tab 1116(2) engages with another of the second slots 1110(2). The engagement between the first tab 1116(1) with one of the first slots 1110(1) and the second tab 1116(2) with one of the second slots 1110(2) prevents movement of the brace 1104 in a direction opposite to the direction 1120.

In an embodiment, the clamp 1100 may be formed via stamping, bending, injection molding, machine, and/or cutting. The clamp 1100 may be made of plastic, metal, composites, etc. In an embodiment, the connector 1102 and the brace 1104 may be manufactured from similar or different materials.

Figure 12A:
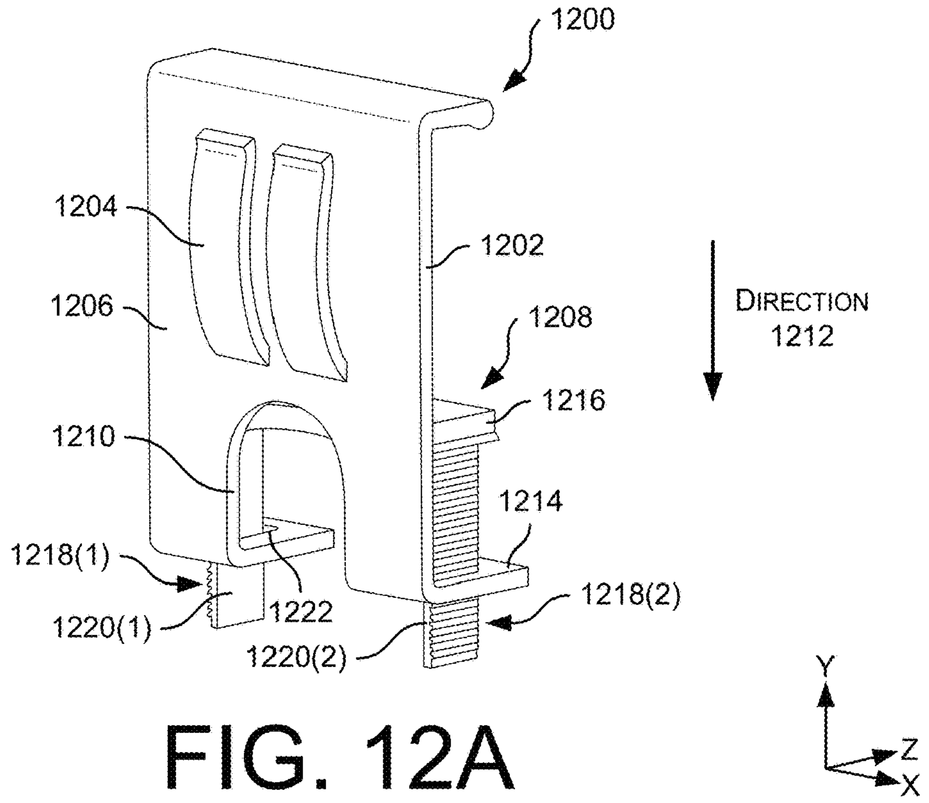
FIG. 12A illustrates an isometric view of an alternative clamp, according to embodiments of the present disclosure.
Figure 12B:
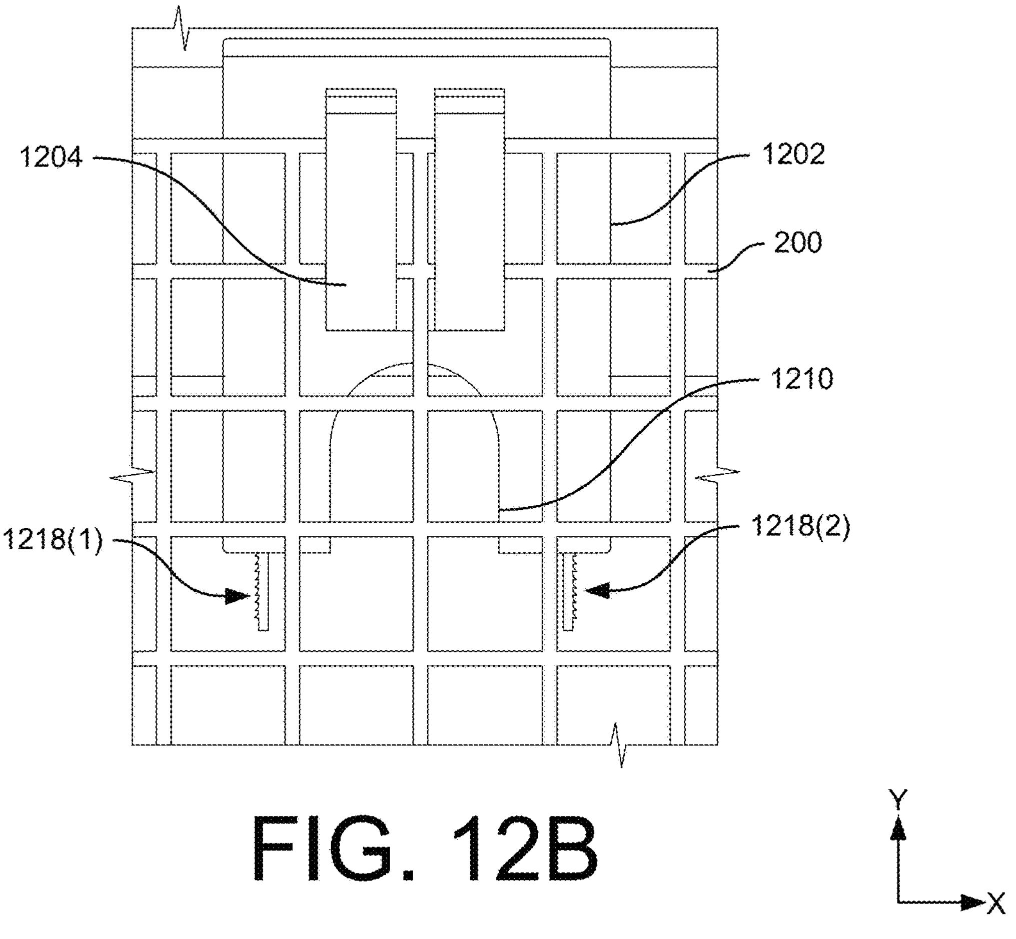
FIG. 12B illustrates an isometric view of the clamp of FIG. 12A attaching to a barrier, according to embodiments of the present disclosure.

FIGS. 12A and 12B illustrate an alternative clamp 1200 that may be used to attach the barrier 200 to the solar panel module, according to embodiments of the present disclosure.

The clamp 1200 may include a bracket 1202 defining hooks 1204 (e.g., clips, tabs, etc.). The hooks 1204 may receive at least a portion of the barrier 200 for attaching the barrier 200 to the clamp 1200. In an embodiment, the hooks 1204 may be biased (e.g., in the Z-direction) to dispose the barrier 200 between the hooks 1204 and a surface 1206 of the bracket 1202.

The clamp 1200 includes a fastening mechanism 1208 for securing a connector (not shown in FIGS. 12A and 12B) to the bracket 1202. For example, the bracket 1202 may define a channel 1210 through which the connector is at least partially disposed. The fastening mechanism 1208 may be configured to translate in a direction 1212 for securing compressing, clamping, etc. the connector between the fastening mechanism 1208 and flanges 1214 of the bracket 1202. For example, while a portion of the connector may be disposed through the channel 1210, portions of the connector may rest on the flanges 1214. As the fastening mechanism 1208 moves in the direction 1212, the connector may become compressed between a rim 1216 of the fastening mechanism 1208 and the flanges 1214. Such engagement may lock a position of the connector on the bracket 1202.

Additionally, as the fastening mechanism 1208 moves in the direction 1212, a portion of the barrier 200 (e.g., lattice) may become compressed, pinched, etc. between the rim 1216 and the connector. Such engagement may secure the clamp 1200 to the barrier 200.

The fastening mechanism 1208 may include attachment mechanisms for engaging with the bracket 1202. For example, the fastening mechanism 1208 may include first attachment mechanisms 1218(1) and second attachment mechanisms 1218(2). In an embodiment, the first attachment mechanisms 1218(1) and the second attachment mechanisms 1218(2) may be disposed on a first arm 1220(1) and a second arm 1220(2) of the fastening mechanism 1208, respectively. The first attachment mechanisms 1218(1) and the second attachment mechanisms 1218(2) may be oriented in a direction away from one another. The first attachment mechanisms 1218(1) and the second attachment mechanisms 1218(2) may represent teeth, tabs, etc. that engage with the flanges 1214, respectively.

The first arm 1220(1) and the second arm 1220(2) may be disposed through slots 1222 in the bracket 1202, or the flanges 1214 of the bracket 1202, respectively. As the fastening mechanism 1208 is translated in the direction 1212, the first attachment mechanisms 1218(1) and the second attachment mechanisms 1218(2) may engage with the flanges 1214, thereby locking the position of the fastening mechanism 1208. In an embodiment, the first arm 1220(1) and the second arm 1220(2) may be compressed in a direction towards one another (e.g., in the X-direction) to release the fastening mechanism 1208 from the bracket 1202.

Figure 13A:
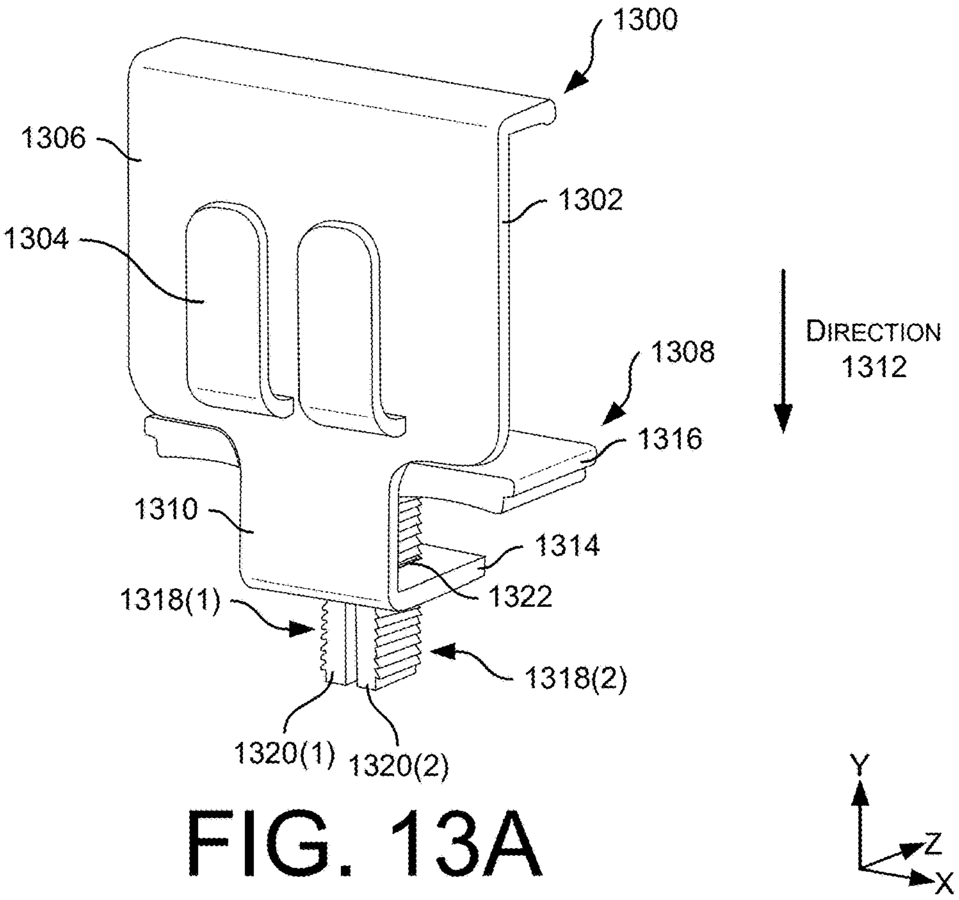
FIG. 13A illustrates an isometric view of an alternative clamp, according to embodiments of the present disclosure.
Figure 13B:
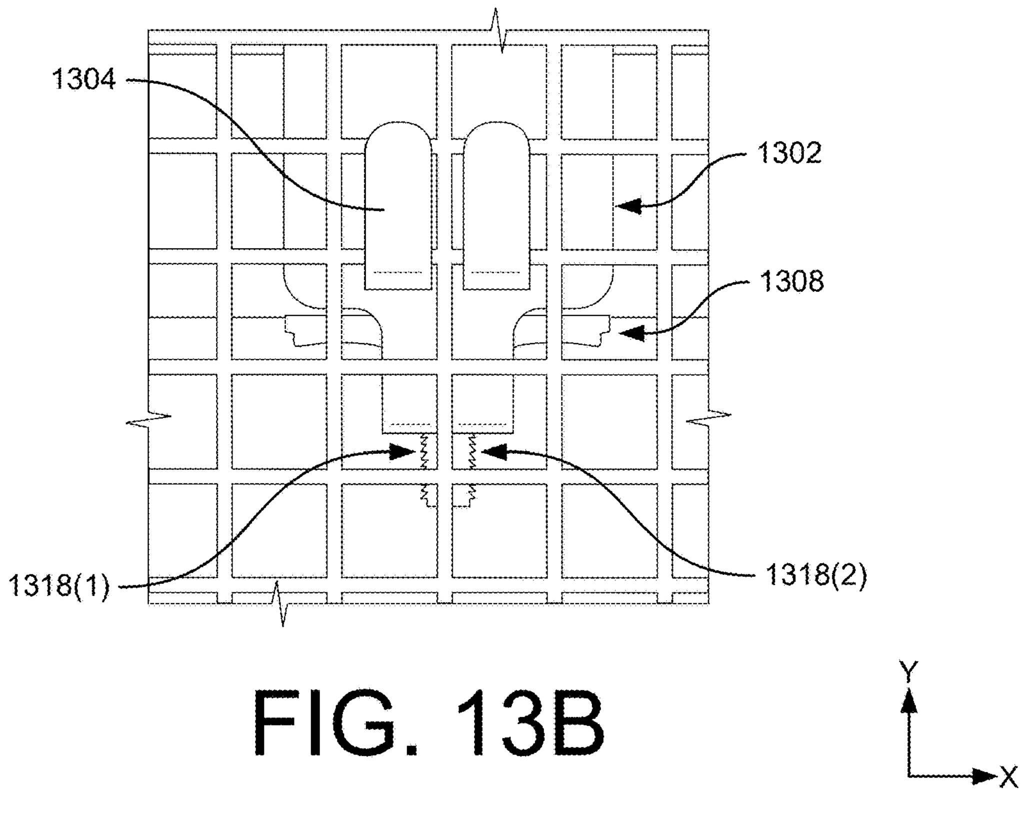
FIG. 13B illustrates a side view of the clamp of FIG. 13A attaching to a barrier, according to embodiments of the present disclosure.
Figure 14A:
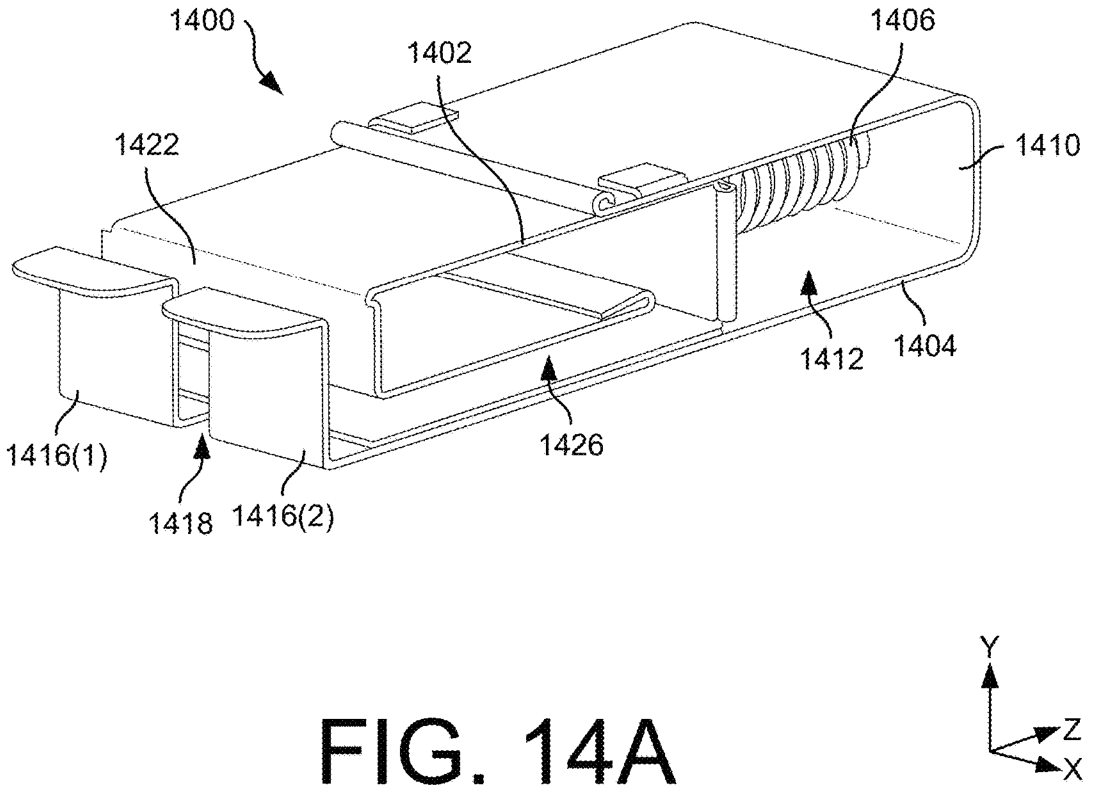
FIG. 14A illustrates an isometric view of an alternative clamp, according to embodiments of the present disclosure.
Figure 14B:
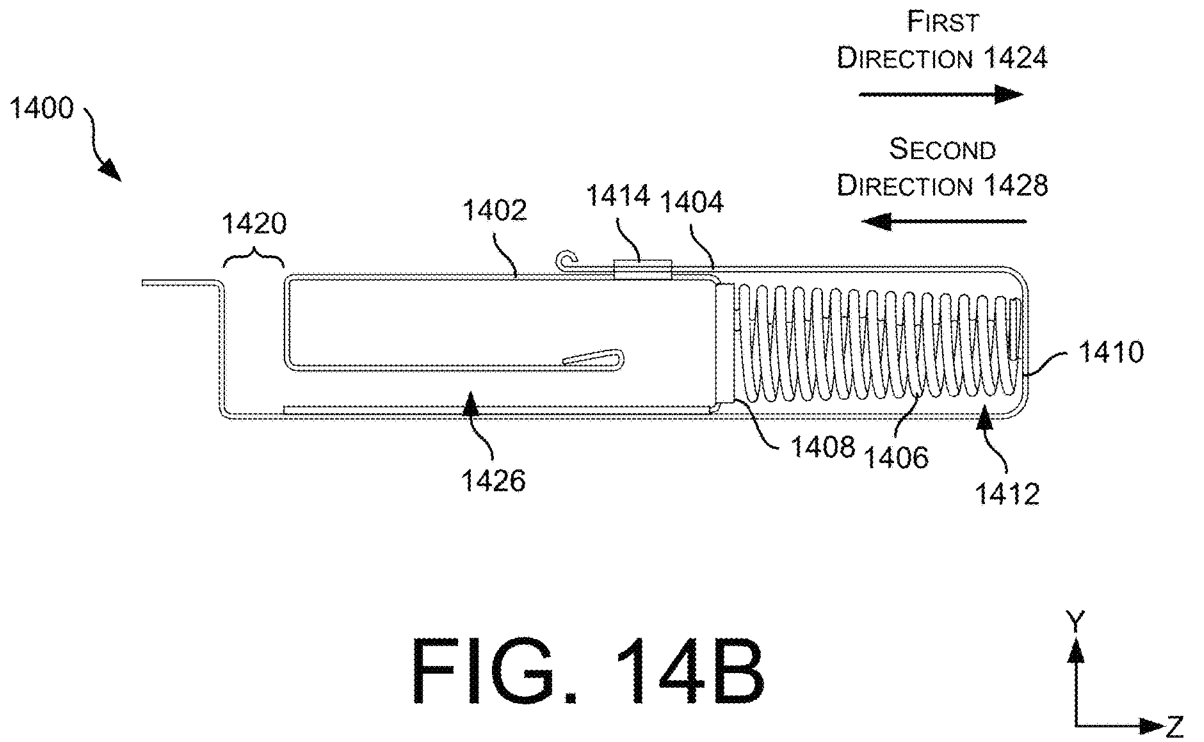
FIG. 14B illustrates a side view of the clamp of FIG. 14A, according to embodiments of the present disclosure.
Figure 14C:
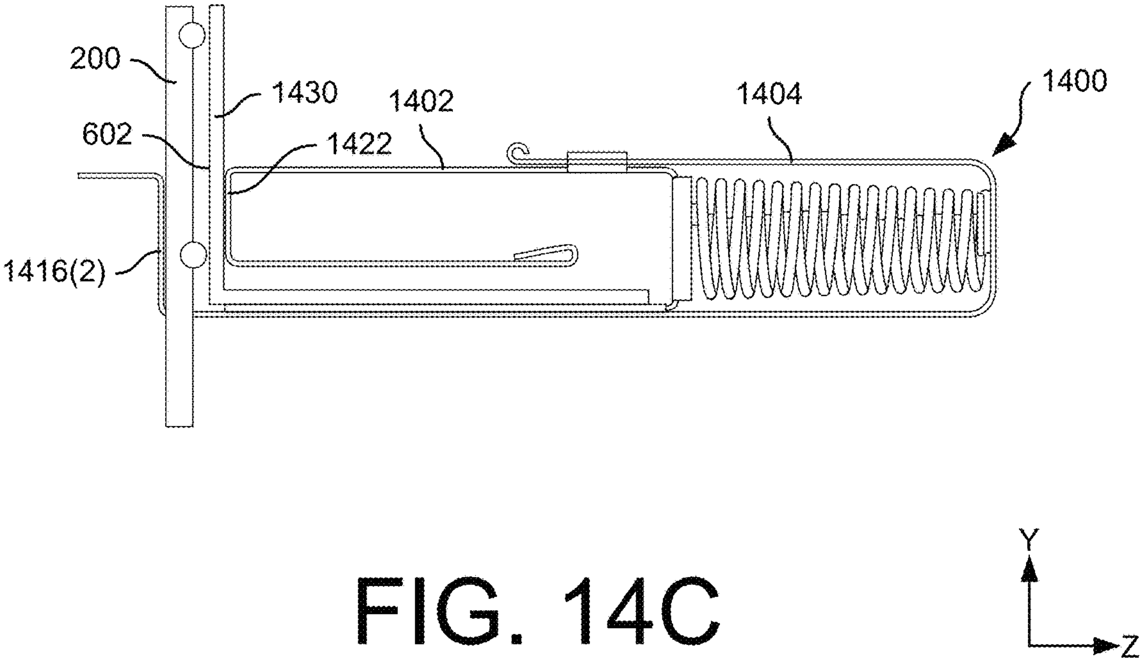
FIG. 14C illustrates a side view of the clamp of FIG. 14A attaching to a barrier, according to embodiments of the present disclosure.
Figure 14D:
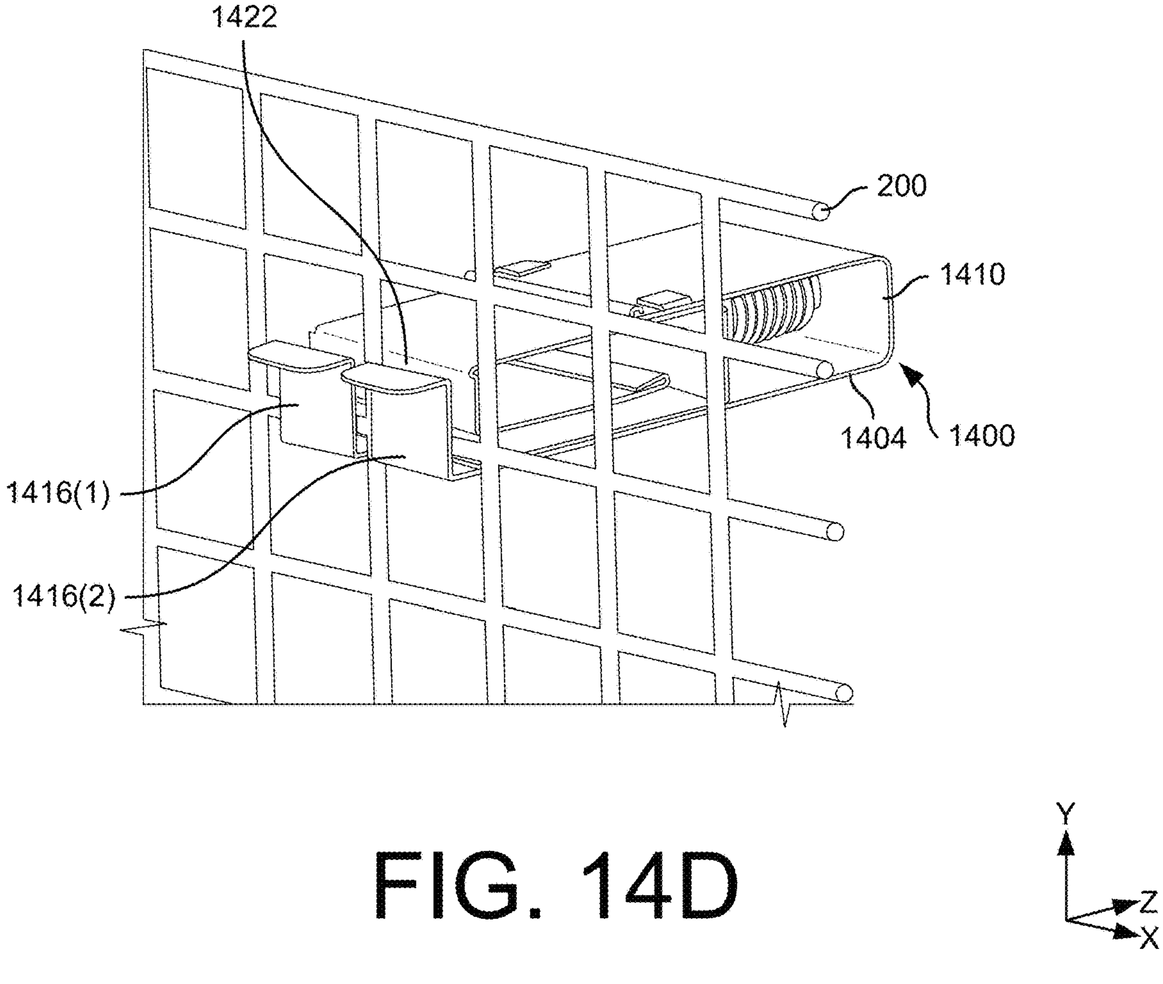
FIG. 14D illustrates an isometric view of the clamp of FIG. 14A attaching to a barrier, according to embodiments of the present disclosure.

FIGS. 13A and 13B illustrate an alternative clamp 1300 that may be used to attach the barrier 200 to the solar panel module, according to embodiments of the present disclosure.

In an embodiment, the clamp 1300 may be similar to the clamp 1200. For example, the clamp 1300 may include a bracket 1302 defining hooks 1304. The hooks 1304 may receive at least a portion of the barrier 200 for attaching the barrier 200 to the clamp 1300. In an embodiment, the hooks 1304 may be biased (e.g., in the Z-direction) to dispose the barrier 200 between the hooks 1304 and a surface 1306 of the bracket 1302.

The clamp 1300 includes a fastening mechanism 1308 for securing a connector (not shown in FIGS. 13A and 13B) to the bracket 1302. For example, the bracket 1302 may define a post 1310 and the fastening mechanism 1308 may be configured to translate in a direction 1312 for securing compressing, clamping, etc. the connector between the fastening mechanism 1308 and flanges 1314 of the bracket 1302. For example, portions of the connector may rest on the flanges 1314. As the fastening mechanism 1308 moves in the direction 1312, the connector may become compressed between a base 1316 of the fastening mechanism 1308 and the flanges 1314. Such engagement may lock a position of the connector on the bracket 1302.

Additionally, as the fastening mechanism 1318 moves in the direction 1312, a portion of the barrier 200 (e.g., lattice) may become compressed, pinched, etc. between the base 1316 and the connector. Such engagement may secure the clamp 1300 to the barrier 200.

The fastening mechanism 1308 may include attachment mechanisms for engaging with the bracket 1302. For example, the fastening mechanism 1308 may include first attachment mechanisms 1318(1) and second attachment mechanisms 1318(2). In an embodiment, the first attachment mechanisms 1318(1) and the second attachment mechanisms 1318(2) may be disposed on a first arm 1320(1) and a second arm 1320(2) of the fastening mechanism 1308, respectively. The first attachment mechanisms 1318(1) and the second attachment mechanisms 1318(2) may be oriented in a direction away from one another. The first attachment mechanisms 1318(1) and the second attachment mechanisms 1318(2) may represent teeth, tabs, etc. that engage with the flanges 1314, respectively.

The first arm 1320(1) and the second arm 1320(2) may be disposed through slots 1322 in the bracket 1302, or the flanges 1314 of the bracket 1302, respectively. As the fastening mechanism 1308 is translated in the direction 1312, the first attachment mechanisms 1318(1) and the second attachment mechanisms 1318(2) may engage with the flanges 1314, thereby locking the position of the fastening mechanism 1308. In an embodiment, the first arm 1320(1) and the second arm 1320(2) may be compressed in a direction towards one another (e.g., in the X-direction) to release the fastening mechanism 1308 from the bracket 1302.

FIGS. 14A-14D illustrate an alternative clamp 1400 that may be used to attach the barrier 200 to the solar panel module, according to embodiments of the present disclosure.

In an embodiment, the clamp 1400 may include a slide 1402 and a bracket 1404. The slide 1402 may be slidably engaged with the bracket 1404. The clamp 1400 may include a biasing member 1406, such as a spring, that is compressible (e.g., in the Z-direction). The biasing member 14 may be disposed between an end 1408 of the slide 1402 and a surface 1410 of the bracket 1404. In an embodiment, the biasing member 1406 may be disposed within a receptacle 1412 of the bracket 1404. One or more braces 1414 may maintain an engagement between the bracket 1404 and the slide 1402.

The bracket 1404 includes a first arm 1416(1) and a second arm 1416(2) that engage with the barrier 200. A channel 1418 may be disposed between the first arm 1416(1) and the second arm 1416(2) for receiving a portion of the barrier 200. A gap distance 1420 between the first arm 1416(1)/the second arm 1416(2) and a flange 1422 of the slide 1402 is variable. For example, the slide 1402 may be moved in a first direction 1424 to compress the biasing member 1406. During compression of the biasing member 1406, the end 1408 of the slide 1402 may move into the receptacle 1412 and/or in closer proximity to the surface 1410. As the biasing member 1406 is compressed, the gap distance 1420 may increase.

Once compressed, the clamp 1400 may be installed on the frame 202. For example, the flange 204 of the frame 202 may be configured to reside within a cavity 1426 formed between the slide 1402 and the bracket 1404. Once installed, the slide 1402 may be released, and the biasing nature of the biasing member 1406 may exert a force against the end 1408 of the slide 1402, thereby moving the slide 1402 in a second direction 1428 opposite the first direction 1424. The flange 1422 may then become biased against the frame 202, such as a flange 1430 of the frame 202. Additionally, the first arm 1416(1) and the second arm 1416(2) may be biased against the surface 602 of the frame 202 (or an opposing surface of the flange 1430 engaged by the flange 204). In doing so, the barrier 200 may be secured between the first arm 1416(1) and the surface 602, as well as the second arm 1416(2) and the surface 602.

Figure 15A:
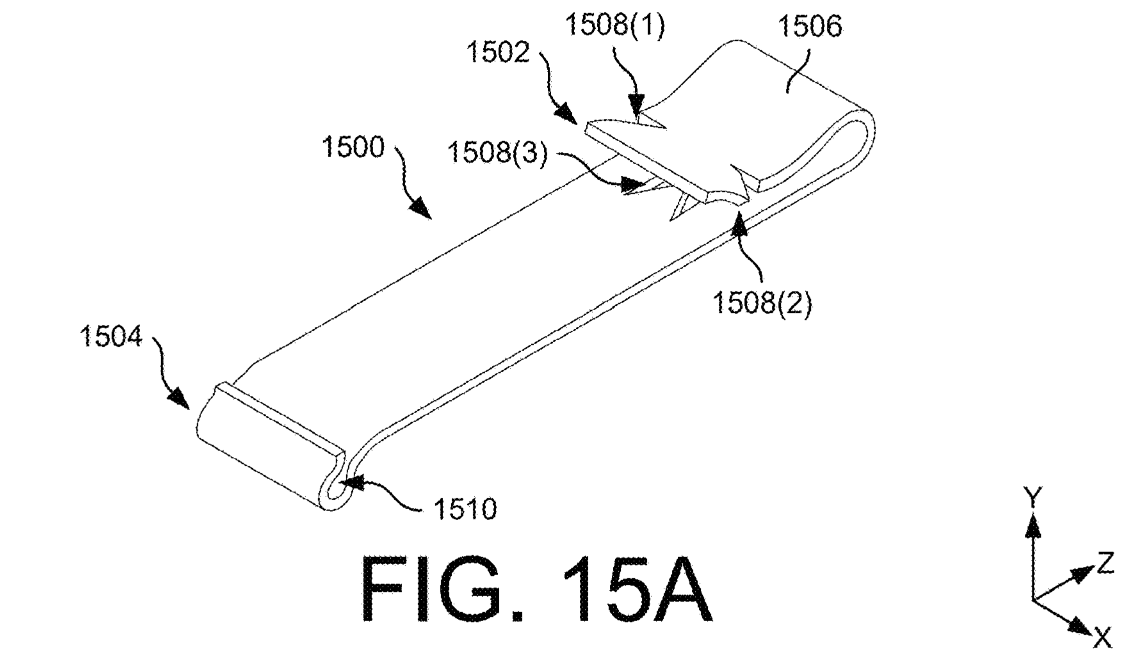
FIG. 15A illustrates an isometric view of an alternative clamp, according to embodiments of the present disclosure.
Figure 15B:
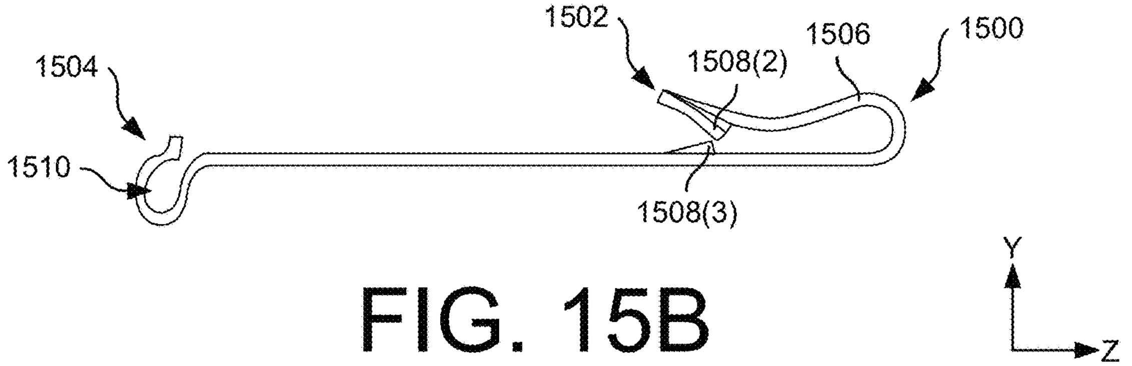
FIG. 15B illustrates a side view of the clamp of FIG. 15A, according to embodiments of the present disclosure.
Figure 15C:
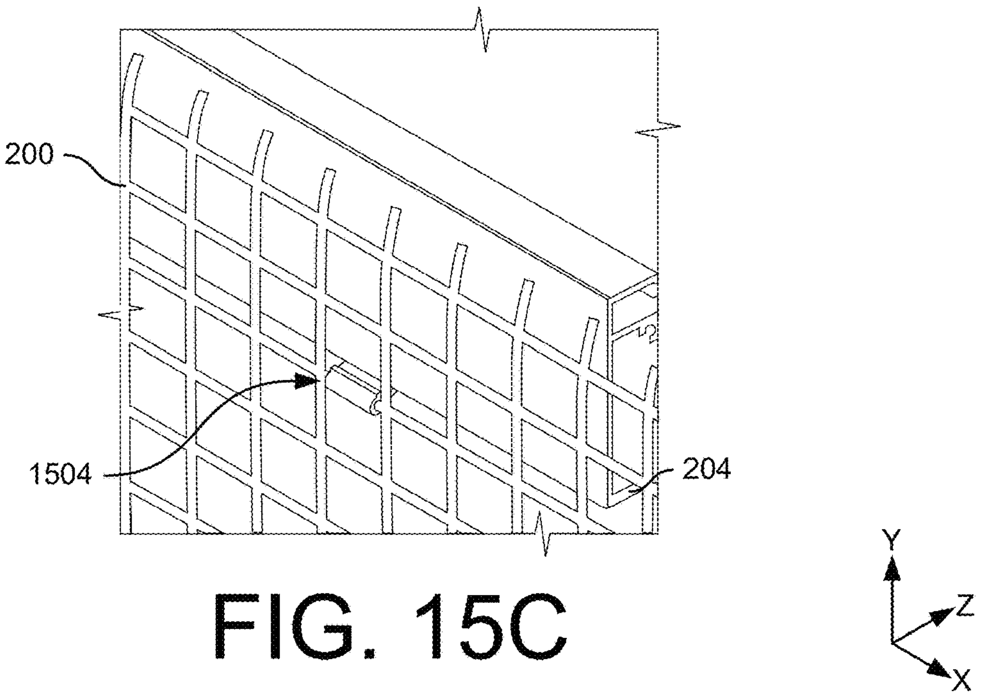
FIG. 15C illustrates an isometric view of the clamp of FIG. 15A attaching to a barrier, according to embodiments of the present disclosure.

FIGS. 15A-15C illustrate an alternative clamp 1500 that may be used to attach the barrier 200 to the solar panel module, according to embodiments of the present disclosure.

In an embodiment, the clamp 1500 may be similar to the connector 102, the connector 704, the connector 804, and/or the clamp 900 described above. The clamp 1500 may include a first end 1502 and a second end 1504 opposite the first end 1502 (e.g., in the Z-direction). The clamp 1500 may define a clip 1506 that secures the clamp 1500 to the frame 202. The clamp 1500 may include prongs that engage with the flange 204 of the frame 202. For example, the clamp 1500 may include a first prong 1508(1), a second prong 1508(2), and a third prong 1508(3). The first prong 1508(1) and the second prong 1508(2) may represent downturned prongs that engage with a top of the flange 204. The third prong 1508(3) may represent an upturned prong that engages with a bottom of the flange 204. The first prong 1508(1) and/or the second prong 1508(2) may be formed on a clip 1506 of the clamp 1500, on opposing sides of the clamp 1500.

The second end 1504 may define a receptacle 1510 in which a portion of the barrier 200 is received. For example, lattice of the barrier 200 may be biased into the receptacle 1510. The receptacle 1510 may be formed via bending the clamp 1500 In an embodiment, a length of the clamp 1500, between the first end 1502 and the second end 1504, may be based at least in part on specifics of the solar panel module, the frame 202, and/or the barrier 200. In an embodiment, the clamp 1500 may be formed via stamping, bending, and/or cutting. The clamp 1500 may be made of metal (e.g., steel, aluminum, etc.), plastics, composites, etc.

Figure 16A:
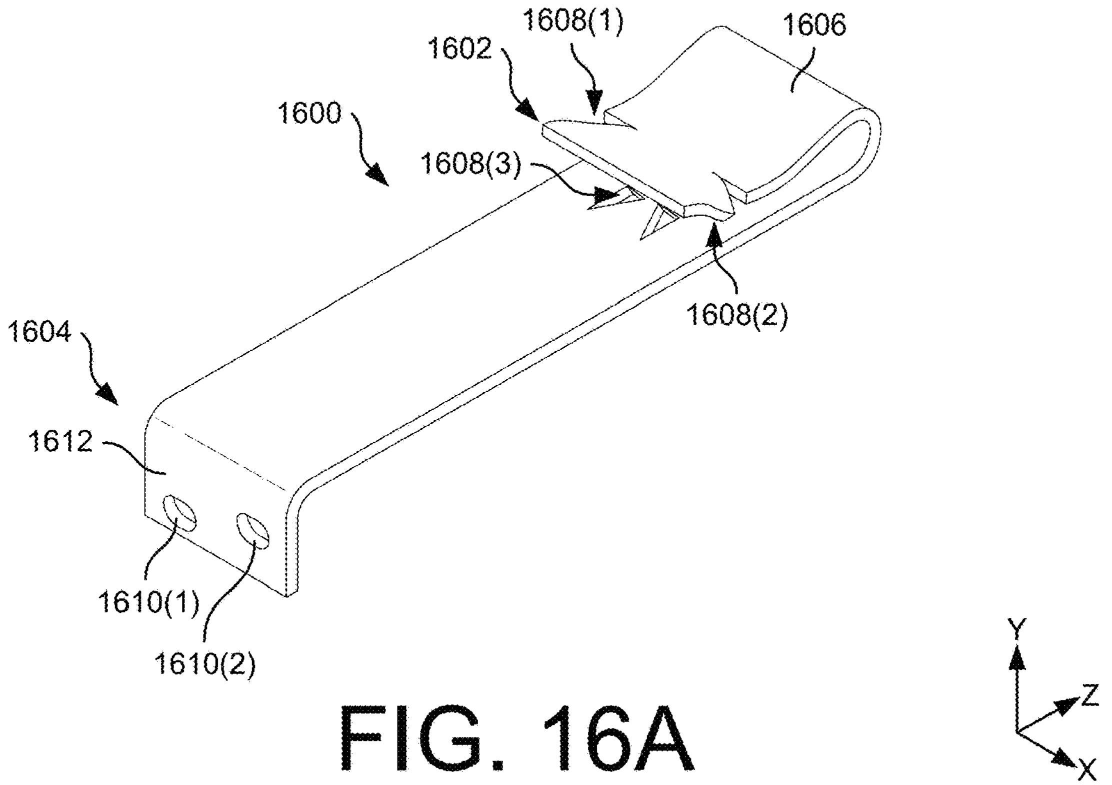
FIG. 16A illustrates an isometric view of an alternative clamp, according to embodiments of the present disclosure.
Figure 16B:
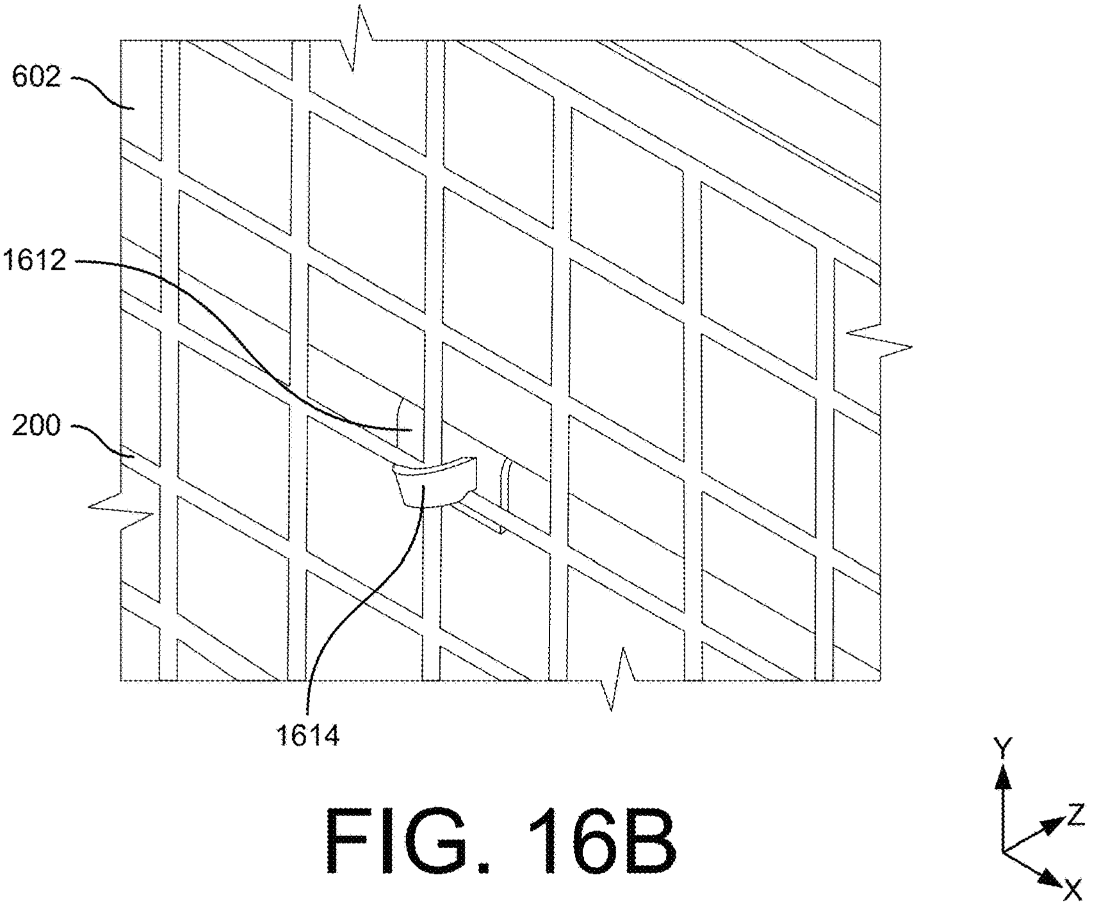
FIG. 16B illustrates an isometric view of the clamp of FIG. 16A attaching to a barrier, according to embodiments of the present disclosure.

FIGS. 16A and 16B illustrate an alternative clamp 1600 that may be used to attach the barrier 200 to the solar panel module, according to embodiments of the present disclosure.

In an embodiment, the clamp 1600 may be similar to the clamp 1500. The clamp 1600 may include a first end 1602 and a second end 1604 opposite the first end 1602 (e.g., in the Z-direction). The clamp 1600 may define a clip 1606 that secures the clamp 1600 to the frame 202. The clamp 1600 may include prongs that engage with the flange 204 of the frame 202. For example, the clamp 1600 may include a first prong 1608(1), a second prong 1608(2), and a third prong 1608(3). The first prong 1608(1) and the second prong 1608(2) may represent downturned prongs that engage with a top of the flange 204. The third prong 1608(3) may represent an upturned prong that engages with a bottom of the flange 204.

The second end 1604 may define a first opening 1610(1) and a second opening 1610(2). The first opening 1610(1) and the second opening 1610(2) may be disposed on a flange 1612 of the clamp 1600. A tie 1614, such as wire, a cable, a strap, etc. may be disposed around the barrier 200 and through the first opening 1610(1) and the second opening 1610(2) to secure the barrier to the clamp 1600.

In an embodiment, the clamp 1600 may be formed via stamping, bending, and/or cutting. The clamp 1600 may be made of metal (e.g., steel, aluminum, etc.), plastics, composites, etc.

Figure 17A:
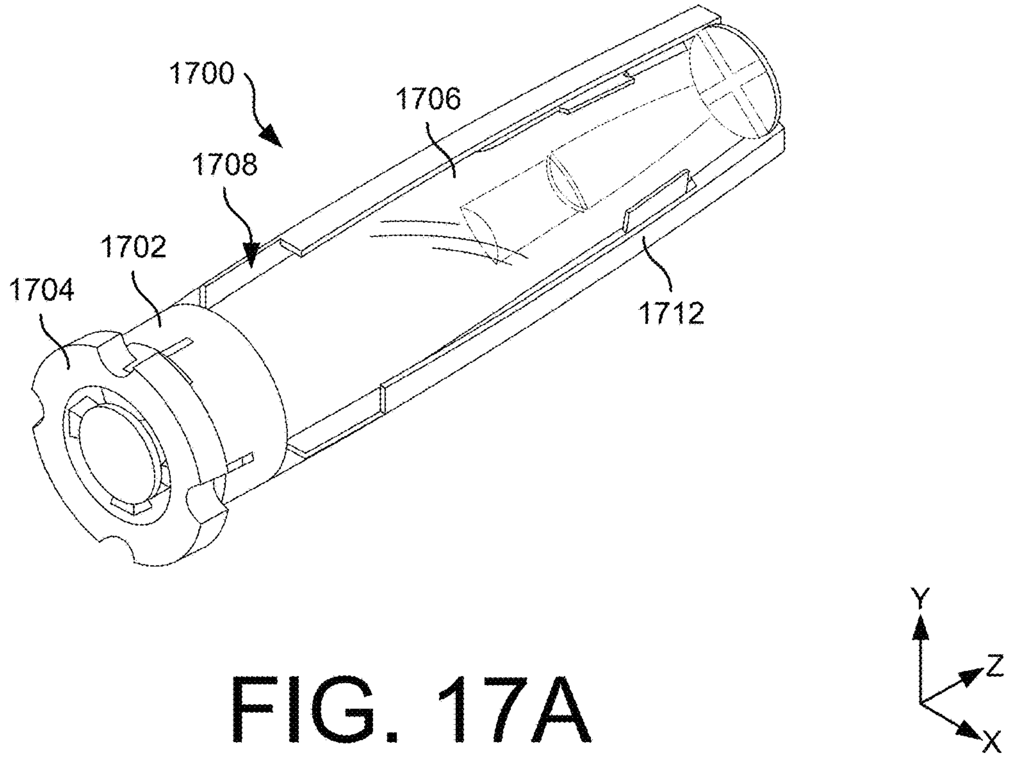
FIG. 17A illustrates an isometric view of an alternative clamp, according to embodiments of the present disclosure.
Figure 17B:
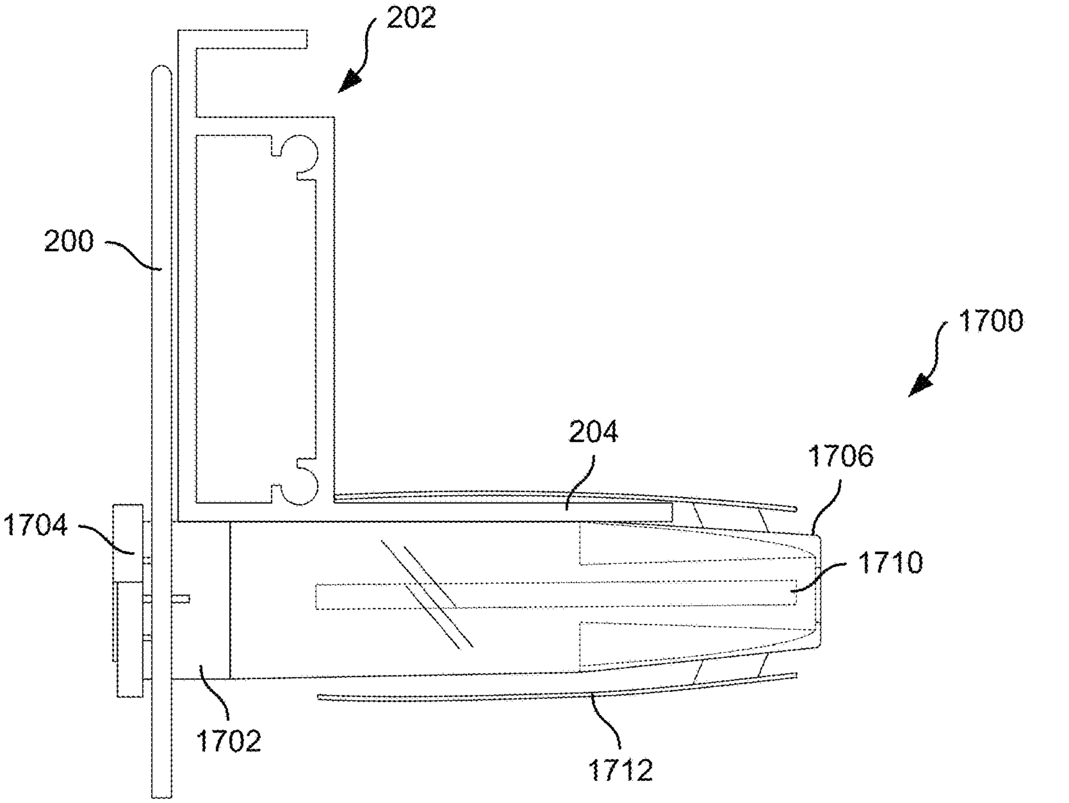
FIG. 17B illustrates a side view of the clamp of FIG. 17A attaching to a barrier and one or more solar panel modules, according to embodiments of the present disclosure.

FIGS. 17A and 17B illustrate an alternative clamp 1700 that may be used to attach the barrier 200 to the solar panel module, according to embodiments of the present disclosure.

The clamp 1700 may include a plug 1702 having a head 1704, and a container 1706 defining a cavity 1708. The plug 1702 may be secured to the container 1706, within the cavity 1708. For example, the plug 1702 may be inserted into the cavity 1708 and snapped into engagement with the container 1706. In an embodiment, the plug 1702 includes ribs 1710 that engage with the container 1706 to increase a compression fit between the plug 1702 and the container 1706. The container 1706 in FIGS. 17A and 17B is shown as transparent.

The container 1706 may include one or more wings 1712 that engage with the frame 202, over the flange 204, for example. Once the container 1706 attaches to the frame 202, the plug 1702 may be disposed through the barrier 200. The head 1704, however, may prevent the plug 1702 being pushed through an entirety of the barrier 200. As such, the head 1704 may engage with an outside portion of the barrier 200. Therein, the plug 1702 may be further pushed into the container 1706 in order to snap the plug 1702 into engagement with the container 1706.

Figure 18A:
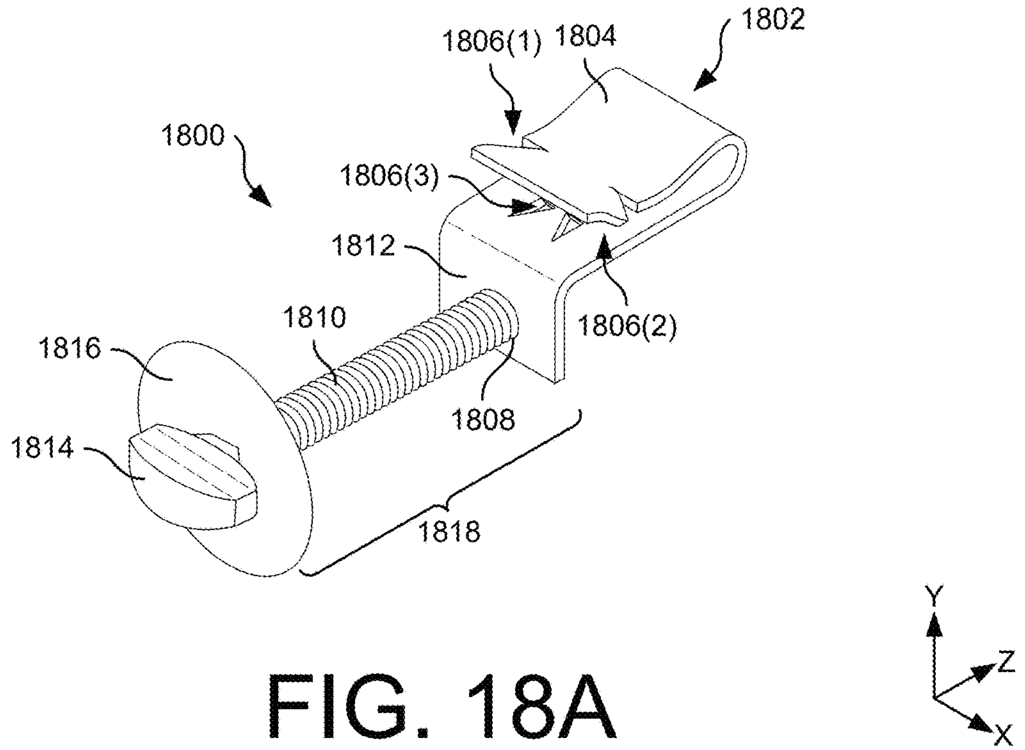
FIG. 18A illustrates an isometric view of an alternative clamp, according to embodiments of the present disclosure.
Figure 18B:
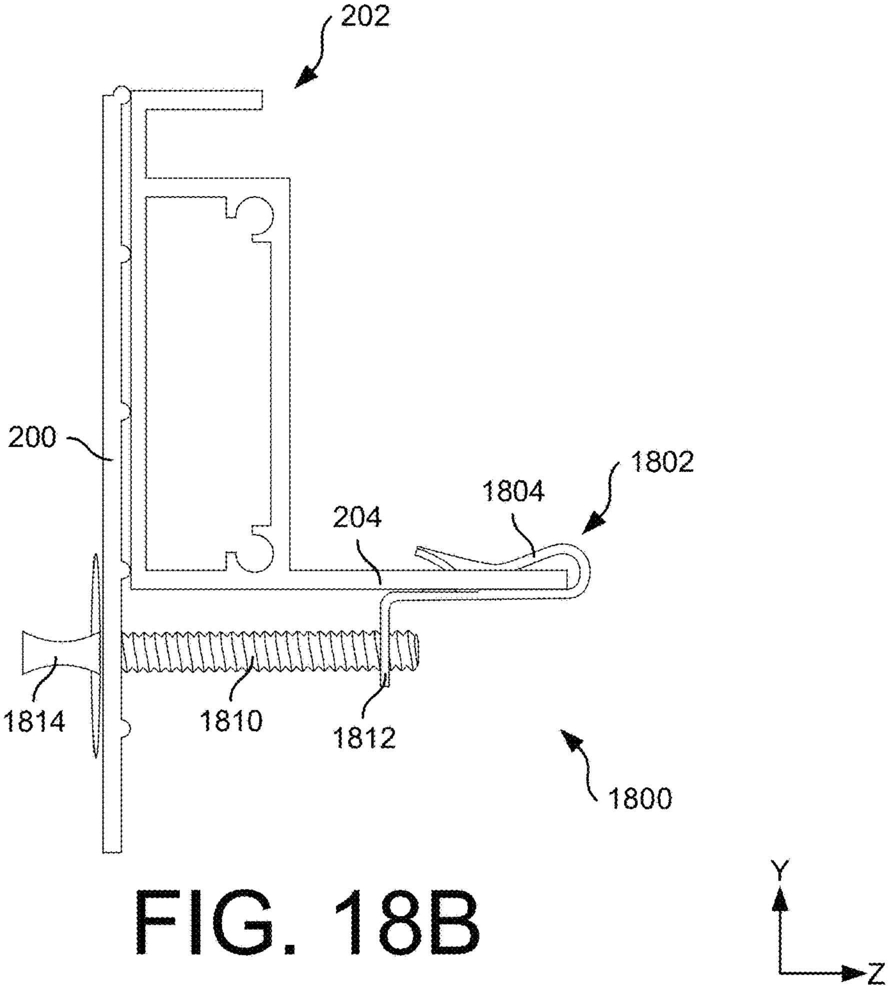
FIG. 18B illustrates a side view of the clamp of FIG. 18A attaching to a barrier and one or more solar panel modules, according to embodiments of the present disclosure.

FIGS. 18A and 18B illustrate an alternative clamp 1800 that may be used to attach the barrier 200 to the solar panel module, according to embodiments of the present disclosure.

The clamp 1800 may include a connector 1802. The connector 1802 may define a clip 1804 that secures the clamp 1800 to the frame 202. The clamp 1800 may include prongs that engage with the flange 204 of the frame 202. For example, the clamp 1800 may include a first prong 1806(1), a second prong 1806(2), and a third prong 1806(3). The first prong 1806(1) and the second prong 1806(2) may represent downturned prongs that engage with a top of the flange 204. The third prong 1806(3) may represent an upturned prong that engages with a bottom of the flange 204.

The connector 1802 may define a receptacle 1808 that receives a fastener 1810 of the clamp 1800. The receptacle 1808 may be disposed through a flange 1812 of the connector 1802. For example, the fastener 1810 may be threaded into the receptacle 1808. The fastener 1810 may include a head 1814 and a washer 1816 may be disposed on the fastener 1810. As the fastener 1810 is fastened to the connector 102 (e.g., via clockwise rotation about the Z-axis), a gap distance 1818 disposed between the flange 1812 and the head 1814 may be decreased. In doing so, the barrier 200 may be clamped between the washer 1816 and the frame 202.

Figure 19A:
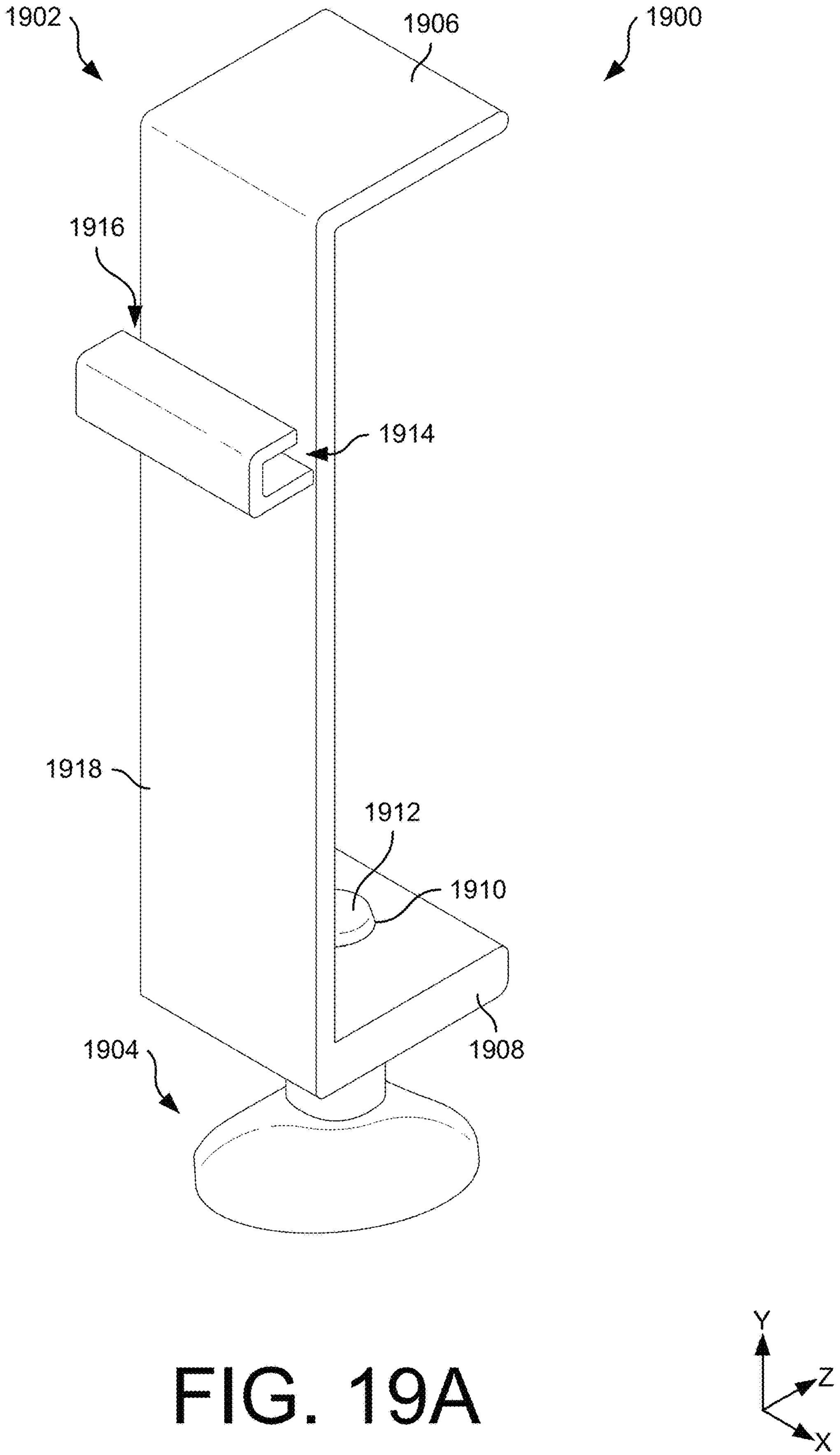
FIG. 19A illustrates an isometric view of an alternative clamp, according to embodiments of the present disclosure.
Figure 19B:
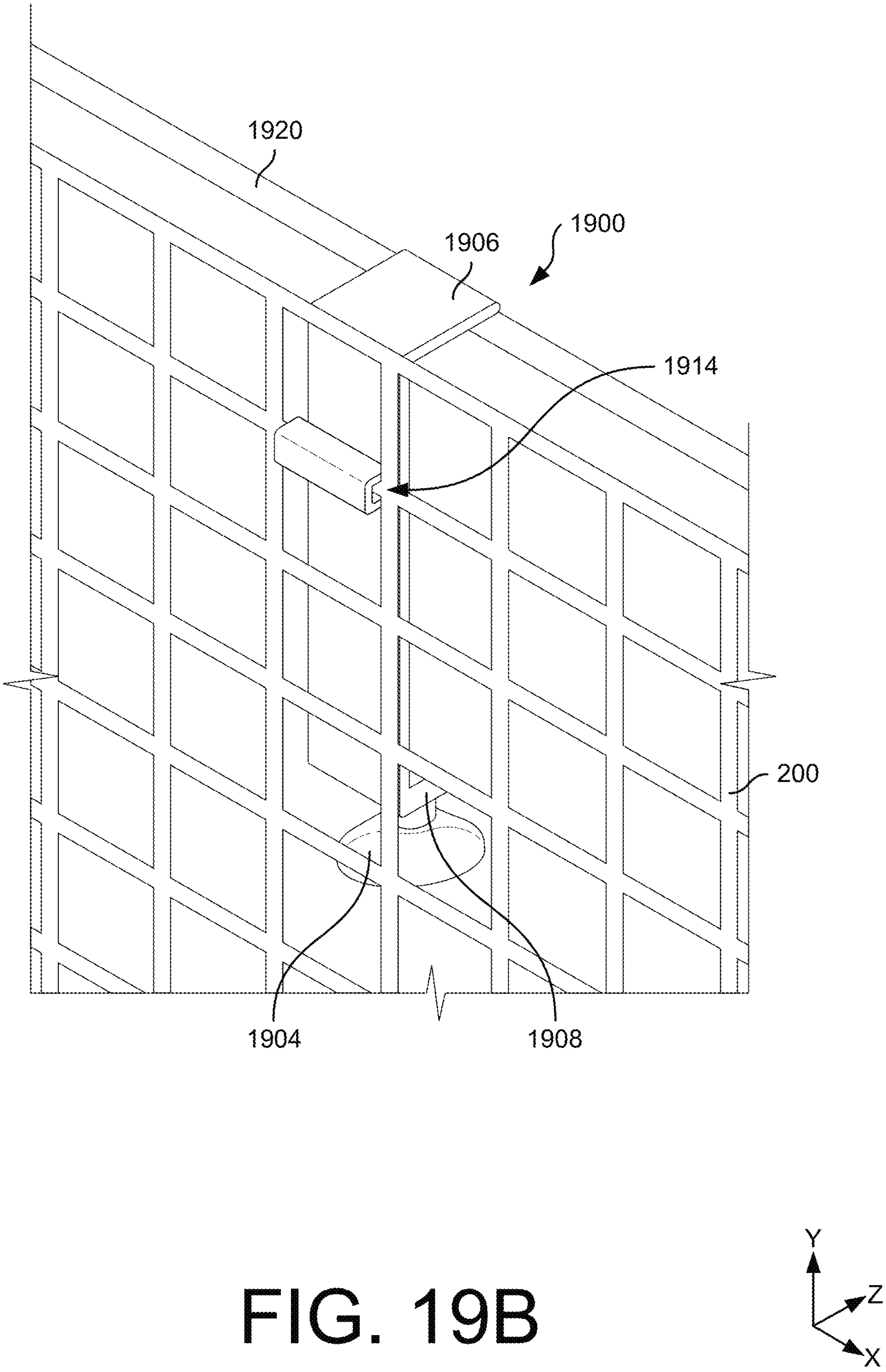
FIG. 19B illustrates an isometric view of the clamp of FIG. 19A attaching to a barrier and one or more solar panel modules, according to embodiments of the present disclosure.

FIGS. 19A and 19B illustrate an alternative clamp 1900 that may be used to attach the barrier 200 to the solar panel module, according to embodiments of the present disclosure.

The clamp 1900 may include a bracket 1902 and a fastening mechanism 1904. The bracket 1902 may include a base 1918, a first flange 1906, and a second flange 1908. The first flange 1906 and the second flange 1908 may extend from the base 1918. In an embodiment, the first flange 1906 and the second flange 1908 may extend transversely from the base 1918. The first flange 1906 may engage with a flange 1920 of the frame 202, while the second flange 1908 may engage with the flange 204 of the frame 202.

The fastening mechanism 1904 may be threadingly engaged within an opening 1910 in the second flange 1908. As the fastening mechanism 1904 is tightened, an end 1912 of the fastening mechanism 1904 may be urged against the flange 204 to secure the clamp 1900 to the frame 202. A distance disposed between the first flange 1906 and the second flange 1908 may accommodate a height (e.g., in the Y-direction) of the frame 202.

The bracket 1902 includes a receptacle 1914 that receives the barrier 200. The receptacle 1914 may be defined by the base 1918. The receptacle 1914 may be accessible, so as to dispose a portion of the barrier 200 in the receptacle 1914, via an opening 1916. The receptacle 1914 may be defined by or extend from one or more flanges, plates, etc. that extend from the base 1918.

Figure 20A:
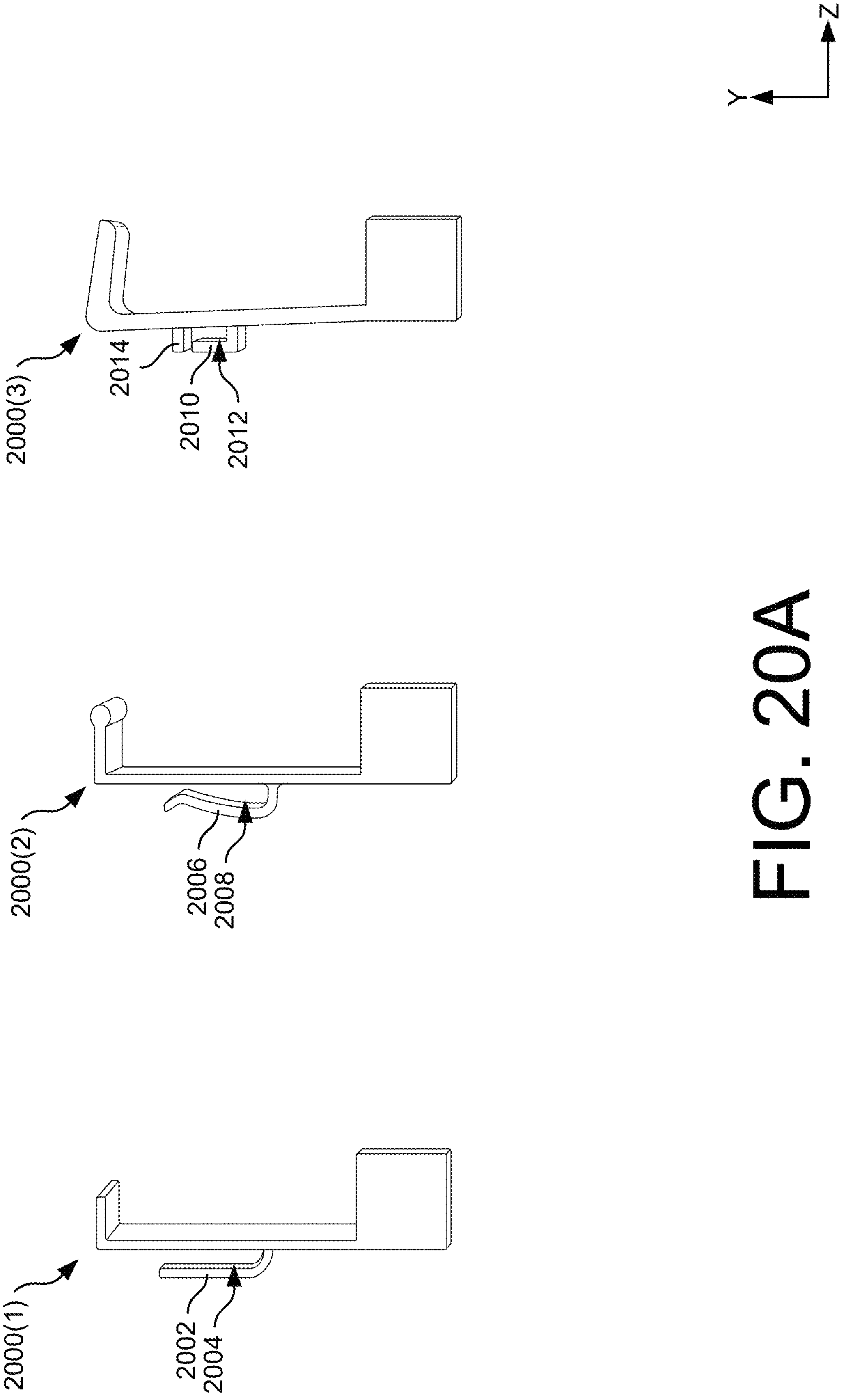
FIG. 20A illustrates alternative clamps, according to embodiments of the present disclosure.
Figure 20B:
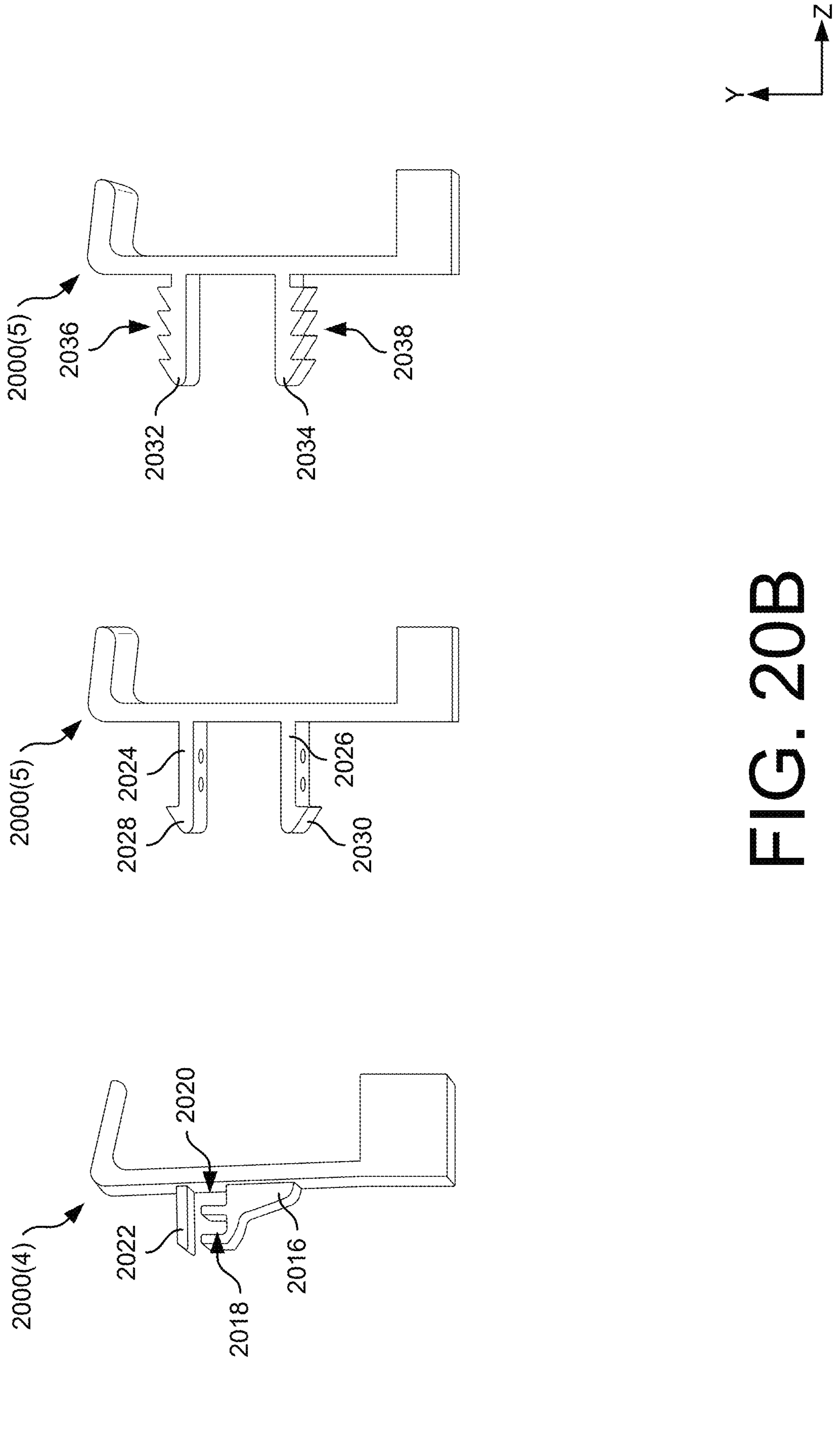
FIG. 20B illustrates alternative clamps, according to embodiments of the present disclosure.

FIGS. 20A and 20B illustrate alternative clamps that may be used to attach the barrier 200 to the solar panel module, according to embodiments of the present disclosure. In FIGS. 20A and 20B, a first clamp 2000(1), a second clamp 2000(2), a third clamp 2000(3), a fourth clamp 2000(4), a fifth clamp 2000(5), and a sixth clamp 2000(6) are show. In an embodiment, the clamps 2000(1)-(6) may be similar to the bracket 1902 of the clamp 1900. For example, each of the clamps 2000(1)-(6) may include a first flange that engages with a top of the frame 202, and a second flange that engages with a bottom of the frame 202, such as the flange 204. A base may extend between the first flange and the second flange. In an embodiment, the clamps 2000(1)-(6) may attach to the frame 202 via fasteners, adhesives, compression-fit, etc.

In an embodiment, the clamps 2000(1)-(6) include different attachment mechanisms for attaching to the barrier 200. For example, the first clamp 2000(1) may include an arm 2002 (e.g., clip, clasp, tab, etc.) that defines a receptacle 2004 that receives the barrier 200. The second clamp 2000(2) may include an arm 2006 (e.g., clip, clasp tab, etc.) that defines a receptacle 2008 that receives the barrier 200. The third clamp 2000(3) may include an arm 2010 that defines a receptacle 2012 that receives the barrier 200, and a flange 2014 that may prevent disengagement of the barrier 200 from within the receptacle 2012.

The fourth clamp 2000(4) may include a bracket 2016 (e.g., clip, tab, etc.) that receives the barrier 200. For example, in an embodiment, the bracket 2016 may include multiple slots, such as a first slot 2018 and/or a second slot 2020 for receiving the barrier 200. A flange 2022 may prevent disengagement of the barrier 200 from within the first slot 2018 and/or the second slot 2020.

The fifth clamp 2000(5) may include a first arm 2024 and a second arm 2026. The first arm 2024 may include a first tab 2028, and the second arm 2026 may include a second tab 2030. In an embodiment, the barrier 200 may be inserted over the first arm 2024 and the second arm 2026. In an embodiment, a clip (not shown) may be inserted over the first arm 2024 and the second arm 2026, to engage with the first tab 2028 and the second tab 2030 to lock the clip onto the fifth clamp 2000(5).

The sixth clamp 2000(6) may include a first arm 2032 and a second arm 2034. The first arm 2032 may include first tabs 2036, and the second arm 2034 may include second tabs 2038. In an embodiment, the barrier 200 may be inserted over the first arm 2032 and the second arm 2034. In an embodiment, a clip (not shown) may be inserted over the first arm 2032 and the second arm 2034, to engage with the first tabs 2036 and the second tabs 2038 to lock the clip onto the sixth clamp 2000(6).

Figure 21A:
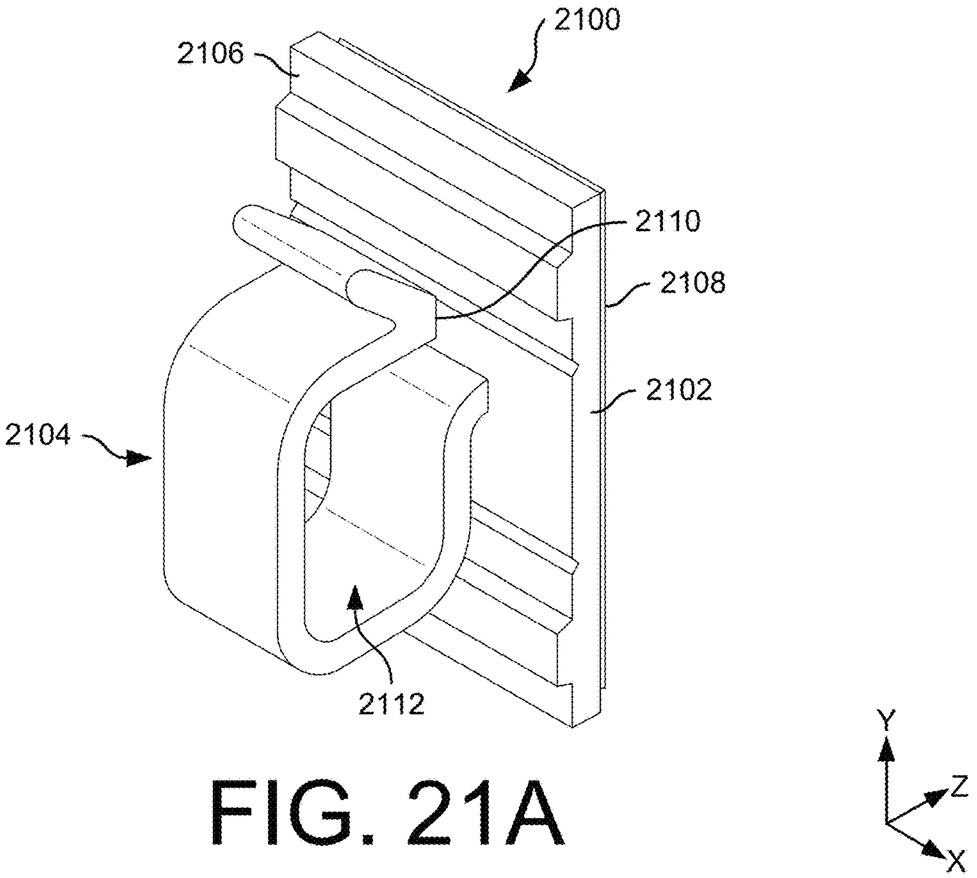
FIG. 21A illustrates an isometric view of an alternative clamp, according to embodiments of the present disclosure.
Figure 21B:
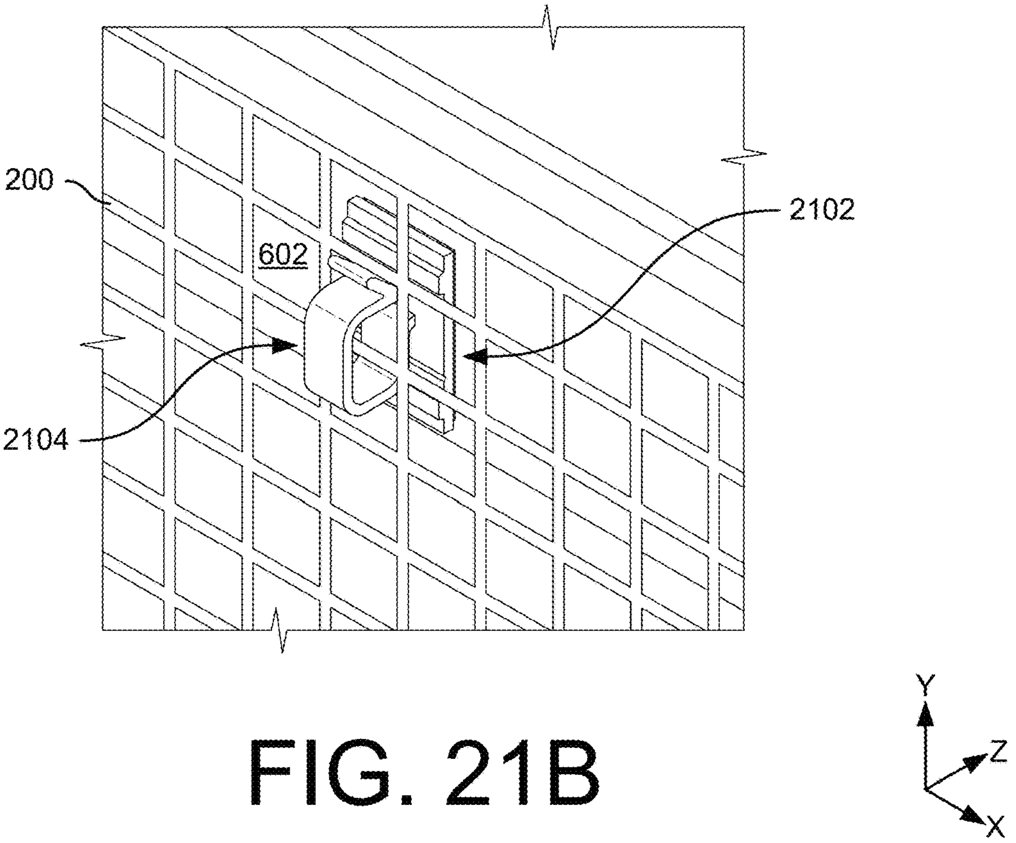
FIG. 21B illustrates an isometric view of the clamp of FIG. 21A attaching to a barrier and one or more solar panel modules, according to embodiments of the present disclosure.

FIGS. 21A and 21B illustrate an alternative clamp 2100 that may be used to attach the barrier 200 to the solar panel module, according to embodiments of the present disclosure. The clamp 2100 may include a base 2102 and a clip 2104 that extends from the base 2102. For example, the base 2102 may include a first side 2106 and a second side 2108 opposite the first side 2106 (e.g., in the Z-direction). The clip 2104 may extend from the first side 2106 of the base 2102, and may be biased in a rotational direction (e.g., about the X-axis) to dispose an end 2110 of the clip 2104 in a direction away from the first side 2106. When the end 2110 of the clip 2104 is biased away from the first side 2106, the barrier 200 may be inserted within a receptacle 2112 formed by the clip 2104.

The second side 2108 of the clamp 2100 may include an adhesive that secures the clamp 2100 to the surface 602 of the frame 202. In an embodiment, the clamp 2100 may be manufactured from suitable materials (e.g., plastic), and may be manufactured using injection molding.

Figure 22A:
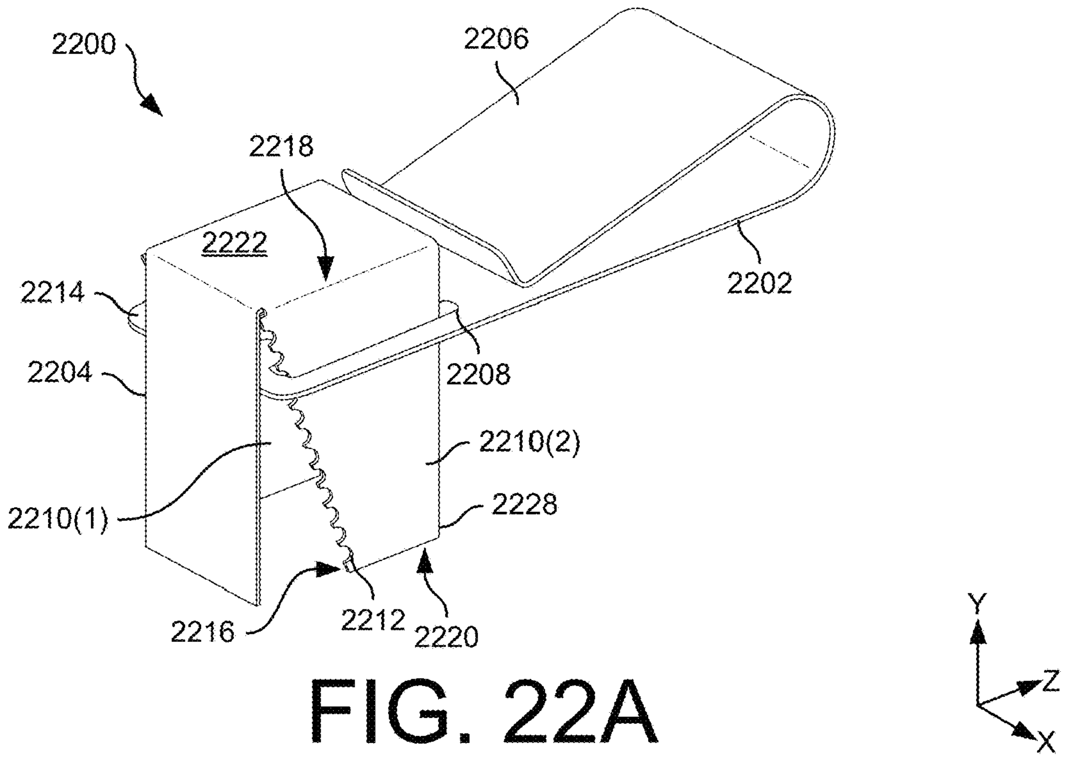
FIG. 22A illustrates an isometric view of an alternative clamp, according to embodiments of the present disclosure.
Figure 22B:
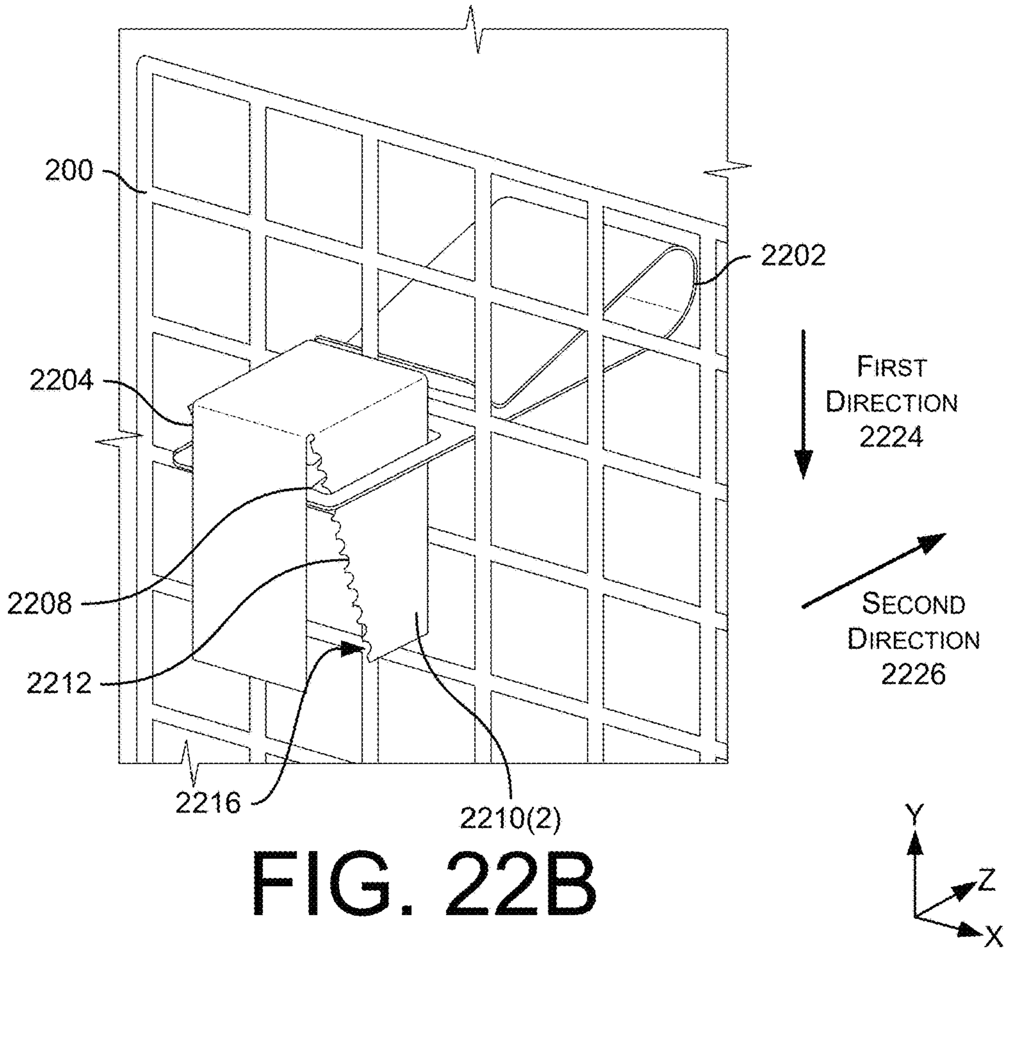
FIG. 22B illustrates an isometric view of the clamp of FIG. 22A attaching to a barrier and one or more solar panel modules, according to embodiments of the present disclosure.

FIGS. 22A and 22B illustrate an example clamp 2200 that may be used to attach the barrier 200 to the solar panel module, according to embodiments of the present disclosure. In an embodiment, the clamp 2200 includes a connector 2202 and a plug 2204. The connector 2202 may include a clip 2206 for securing the connector 2202 to the frame 202, as well as channels 2208 for receiving arms of the plug 2204.

The plug 2204 may include a first arm 2210(1) and a second arm 2210(2) that are at least partially disposed within the channels 2208, respectively. For example, the first arm 2210(1) may be disposed within a first of the channels 2208, and the second arm 2210(2) may be disposed within a second of the channels 2208. The first arm 2210(1) and the second arm 2210(2) may include notches 2212 that engage with the connector 2202, such as a flange 2214 of the connector 2202 that defines the channels 2208.

As shown, the notches 2212 may be disposed along a side 2216 (e.g., edge, surface, etc.) of the plug 2204 that is angled, tapered, sloped, etc. For example, each of the first arm 2210(1) and the second arm 2210(2) may include a top 2218 and a bottom 2220 spaced apart from the top 2218 (e.g., in the Y-direction). The top 2218 may extend from a base 2222 of the plug 2204. In a direction from the top 2218 to the bottom 2220, a width (e.g., in the Z-direction) of the first arm 2210(1) and the second arm 2210(2) may decrease. As such, in an embodiment, the side 2216 may extend inwards, from the top 2218 to the bottom 2220.

To secure the barrier 200, the connector 2202 may be attached to the frame 202 (via the clip 2206). The barrier 200 may then be slid onto the connector 2202. The plug 2204 may then be attached to the connector 2202 by inserting the first arm 2210(1) into the first of the channels 2208 and the second arm 2210(2) into the second of the channels 2208. As the plug 2204 is urged (e.g., pushed) in a first direction 2224 (e.g., in the Y-direction) the notches 2212 may engage with the connector 2202. Given the angling of the side 2216, as the plug 2204 is urged in the first direction 2224, the plug 2204 may also be urged in a second direction 2226, thereby compressing the barrier 200 between a back 2228 of the plug 2204 and the surface 602 of the frame 202. The plug 2204 may be urged by any amount in the first direction 2224 to secure the barrier 200 between the plug 2204 and the frame 202.

Figure 23:
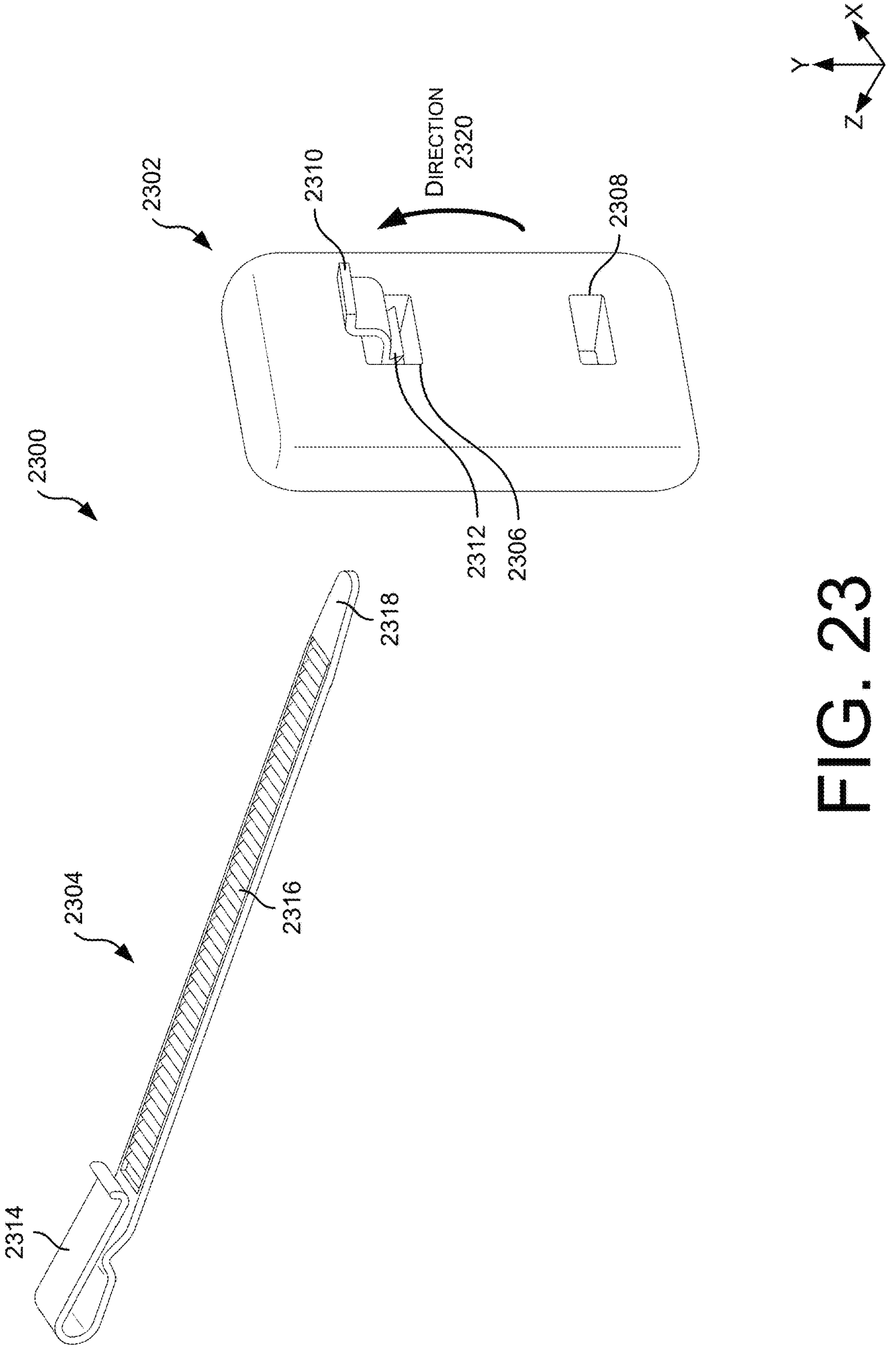
FIG. 23 illustrates an isometric view of an alternative clamp, according to embodiments of the present disclosure.

FIG. 23 illustrates an example clamp 2300 that may be used to attach the barrier 200 to the solar panel module, according to embodiments of the present disclosure. In an embodiment, the clamp 2300 may include a bracket 2302 and a connector 2304. The bracket 2302 may include a first channel 2306 and a second channel 2308. Additionally, the bracket 2302 may include a handle 2310 having tab 2312 (e.g., tooth, ridge, etc.) that at least partially disposed in the first channel 2306. The handle 2310 may extend from the bracket 2302 and be pivotably attached thereto.

The connector 2304 may include a clip 2314 for attaching to the flange 204. In an embodiment, the connector 2304 may include one or more projections (e.g., bumps, ridges, etc.) for increased engagement between the connector 2304 and the flange 204. The connector 2304 also includes teeth 2316 disposed along a portion of a length of the connector 2304 (e.g., in the Z-direction). The teeth 2316 may represent ribs, projections, notches, etc. that engage with the tab 2312.

Functionally, the connector 2304 may be secured to the flange 204, and the barrier 200 may be disposed over, on, etc. the connector 2304. An end 2318 of the connector 2304 may then be disposed through the first channel 2306. The bracket 2302 may be urged against the barrier 200 (e.g., in the Z-direction), thereby securing the barrier 200 between the bracket 2302 and the frame 202 (e.g., against the surface 602). As the bracket 2302 is urged against the barrier 200, the tab 2312 engages with the teeth 2316. An engagement between the tab 2312 and one of the teeth 2316 may hold the bracket 2302 in place. The end 2318 of the connector 2304 may then be disposed through the second channel 2308 for holding the connector 2304 against the bracket 2302.

To remove the bracket 2302, for example, the handle 2310 may be biased in a direction 2320 (e.g., rotating about the X-axis). During rotation of the handle 2310 in the direction 2320, the tab 2312 may disengage the teeth 2316, and permit the bracket 2302 to be unattached from the connector 2304. Upon release of the handle 2310, the handle 2310 may be biased in a direction opposite to the direction 2320.

Figure 24A:
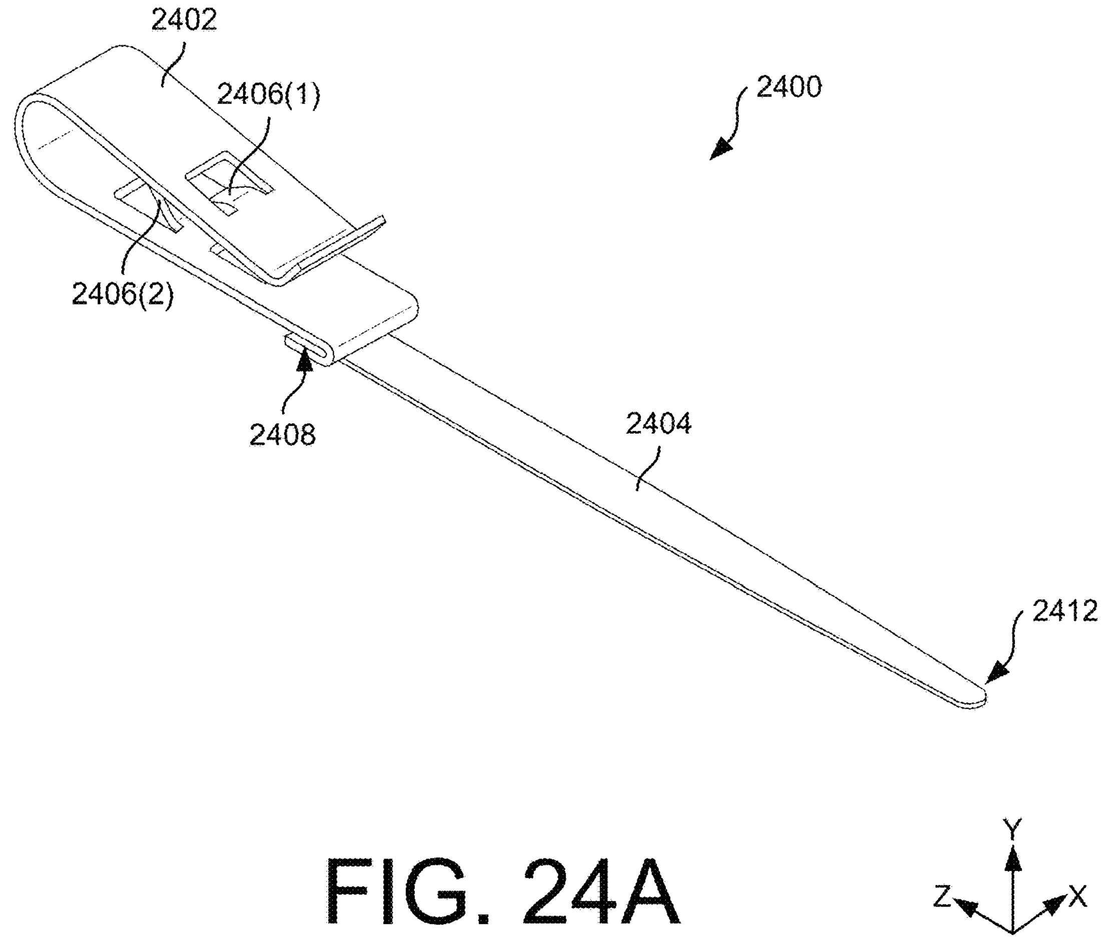
FIG. 24A illustrates an isometric view of an alternative clamp, according to embodiments of the present disclosure.
Figure 24B:
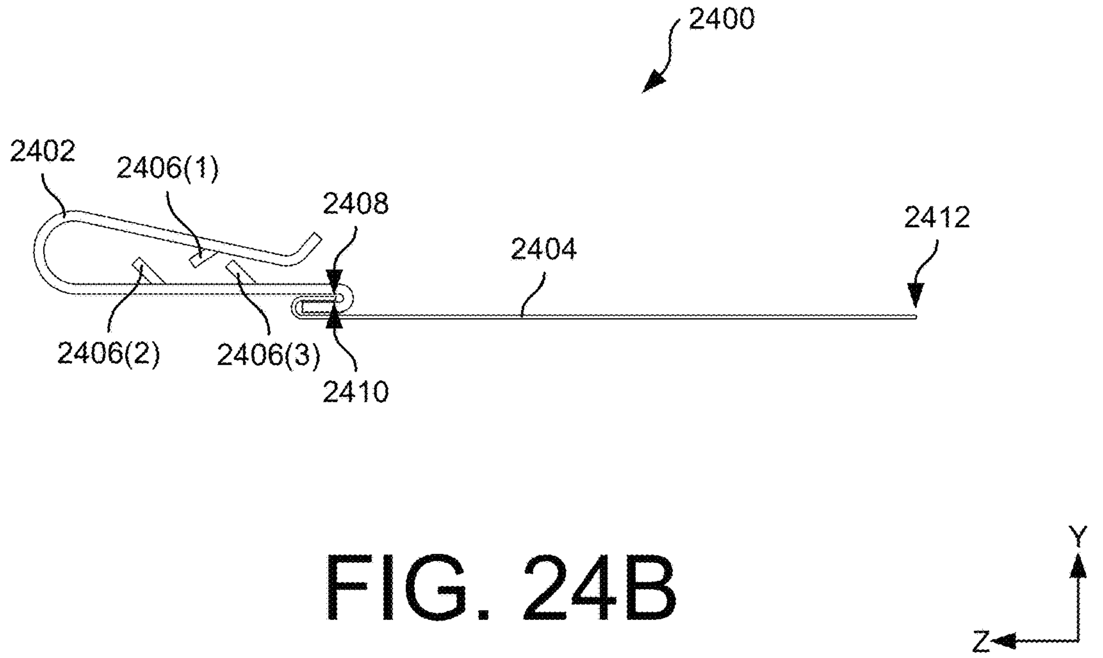
FIG. 24B illustrates a side view of the clamp of FIG. 24A, according to embodiments of the present disclosure.

FIGS. 24A and 24B illustrates an example clamp 2400 that may be used to attach the barrier 200 to the solar panel module, according to embodiments of the present disclosure. In an embodiment, the clamp 2400 may include a clip 2402 that attaches to the frame 202 and a support 2404 (e.g., strut, elongated member, etc.) that extends from, or engages with, the clip 2402.

The clip 2402 includes one or more prongs that engage with the flange 204 of the frame 202. In an embodiment, the prongs may include a first prong 2406(1), a second prong 2406(2), and a third prong 2406(3). The first prong 2406(1) may engage with a top of the flange 204, while the second prong 2406(2) and the third prong 2406(3) may engage with a bottom of the flange 204. The clip 2402 may be formed via bending, and the first prong 2406(1), the second prong 2406(2), and the third prong 2406(3) may be formed via stamping or punching.

The clip 2402 may define a receptacle 2408 that receives a first end 2410 of the support 2404. For example, as shown, the first end 2410 of the support 2404 may be bent so as to be disposed with the receptacle 2408. An engagement between the first end 2410 and the receptacle 2408 may attach the support 2404 to the clip 2402. The barrier 200 may be slid onto the support 2404, from the second end 2412. Therein, the second end 2412 may be bent (e.g., about the X-axis), similar to the clamp 900 and/or the clamp 1000 to secure the barrier 200.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A clamp comprising:
a connector including:
a first end to engage a frame of a solar panel module,
a second end, and
a slot disposed between the first end and the second end;

a bracket including:

a channel to receive a portion of the connector between the first end and the second end, a tab at least partially disposed within the channel, the tab to engage at least the slot, a first track, a second track, and a receptacle; and a slide at least partially disposed within the receptacle, the slide to transition between a first state in which access to the second end of the connector is permitted, and a second state in which access to the second end of the connector is restricted, the slide including:

a first arm at least partially disposed within the first track, and a second arm at least partially disposed within the second track.

2. The clamp of claim 1, wherein the connector includes one or more prongs to engage with the frame.

3. The clamp of claim 1, wherein the slide includes a groove in which the second end of the connector is disposed.

4. The clamp of claim 1, wherein a barrier is disposable between the frame and the bracket.

5. The clamp of claim 1, wherein the slide includes a handle.

6. A clamp comprising:

a connector including:

a first end to attach to a solar panel module, and a second end;

a bracket including a channel to receive at least a portion of the connector, wherein the connector is bendable in a first direction after insertion through the channel to attach the connector to the bracket; and a slide that transitions between a first state in which the second end is permitted to be disposed through the channel, and a second state in which access to the second end is restricted, wherein the connector is bendable in a second direction, opposite the first direction, while the slide is in the first state to detach the connector from the bracket.

7. The clamp of claim 6, wherein:

the connector includes one or more slots; and the bracket includes a tab to be at least partially disposed within one of the one or more slots.

8. The clamp of claim 6, wherein:

the connector is disposable through a barrier; and the barrier is disposable between the solar panel module and the bracket.

9. The clamp of claim 6, wherein the slide includes a handle.

10. The clamp of claim 6, wherein:

the bracket includes a first track and a second track; and the slide includes:

a first arm at least partially disposed within the first track, and a second arm at least partially disposed within the second track.

11. The clamp of claim 10, wherein:

the bracket includes:

a first projection at least partially disposed within the first track, and a second projection at least partially disposed within the second track;

an engagement between the first arm and the first projection prevents the slide from transitioning to the second state;

an engagement between the second arm and the second projection prevents the slide from transitioning to the second state; and application of a predetermined amount of force causes (i) the first arm to traverse over the first projection to transition the slide to the second state and (ii) the second arm to traverse over the second projection to transition the slide to the second state.

12. The clamp of claim 6, wherein the connector includes:

a clip to attach to the solar panel module; and one or more prongs to engage the solar panel module.

13. The clamp of claim 6, wherein:

the bracket includes a first end and a second end;

the channel is located more proximate to the first end than the second end;

the channel is open at the first end; and the channel is enclosed at the second end.

14. A clamp comprising:

a connector attachable to at least one of a solar panel module or a frame of the solar panel module, the connector being disposable through a barrier, the connector including one or more slots;

a bracket including:

a channel through which at least a portion of the connector is disposable, a tab disposable within at least one of the one or more slots to secure the connector to the bracket, and to secure the barrier between the bracket and the at least one of the solar panel module or the frame of the solar panel module, a first track, and a second track; and a slide transitionable between a first position in which the connector is unsecured to the bracket, and a second position in which the connector is secured to the bracket, the slide including:

a first arm at least partially disposed within the first track, and a second arm at least partially disposed within the second track.

15. The clamp of claim 14, wherein:

the connector includes:

a first end attached to the at least one of the solar panel module or the frame, and a second end;

in the first position, the second end is permitted to be disposed through the channel; and in the second position, access to the second end is restricted.

16. The clamp of claim 14, wherein in the second position at least a second portion of the connector is interposed between the slide and the bracket.

17. The clamp of claim 14, wherein the connector is bent to secure the connector to the bracket.

18. The clamp of claim 14, wherein the connector includes:

a clip to attach to the at least one of the solar panel module or the frame; and one or more prongs to engage the at least one of the solar panel module or the frame.

19. The clamp of claim 14, wherein:

the bracket includes a top, a bottom, a front, and a back; and the channel is angled, between the front and the back, in a direction from the bottom to the top.

* * * * *